United States Patent [19]

Anderson et al.

[11] Patent Number: 4,885,786
[45] Date of Patent: Dec. 5, 1989

[54] METHOD FOR ENLARGING AN IMAGE STORED IN RUN REPRESENTATION FORM

[75] Inventors: Karen L. Anderson, Peekskill; William B. Pennebaker, Carmel; Keith S. Pennington, Somers, all of N.Y.

[73] Assignee: International Business Machines Corporation, Armonk, N.Y.

[21] Appl. No.: 198,666

[22] Filed: May 24, 1988

Related U.S. Application Data

[63] Continuation of Ser. No. 664,263, Oct. 24, 1984, abandoned.

[51] Int. Cl.⁴ .............................................. G06K 9/42
[52] U.S. Cl. ........................................ 382/47; 382/44; 358/451; 340/731
[58] Field of Search .................... 382/44, 47; 340/728, 340/731; 358/261, 283, 287

[56] References Cited

U.S. PATENT DOCUMENTS

| | | | |
|---|---|---|---|
| 4,090,188 | 5/1978 | Suga | 340/731 |
| 4,107,648 | 8/1978 | Frank | 382/20 |
| 4,129,860 | 12/1978 | Yonezawa et al. | 340/731 |
| 4,290,084 | 9/1981 | Minshull et al. | 358/287 |
| 4,468,755 | 8/1984 | Iida | 358/287 |
| 4,516,173 | 5/1985 | Abe et al. | 340/731 |
| 4,602,383 | 7/1986 | Ogawa et al. | 382/261 |

FOREIGN PATENT DOCUMENTS 55-95144 7/1980 Japan.
59-3680 10/1984 Japan.

Primary Examiner—Leo H. Boudreau
Assistant Examiner—Jose L. Couso
Attorney, Agent, or Firm—Thomas P. Dowd

[57] ABSTRACT

The method according to the present invention enlarges a binary digital image by a method comprising the steps of: storing the rows of the image as a plurality of run end representations, in which a row is represented as a sequence of values giving the white and black run ends; enlarging each row of the image along the horizontal axis by altering the value of each run end representation to achieve enlargement on the horizontal axis by a factor F1; enlarging the image along the vertical axis by interpolating rows between the lines of the partially enlarged image so as to produce enlargement along the vertical axis by a factor F2; storing the enlarged size image generated by the above steps in run end form. An image enlarged by the method of the present invention may be reduced by the simple technique of dividing the image into blocks of pixels and assigning one pixel in a reduced image for each block of pixels in the larger image. Each pixel in the reduced image may by set equal to a center pixel in each block.

21 Claims, 54 Drawing Sheets

FIG.5
Initially OAH(0)<=X=OBH(2).
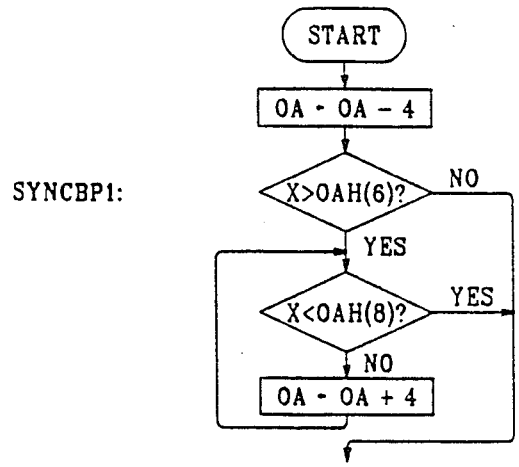
SYNCBP1:
At this point OAH(6) corresponds to X=OBH(2).
The next section is entered only if OAH(6) < Z=OBH(4).
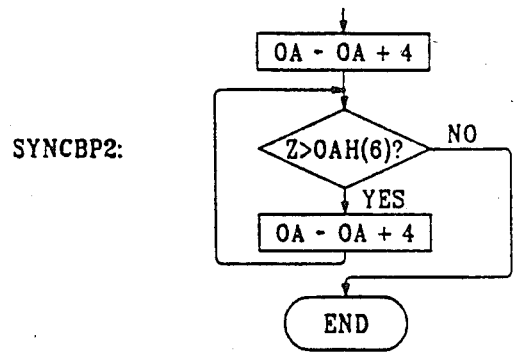
SYNCBP2:
At this point OAH(4) corresponds to Z=OBH(4).
On exit, OAH(4)<=OBH(4) whether or not SYNCBP2 is performed.

METHOD FOR ENLARGING AN IMAGE STORED IN RUN REPRESENTATION FORM

This application is a continuation of U.S. application Ser. No. 664263 filed 10-24-84, now abandoned.

BACKGROUND OF THE INVENTION

1. Field of the Invention

The present invention relates to binary digital image processing methods and more particularly to improved methods for enlarging binary image data stored in run representation form.

2. Description of the Prior Art

The following are systems representative of the prior art.

K. L. Anderson, F. C. Mintzer, and J. L. Mitchell, "Fast algorithm for enlarging an image by 1/5 in both dimensions," U.S. Pat. No. 4,569,081 teaches a method for expanding a binary image including the steps of: storing the image in bit sequence; inserting for each string of 5 bits along a first axis one or more expansion bits, to convert each said string of 5 bits to a string of 6 bits; assigning a value to each expansion bit generated by the above step; inserting one or more rows of expansion bits for each 5 rows of bits along a second axis of the image to convert each 5 rows of bits to 6 rows of bits along the second axis of the image; assigning a value to each expansion bit generated by the above steps; storing the enlarged image generated by the above steps.

Although the patent does deal with expansion of an image by a factor of 1.2, the patent does not expand an image in first and second dimensions by an integer factor by a method which operates on an image in run representation format as does the method according to the present invention. It operates on raster image data and examines only a small neighborhood surrounding each inserted pel to determine what the value of that pel should be, whereas the method according to the present invention can take into account pels over a larger area of the image when large features (straight lines, etc.) exist and can take steps to preserve and, if appropriate, smooth those features.

U.S. Pat. No. 4,303,948 describes an image enlargement process. The enlargement procedure differs from the method of the present invention in that it is a two-step process in which the image in bit map representation is first expanded by an integer factor and then reduced by a fractional factor. Expansion is accomplished by merely replicating bits, whereas the present invention modifies run representations for each run of each color in an image to be enlarged by an integer factor.

U.S. Pat. No. 4,254,409 describes an image enlargement process designed to do page composition using alphanumerics and simple graphics, rather than to operate on an already-composed image containing arbitrary data. It assumes that objects in the image are described as a series of graphics elements, each of which has a corresponding precanned precedure for enlarging it. It thus assumes some knowledge about what the image represents.

U.S. Pat. No. 4,409,591 is similar to 4,254,409. It operates only on a specified set of coded symbols (basically alphanumerics) rather than on arbitrary image data. Like 4,254,409, it assumes that the characters are described as a series of graphics elements; in this case enlargement is done by having precanned dot patterns available to create each element at any of a finite number of large sizes.

U.S. Pat. No. 4,367,533 describes enlargement of images by a process which appears to be replication of pixels, whereas the present invention modifies run representations for each run of each color in an image to be enlarged by an integer factor.

U.S. Pat. No. 4,357,604 describes a hardware method for enlarging the dot patterns corresponding to coded characters (not image data, although the image could be represented as coded data using a programmable symbol set) prior to display. Enlargement is by replicating pels in one dimension and by leaving extra space between pel columns in the other dimension.

U.S. Pat. No. 4,267,573 operates by transforming images (e.g. to a log spiral coordinate system). This is much more complex than the method of the present invention.

U.S. Pat. No. 4,153,896 scales the image first in one dimension and then in the other. This patent relies on hardware, that it describes, to read an image in either scan dimension. It is not appropriate for direct implementation in software, since most computers do not have this hardware capability. It is capable of scaling (enlarging or reducing) by an arbitrary factor. The enlargement algorithm is equivalent to replicating pels.

Although the prior art discussed above relates generally to the field of the present invention, none of the art teaches nor suggests the method of the present invention.

SUMMARY OF THE INVENTION

Therefore, it is an object of the present invention to enlarge a binary digital image by a method comprising the steps of:

storing the rows of the image as a plurality of run end representations, in which a row is represented as a sequence of values giving the white and black run ends;

enlarging each row of the image along the horizontal axis by altering the value of each run end representation to achieve enlargement on the horizontal axis by a factor F1;

enlarging the image along the vertical axis by interpolating rows between the lines of the partially enlarged image so as to produce enlargement along the vertical axis by a factor F2;

storing the enlarged size image generated by the above steps in run end form.

The foregoing and other objects, features and advantages of the invention will be apparent from the more particular description of the preferred embodiments of the invention, as illustrated in the accompanying drawing.

BRIEF DESCRIPTION OF THE DRAWING

FIGS. 5, 7, 9, 11, 13, 15, 17, 19, and 21 are flow charts describing subprocedures used in the method illustrated in FIG. 4.

In the drawing, like elements are designated with similar reference numbers, and identical elements in different specific embodiments are designed by identical reference numbers.

DESCRIPTION OF PREFERRED EMBODIMENTS OF THE INVENTION

Problem Solved by this Invention

Figure 1:
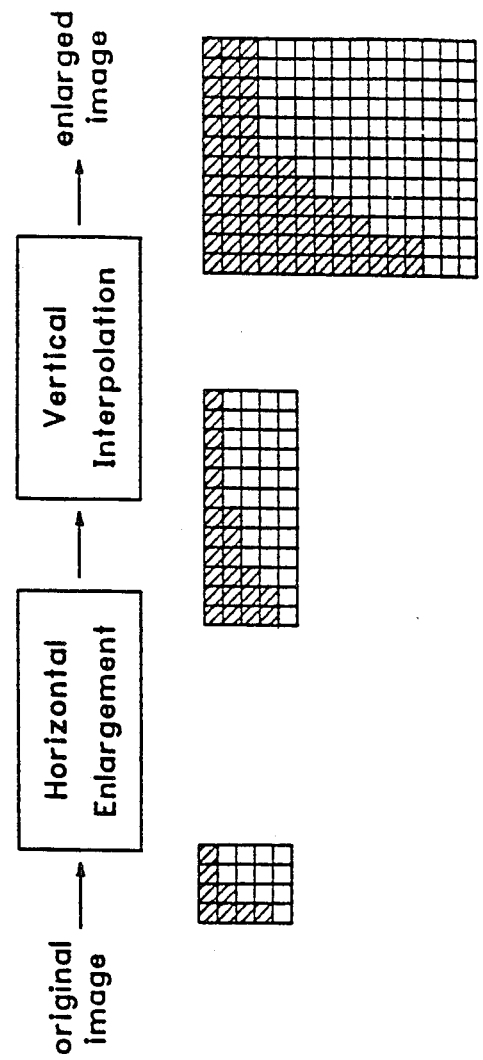
FIG. 1 shows an overview of an image enlargement method according to the present invention.

This invention solves the problem of enlarging a binary image by an integer factor, such as three, in both the horizontal and vertical dimensions.

The method of the present invention will also create an image suitable for printing on a high resolution printer which has 600 pel/inch addressability but only about 400 pel/inch resolution.

The enlargement method of the present invention is suitable for implementation in software on a general-purpose computer such as an IBM 3081. It manipulates the image data in run end format (rather than in bit format) and applies rules which permit some smoothing of edges and correcting for the output device, obtaining good quality output with a relatively small amount of processing. This method has the interesting property that the enlargement may be reversed simply by dividing the enlarged image into 3×3 pel blocks and taking the middle pel of each block.

DESCRIPTION

The resolution change method according to the present invention is designed to produce an image for printing on a high resolution printer which produces somewhat irregularly shaped spots. In one such high resolution printer, although 600 pels per inch may be addressed, the actual resolution is only about 400 pels per inch because the average spot size is greater than 1/600 of an inch in diameter. This means that a rectangle of black pels on a white background will be noticeably larger than a rectangle containing the same number and arrangement of white pels on a black background. It is therefore necessary to treat white and black areas differently, at least when they are very small. For example, the method of the present invention enlarges an isolated black pel by creating a 2×2 pel square of black pels while an isolated white pel causes the creation of a 3×3 square of white pels. Even so, a black dot appears slightly larger than a white dot.

The method of the present invention assumes the existence of a control program which supplies the input image lines as requested in run end format (described below), and accepts output (expanded) image lines in the same format. The separation of the I/O handling into subroutines separate from the enlargement algorithm allows flexibility in the application of the enlargement. If the image to be enlarged has been compressed and encoded as described in co-pending U.S. patent application Ser. No. 571,239 of J. L. Mitchell et al, entitled Method for Encoding and Decoding a Digital Image, and assigned to the same assignee as the present application, the decompression process described therein may be used to obtain the run ends directly, without ever creating the raster image; if the input image is in raster scan (bit map) format, image lines may be quickly converted to run end format by the procedure described in the co-pending application of Goertzel et al, A Method for converting an Image from a Bit Map to a Run End or Run Length Representation, U.S. Ser. No. 567,218 also assigned to the same assignee as the present application. Similarly, the output image may be compressed (as described in above-noted U.S. Ser. No. 571,239) directly from the run end information, again without creating the raster image. If the enlarged image is to be represented in raster scan format, the conversion may be accomplished using the method described in the co-pending application of Mitchell and Anderson, A Method for Converting an Image from a Run End of Run Length Representation to a Bit Map, U.S. Ser. No. 567,292 also commonly assigned. Any other procedure which creates or uses the run end format data may be used in the input and output procedures.

The run end representation used in the resolution change contains a series of halfwords. The 16 bits in a halfword are adequate to represent images with widths up to 32 K as positive displacements. The first halfword in each line buffer gives the number of bytes of run end data plus two bytes for the count (i.e. the total number of bytes of data in the buffer); this is followed by three zero run ends, an arbitrary number of pairs of white/black run ends, and two additional copies of the last black run end. If the image row begins with a black run, the first white run end must be specified as zero. If the image row ends with a white run, the last black run end will be the same as the last white run end, so that there are three additional copies of the last real run end. For example, the three-line bit image

| 11111111 | 11000000 | 00000000 | 00010000 |
|----------|----------|----------|----------|
| 00000000 | 00000000 | 00000000 | 00000000 |
| 10100000 | 10001111 | 11111111 | 11110001 | would produce three vectors with the following half-word entries:

| 24 | 0  | 0  | 0  | 0  | 10 | 27 | 28 | 32 | 32 | 32 | 32 |
|----|----|----|----|----|----|----|----|----|----|----|----|
| 16 | 0  | 0  | 0  | 32 | 32 | 32 | 32 |    |    |    |    |
| 32 | 0  | 0  | 0  | 0  | 1  | 2  | 3  | 8  | 9  | 12 | 28 |
| 31 | 32 | 32 | 32 |    |    |    |    |    |    |    |    |

FIG. 1 shows an overview of the proposed image enlargement procedure. The lines of the original image (in run end format) first undergo an enlargement in the horizontal dimension. This enlargement converts each pel into a run of three pels of the same color as the original pel. Single pels are then added or removed from the ends of runs according to a set of rules described below. The result is a horizontally enlarged image which has had some edges smoothed slightly. This image (still in run end form) then goes through a process in which two lines are interpolated between each pair of image lines. This enlarges the image by a factor of three in the vertical dimension. The pels on the inserted lines are set according to a procedure to be described below; it is similar, but not identical, to the procedure used for the horizontal enlargement. The final result is an image with nine times as many pels as the original image, in which the inserted pels have been assigned values so as to smooth edges and partially compensate for the characteristics of the output device.

Application of the enlargement algorithms in the reverse order (performing the vertical enlargement and horizontally enlarging the lines of the resulting image) would produce an image of comparable quality to that given by the method according to the present invention. However, the horizontal enlargement algorithm described in this invention uses a large area of storage to save the lines of its input image. If smoothing is to occur over an area of N inches, then the horizontal enlargement must store 600N lines of vertically enlarged data if the vertical enlargement is done first, but it can cover the same area by storing only 200N lines of data if the horizontal enlargement is done before the vertical enlargement. (The horizontal enlargement does not increase the amount of storage required for a line of image data, since the data is in run end form and the number of runs in a line is not altered by the enlargement.) The method of the present invention requires only one-third as much storage as the alternate method and produces the same quality output, so it is clearly preferable to do the horizontal enlargement first.

Figure 2:
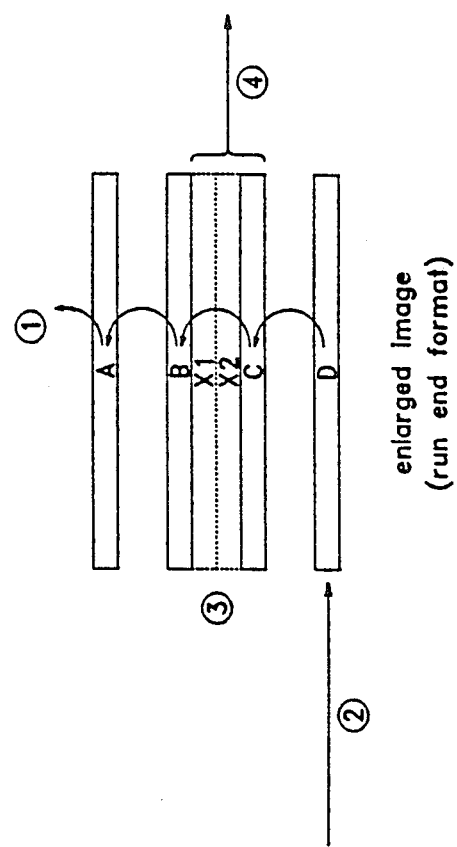
FIG. 2 illustrates a vertical enlargement process according to the present invention.

The vertical expansion procedure will be described first. FIG. 2 shows the interpolation procedure. The vertical expansion operates on four horizontally expanded lines, producing two interpolated lines which fall between the middle two expanded lines. The horizontally expanded lines are referred to as A, B, C, and D; the interpolated lines are X1 and X2. Pointers OA, OB, OC, OD, PX1, and PX2 address the run end buffers for the respective lines. The output image will contain lines B, X1, X2, and C, in that order. Line A may be thought of as the first or oldest line; the other lines are lettered in chronological sequence.

The interpolation cycle operates as follows. The pointers to the horizontally expanded buffers are cycled; the line pointed to by OA is dropped and each line moves up one level (i.e. OA recieves the old value of OB, OB receives the old value of OC, and OC receives the old value of OD), a new line (in run end form) is obtained from the horizontal enlargement procedure, and OD is set to point to it. Run end buffers describing the interpolated lines PX1 and PX2 are created. Finally, the two interpolated lines and the subsequent horizontally expanded line are put out. The cycle repeats until all of the input lines have been processed. Initialization and termination code creates additional copies of the first and last lines for use in the interpolations for which there are not enough real input lines available.

Figure 3:
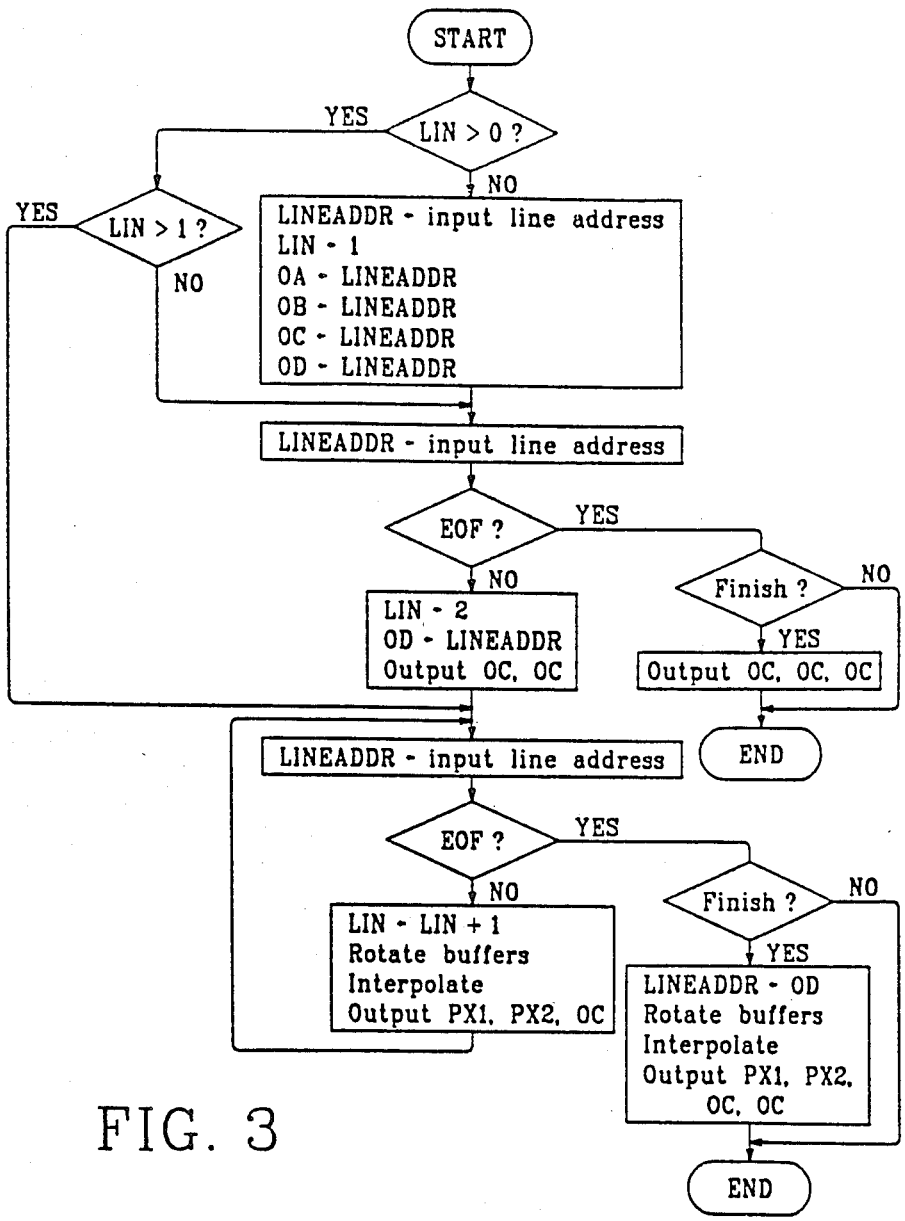
FIG. 3 is a flow chart showing the control code for the vertical enlargement for the method according to the present invention.

FIG. 3 shows the control code for the vertical enlargement process. The procedure is constructed so that it can be interrupted in the middle and then restarted; i.e. if the end of the input is detected, control will return to the calling program, which may set up additional input lines and then call this procedure again to add more lines to the same output image. A flag is set by the calling function to control whether or not the pipeline is to be flushed out when the end of the input is found. It is also possible to specify that after a certain number of lines have been processed, control is to return to the caller (with or without clearing out the pipeline). This is not shown in the flowchart; it is necessary only to test before reading each input line to determine whether the specified number of lines has been processed, and if so, to cause the processing to proceed as if an end-of-file had been encountered.

The first step in the vertical enlargement is to examine the counter LIN, which indicates number of horizontally enlarged lines of the current image which have already been processed. If LIN is nonzero then there are already one or more lines of real data in the pipeline, so processing must begin at the top of the interpolation loop if LIN is greater than one, or after the reading of the first line and the setup of the pipeline if LIN equals one.

If LIN is zero, then a new image is being enlarged. The first horizontally enlarged line is read; an end-of-file or other error causes an error code to be returned to the caller. If no error occurs, all four line pointers are set to point to the run end buffer of the line. LIN is set to 1 to indicate that one line has been read. The next stage (following the entry point for the LIN=1 case) reads the second horizontally enlarged line. If an error occurs, control is returned to the caller immediately. In the case of an end-of-file, the flag which controls whether the pipeline is to be cleared is examined. If the pipeline is to be cleared, then the original image consisted of a single line. It is converted into a three-line image by putting out three copies of the line. Control then returns to the calling function.

If a second input line is found, LIN is set to 2 to indicate that two lines have been read. The address of the new line is placed in the pointer OD. The next step is to create the first two lines of the output image. Since lines OB and OC are known to be identical, the interpolation can be omitted (since it will only produce two additional copies of these lines), and two copies of line OC are put out.

The main loop of the vertical interpolation process is then entered. This loop performs the operations shown in FIG. 3. A new input line is read. Again, an error causes immediate return to the calling function; an end-of-file causes exit from the loop. Otherwise the counter for the number of lines processed is incremented, the address of the new line is put into the pipeline (i.e. OA takes the value of OB, OB takes the value of OC, OC takes the value of OD, and OD takes the value of LINEADDR), PX1 and PX2 are interpolated between OB and OC, and the two interpolated lines and line OC are put out. This loop continues until there is no more input data.

When the end-of-file condition causes exit from the loop, the flag which controls whether the pipeline is to be cleared is examined. If clearing is not required, control returns immediately to the caller. Otherwise the address of the run end buffer for the newest input line is copied to LINEADDR. A new copy of the last line is added to the pipeline, and lines PX1 and PX2 are interpolated between OB and OC. The interpolated lines are put out, followed by OC; a second copy of OC is then added as the last line of the output image. This is equivalent to adding another copy of the last line to the pipeline and doing another interpolation; since lines OB and OC would then be identical, the first interpolated line would have to be identical to them.

The vertical interpolation procedure takes an image in run end form and interpolates two lines between each pair of successive lines in the original image, creating an image which has the same number of bit columns as the original image but has three times as many rows. The algorithm used is designed to smooth edges (except in cases where a square corner or a very long run is detected), and creates an output image in which no white streak is less than three pels wide and no black streak which projects more than one pel from a black field is less than two pels wide. (These minimum widths apply only in the vertical dimension; since essentially the same algorithm is applied in the horizontal enlargement they will hold for both dimensions in the final enlarged image.) These minimum widths are necessary because for a white run, a streak only one or two pels wide between two black lines will be overprinted by the adjacent black pels, and for a black run, a single-pel streak is not visually pleasing. Another desirable characteristic of a vertical interpolation algorithm is that if runs touch only at the corners, the corresponding output runs should also touch at the corners. The proposed method causes this to happen in most cases.

Figure 4:
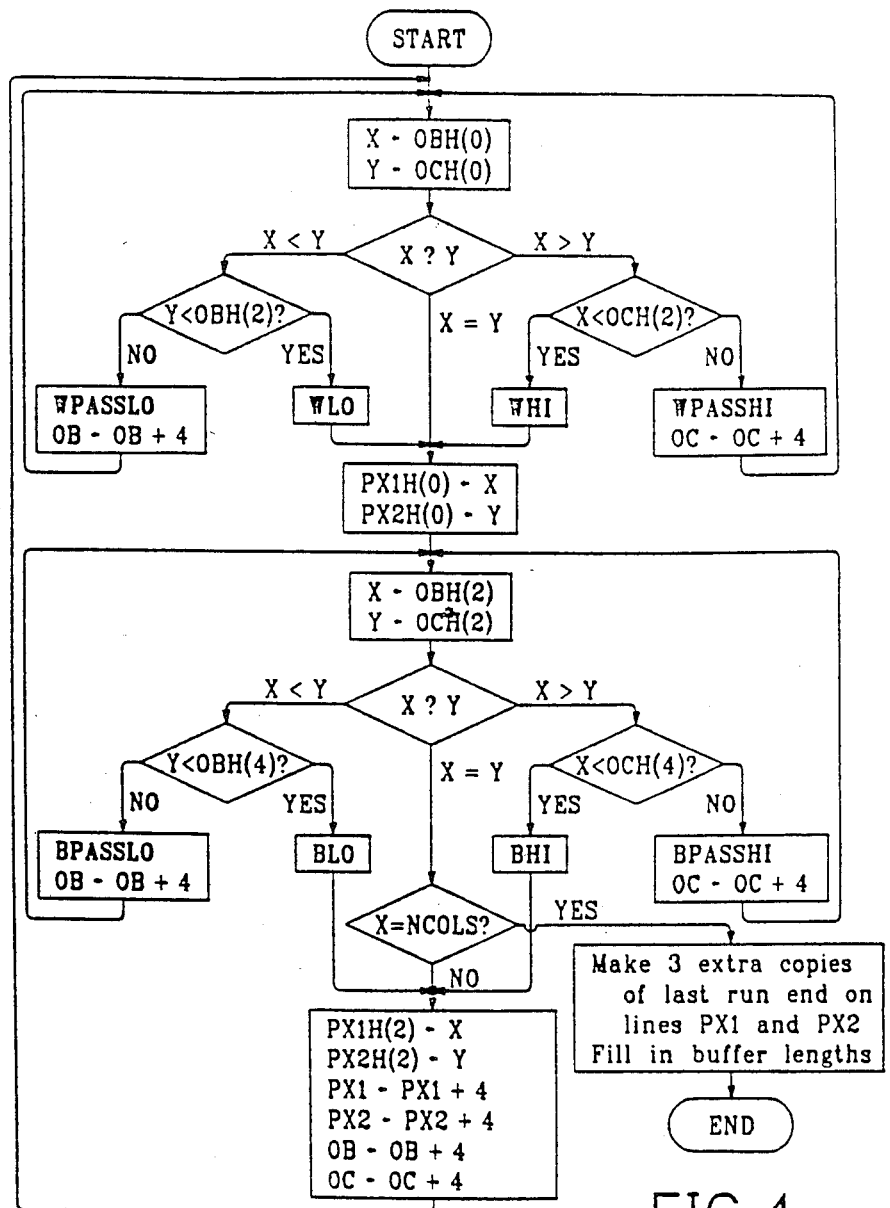
FIG. 4 is a flow chart showing the vertical enlargement process according to the method of the present invention.

The vertical interpolation algorithm is illustrated in FIG. 4. Each of the pointers OA, OB, OC, OD, PX1, and PX2 addresses a run end buffer, which is a vector of halfwords (called OAH, OBH, OCH, ODH, PX1H, and PX2H), with indexing beginning with zero and counting by bytes. Thus, the first halfword in OAH is OAH(0) and its address is OA; the second halfword is OAH(2) and its address is OA+2, etc. Indices which are evenly divisible by four index white run ends; the intervening indices indicate black run ends.

As a convenience in the implementation of this method, the pointers OB and OC are actually given values which are two less than their "true" values as described above. In other words, the address of OBH(0) is OB+2 rather than OB (but OBH(0) still describes a white run end). This is because the processor for which the algorithm has been coded cannot conveniently address using negative offsets, and the algorithm requires occasional references to OBH(−2) and OCH(−2), whose addresses under this scheme are OB and OC rather than OB−2 and OC−2. This implementation detail can and will be ignored in the description of the method which follows.

Each execution of the loop in FIG. 4 processes one pair of "matching" white run ends and the subsequent "matching" pair of black run ends. Two run ends of the same color are said to "match" or "correspond" if they define the same edge in the image (runs which touch only at a corner are not considered to match). The tests used to establish whether two runs match are described below.

The first step is to read the pair of white run ends to be processed. The run end on line B will be referred to as X, that on line C as Y. The two run ends are compared. If they are equal, the run ends define a vertical edge, and clearly two run ends at the same position as X and Y should be interpolated. The values of X and Y are stored in the first available positions in lines X1 and X2, and processing continues with the portion of the loop which processes black run ends.

If X and Y are not equal, an additional test is performed to see whether they correspond. If the black run following the white run which ends first extends beyond the end of the other white run, then the white run ends correspond and one of the procedures WHI or WLO is used to alter X and/or Y before they are stored in the run end buffers describing lines X1 and X2. The procedure used is determined by whether the run end on line B ends before (WLO) or after (WHI) the run end on line C. After the runs ends are stored the algorithm can proceed to the following black run ends. If the white run ends do not correspond, then a "pass" has occurred and one of the procedures WPASSHI or WPASSLO is used (again, the choice depends on which line contains the white run which ends first). These procedures interpolate between the "intrusive" black run and the white pels which surround it. The pointer to the line containing the intrusive black run is then incremented by four, and control passes to the top of the loop to process the new white run end on that line and the old white run end on the other line.

The bottom half of the loop processes a pair of black run ends. The top run ends are again referred to as X and Y. They are compared, and if they are equal, a test is performed to see if the end of the line has been reached. (Since the run end buffer format used supplies extra copies of the last run end, it is not necessary to perform this test when processing white run ends, and clearly the test is unnecessary if X and Y are unequal since all lines are assumed to have equal lengths and therefore the end of the line cannot have been reached.) The end-of-line causes exit from the loop; the required extra copies of the last run end are made, the lengths of the run end buffers describing the interpolated lines X1 and X2 are set up, and the interpolation is complete.

If X and Y are equal and the end of the line has not been reached, then X and Y define a vertical edge and that edge must be interpolated on lines X1 and X2. This is done by storing the values of X and Y in the next available space for a black run end in each of the run end buffers describing the interpolated lines. The pointers PX1, PX2, OB, and OC are then incremented by four (two halfword entries) to address the next run ends to be processed. Control passes back to the top of the loop.

If X and Y are unequal, then a procedure similar to that used for processing the white run ends is used to determine whether the run ends correspond or whether a pass has occurred. If the rubn ends correspond, one of the procedures BHI or BLO may modify X and/or Y before those values are stored at the bottom of the loop. If a pass occurs, the required interpolation is performed by BPASSHI or BPASSLO, one of the pointers OB or OC is incremented by four (two run ends), and a new black run end is available for comparison.

An important operation in some of the enlargement calculations is the determination of what run end, if any, on an "outer" line (A or D) matches a run end on the adjacent "inner" line (B or C). The procedures which make these decisions are called SYNCW (for white run ends when X and Y correspond), SYNCB (for black run ends when X and Y correspond), and SYNCBP (for black runs when a pass occurs).

The problem solved by the SYNCW and SYNCB procedures is actually more limited than that of finding a "matching" run; it is necessary only to determine whether there is a run end of the appropriate color on the outer line at the same position as the run on the inner line which is being processed. For purposes of this description it will be assumed that the outer line is A, the inner line is B, and the run end being processed is X; D, C, and Y, respectively, may be substituted as appropriate.

On entry to SYNCW it is guaranteed that $OAH(-0) < X$ unless $X=0$. The loop

```
OA = OA − 4
begin
    OA = OA + 4
    if X > OAH(4)
    repeat
    end
end
``` is applied. On exit from this loop, $OAH(0) < X < = OAH(4)$. Following the SYNCW procedure, X and OAH(4) will be compared; if they are equal, then a two-pel vertical edge exists, and if they are unequal no white run on line A ends at X.

If $X=0$, then the first run end of a line is being processed. In this case, if the loop described above is executed, OA will remain at its initial value, with OAH(0)=0
OAH(2)=0
OAH(4)=first white run end The same test (comparison of X with OAH(4)) can be applied to determine whether a two-pel vertical edge exists.

Similarly, on entry to SYNCB the condition $OAH(-2)<X$ holds. On exit from the loop

```
OA = OA − 8
begin
    OA = OA + 4
    if X > OAH(6)
    repeat
    end
end
``` the condition $OAH(2)<X<=OAH(6)$ holds. If $X=OAH(6)$ a two-pel vertical edge exists at X; otherwise no such edge exists there.

The SYNCBP procedure is used when a white run extends up or down into a black area. FIG. 5 illustrates the calculation. The first section, SYNCBP1, is always executed for a black pass mode; it positions OA so that the run end OAH(6) corresponds to X. The second part is executed only if the intrusive white run is not an isolated streak. It positions OA so that the white run end OAH(4) corresponds to Z (where Z=OBH(4)), the end of the intrusive white run on line B.

Note that it is possible that no run end on line A corresponds to X and/or Z (i.e. the black field does not extend up onto line A on one or both sides of the intrusive run). In this case the SYNCBP1 procedure will indicate that the last black run end to the left of X corresponds to X, and SYNCBP2 will indicate that the first white run end to the right of Z corresponds to Z. These definitions are appropriate for the calculations subsequently performed by the BPASSHI and BPASSLO procedures; they indicate that the arrea immediately above and to the side(s) of the intrusive white run is white, and that the interpolation should therefore produce a gentle slope.

On entry to SYNCBP1 X represents a black run end and it is guaranteed that $OAH(0)<=X$; when OA is decremented, this condition is converted to $OAH(-4)<=X$. If $X<=OAH(6)$ then the black run which ends at OAH(6) corresponds to X and processing is complete. Otherwise a loop is entered which compares X with the white run end OAH(8), incrementing OA by two run ends until $X<OAH(8)$, at which point X must match OAH(6).

SYNCBP2 is entered only if $OAH(6)<Z$. It increments OA until the condition $Z<OAH(6)$ holds; at that point OAH(4) must correspond to Z. The first increment of OA does not require a test since it has been guaranteed that the desired condition does not hold.

Figure 6:
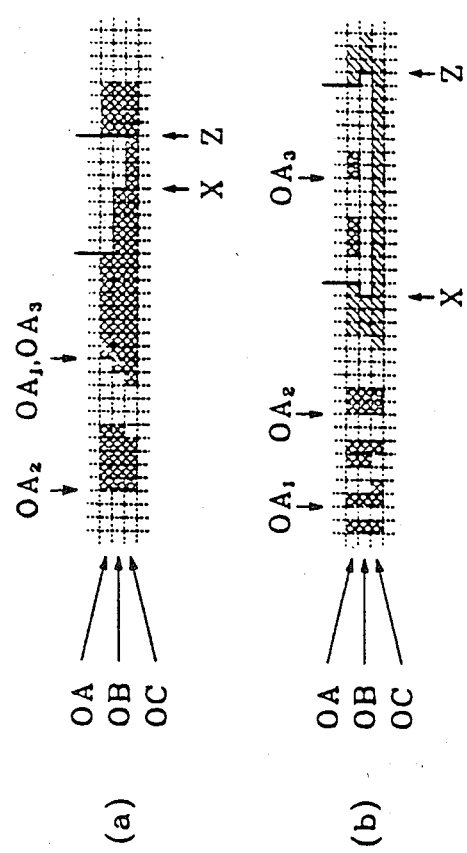
FIGS. 6, 8, 10, 12, 14, 16, 18, 20, and 22 are illustrations of the application of these subprocedures.

FIG. 6 shows the results of the application of the SYNCBP procedures to some sample image data. The subscripted positions of the OA pointer represent
1. The initial position of OA
2. The position of OA after SYNCBP1 is executed
3. The position of OA after SYNCBP2 is executed The heavy black lines show the run ends which are found to correspond by this method.

The procedures WHI, WLO, WPASSHI, WPASSLO, BHI, BLO, BPASSHI, and BPASSLO will now be described. Each description refers to a flowchart and an accompanying illustration which shows what the various tests indicate. The illustrations are drawn on a grid, each square of which represents a single pel. The doubly crosshatched area represent the black runs on original image lines (A, B, C, and D). The areas which are singly crosshatched with solid lines show the result of a prescribed interpolation operation. Single crosshatching with dotted lines indicates an area which would be filled in with black pels by an interpolation operation other than the one being illustrated. In some cases it is not possible to determine from the pels in an illustration where some of the edges (other than the one(s) defined by the prescribed interpolation) would fall; in such cases an approximation is shown.

Figure 7:
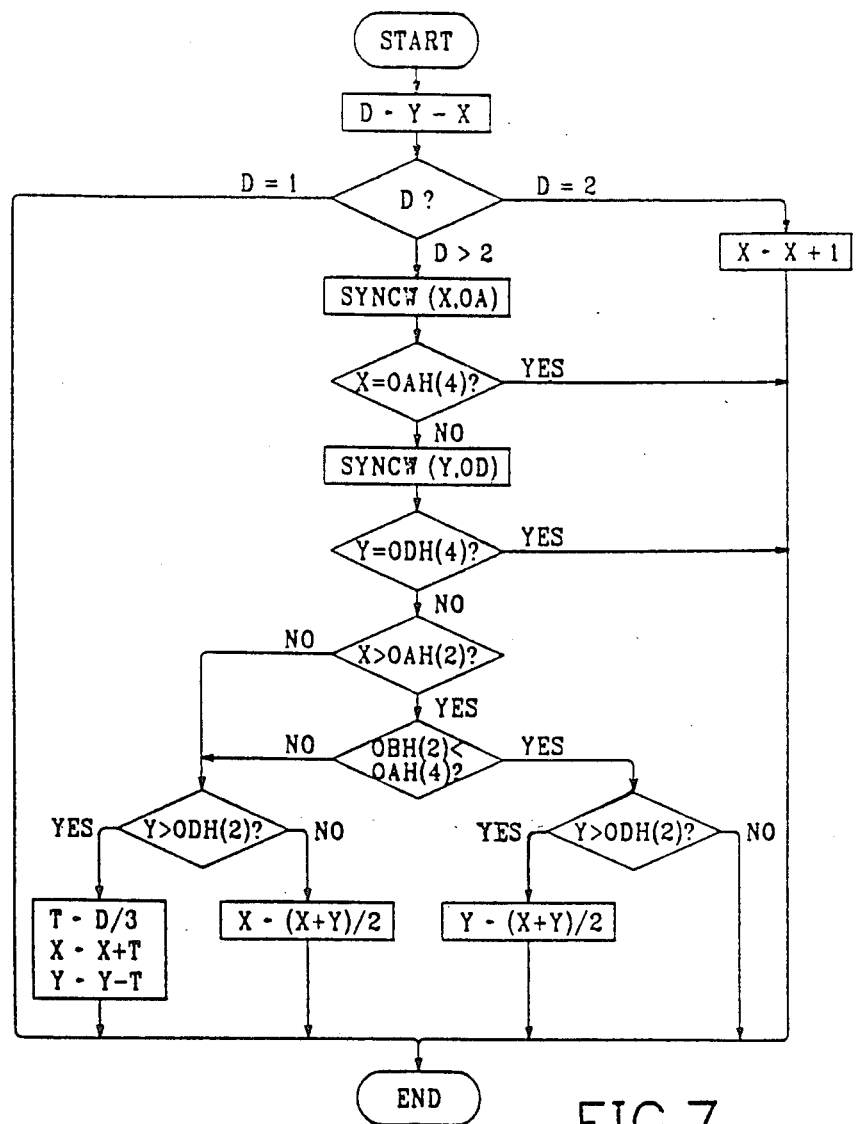
Figure 8:
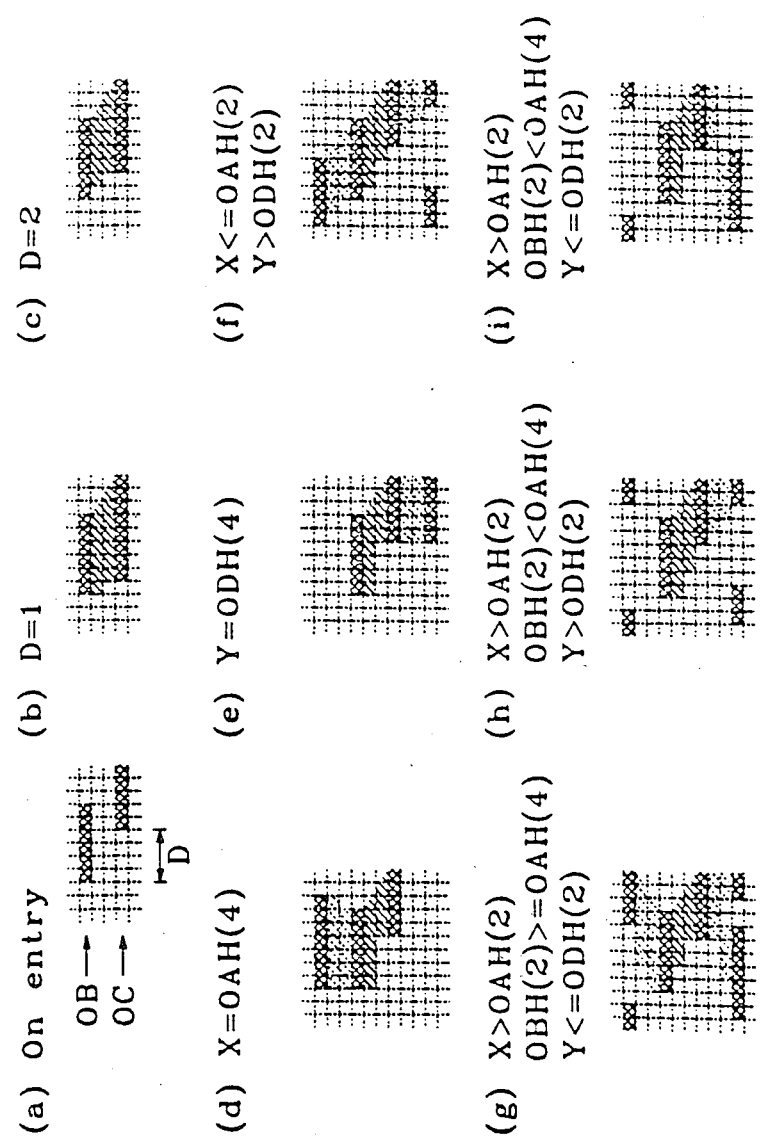

The WLO procedure (FIGS. 7 and 8) is used when X and Y represent white run ends and $X<Y$ OBH(2). This is illustrated in FIG. 8a. The first operation is to take the positive difference of X and Y. If the run ends differ by a single pel, the values of X and Y are not changed (FIG. 8b). If the difference is two pels, the value of X is increased by one to smooth the edge slightly (FIG. 8c). Increasing X rather than decreasing Y increases the amount of white space, which is advantageous because of the large spot size of the printer. Note that if a run touches the black run beginning at X on the lower left corner, the corresponding areas in the output image will not quite touch. This seems to be an acceptable sacrifice to avoid the work of looking for a touching run.

If the difference between X and Y is more than two pels, some additional testing is performed. The run end on line A corresponding to X is found, and if it is the same as X, the square corner is retained by leaving X and Y undisturbed (8d). Similarly the run end on line D corresponding to Y is found, and if the two are equal X and Y are left unchanged to preserve the square corner (8e).

If no square corners are found, a test is made to see whether the black run which begins at position X on line B touches another black run on line A. If the two tests $X > OAH(2)$ and $OBH(2) < OAH(4)$ are satisfied, then there is no touching black run on line A; otherwise such a run exists. In either case, an additional test determines whether the run whose end is Y juts into a black area. This happens if $Y < = ODH(2)$.

The two tests described above produce four possible cases. If the black run on line B touches another black run on line A, there is no need to ensure that the run on line B remains at least two pels thick, since the algorithm will guarantee this when it interpolates between A and B.

Therefore, if the white run ending at Y does not jut into a black area, a straight interpolation can be performed (8f), increasing X by $(Y-X)/3$ and decreasing Y by the same amount. If the white run does jut into a black area, it is necessary for the second interpolated line to be white all the way to the end of the white run (i.e. Y is not changed), and so the difference between the run ends X and Y is split on the first interpolated line $(X = X + (Y-X)/2$; see FIG. 8g). If the black run on line B does not touch another black run on line A, then the first interpolated line must duplicate the black run which begins at X (X is unchanged). The second interpolated line is set by splitting the difference between X and Y if the white run which ends at Y does not jut into a black area $(Y = Y - (Y-X)/2)$; FIG. 8h); otherwise it must duplicate the white run on line C (Y is unchanged; FIG. 8i).

Figure 9:
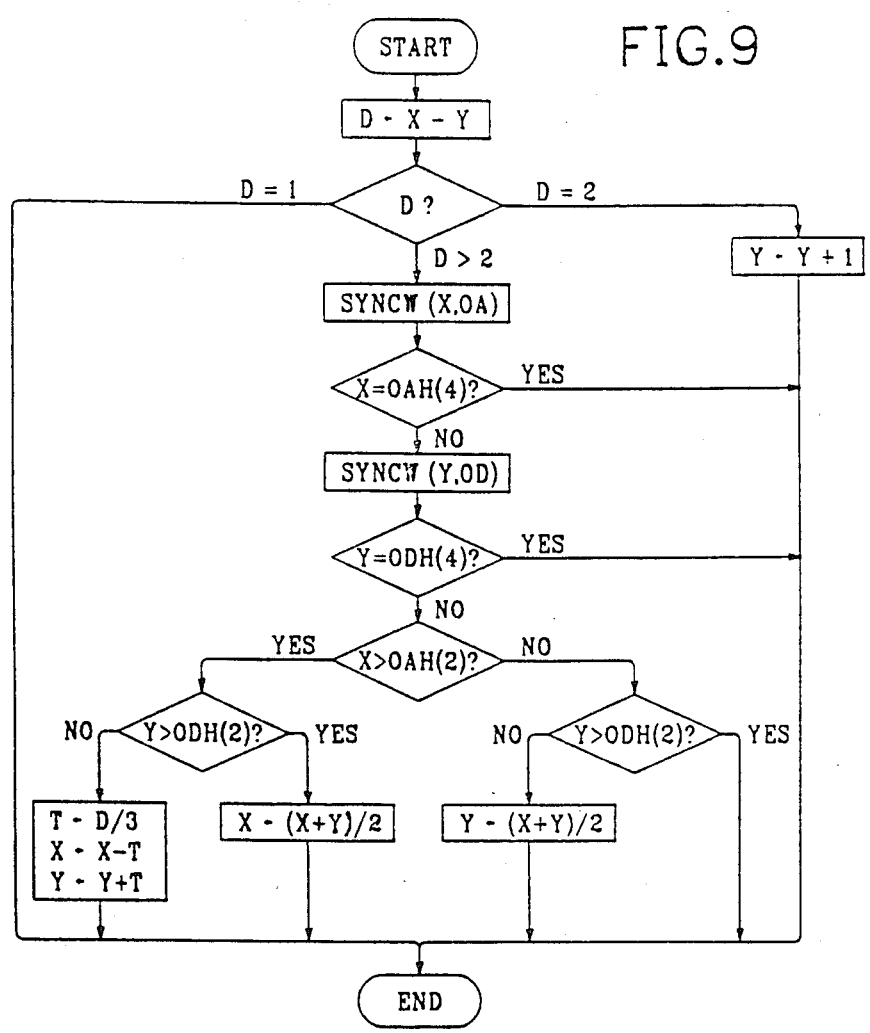
Figure 10:
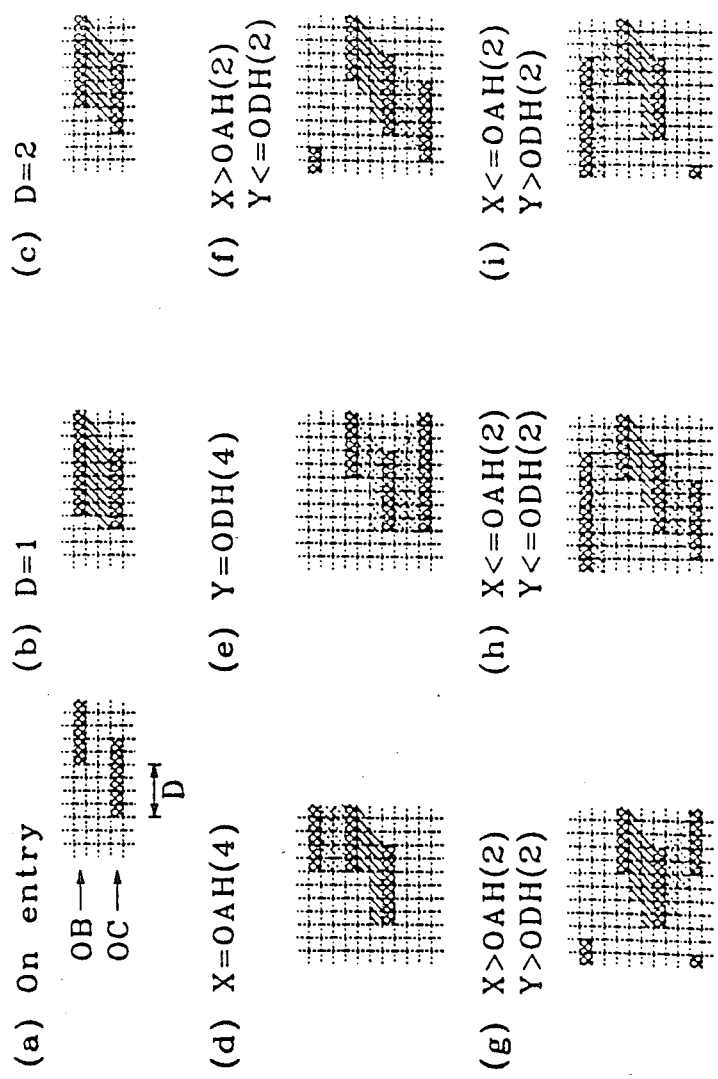
Figure 11:
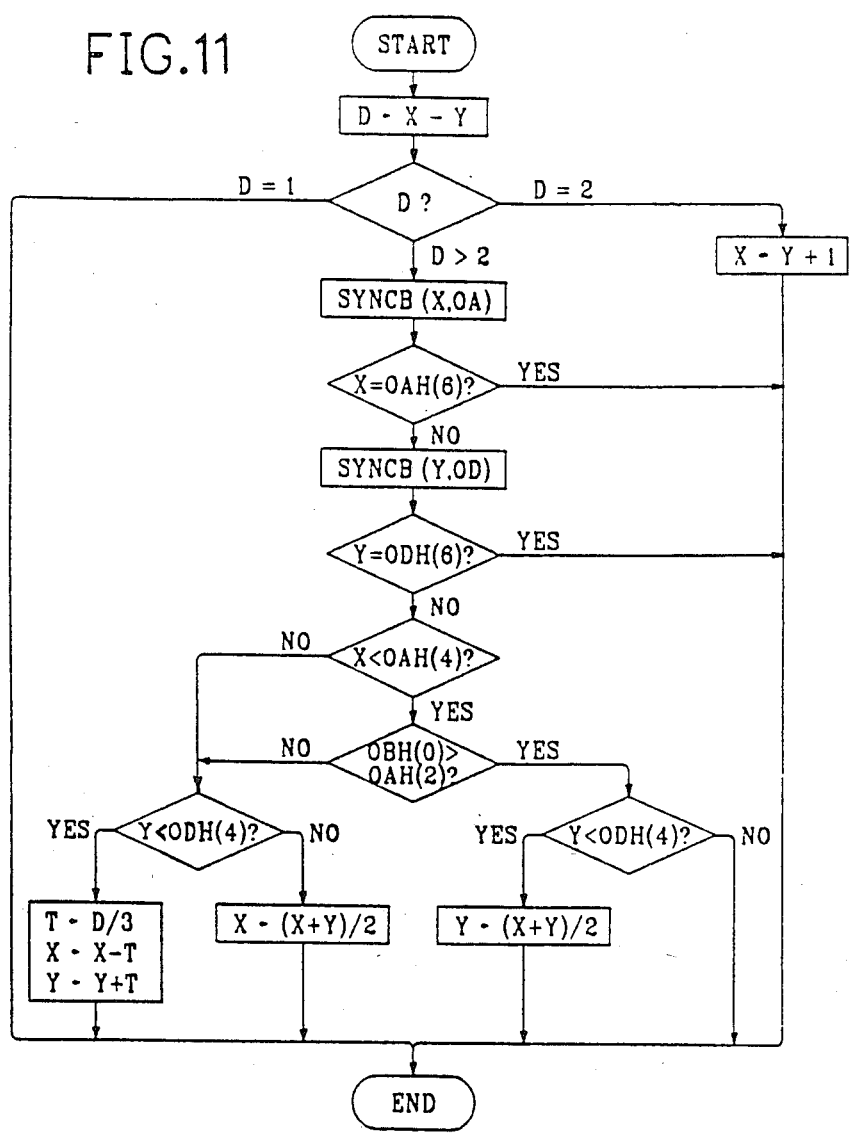
Figure 12:
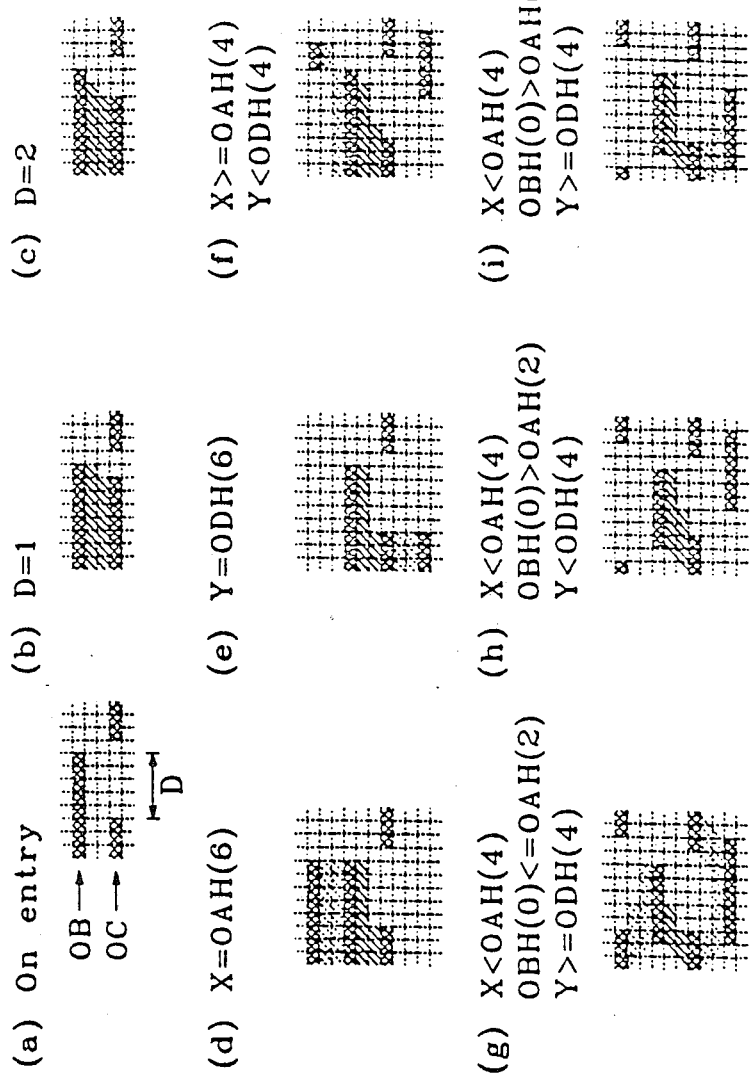
Figure 13:
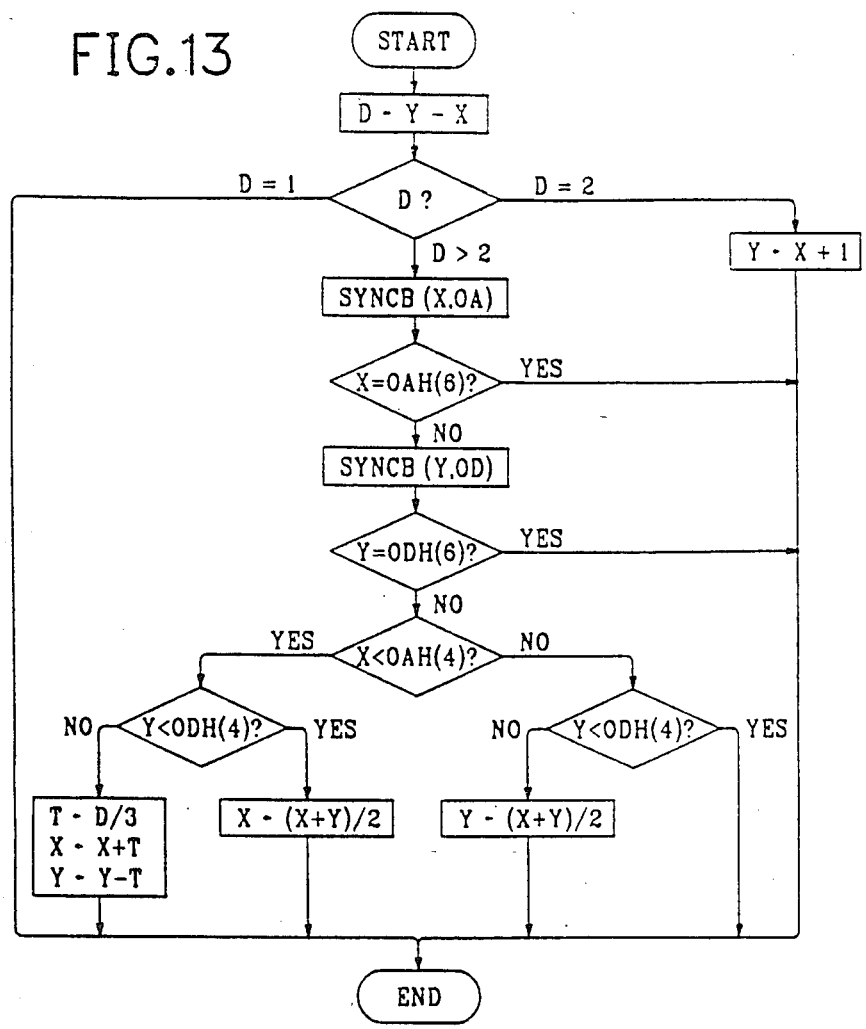
Figure 14:
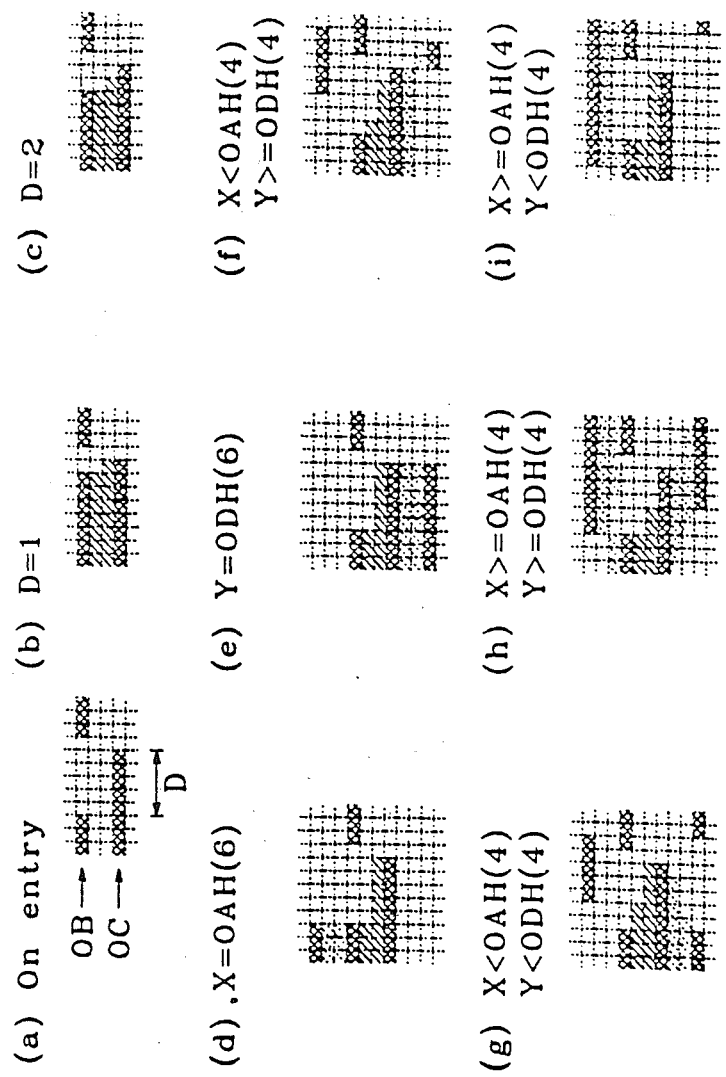

The WHI procedurre (FIGS. 9 and 10) is similar to WLO in that X and Y represent corresponding white run ends, but in this case the upper white run is the longer one (i.e. $Y < X < OCH(2)$), as shown in FIG. 10a. The algorithm is much the same. The positive difference of X and Y is taken, and if it is a single pel X and Y remain unchanged (10b). If the difference is two pels, the value of Y is increased by one to smooth the edge and increase the amount of white space. If the difference between X and Y is more than two pels, square corners are looked for; if a square corner is found, X and Y are left unchanged (10d and e).

If no square corners are found, a test determines whether the shite run which ends at X juts into a black area $(X < = OAH(2))$; a second test decides whether the black run beginning at Y on line C touches a black run on line D which begins to the left of Y $(Y < ODH(2))$.

Again, the two tests produce four possible cases. If the white run ending at X does not jut into a black area, then the first interpolated line can be altered without leaving a white area less than three pels thick (FIGS. 10f and g), and if the black run beginning at Y touches a black run which begins to the left of Y, then the second interpolated line can be altered without possibly leaving a black area which is a single pel thick (FIGS. 10f and (h)). The number of lines which may be altered determines the type of interpolation performed: no alteration if neither line is allowed to change, alteration of one line by $(Y-X)/2$ if only one line may change, or alteration of both lines by $(Y-X)/3$ if both lines can be changed.

The BHI and BLO procedures (FIGS. 11, 12, 13, and 14) are analogous to WLO and WHI, respectively. They handle the cases where two black runs correspond (12a and 14a). The positive difference of the run ends is taken; if the difference is one nothing is done (12b and 14b), and if it is two the longer black interpolated run is shortened by one bit (12c and 14c). Otherwise tests are made for square corners (12d and e, 14d and e); if any are found the original run ends are duplicated on the interpolated lines. Otherwise tests are made for one-pel-thick white or black features in the original image, and X and Y are altered as required to interpolate (12f, g, h, i; 14f, g, h, i).

The remaining four procedures (WPASSLO, WPASSHI, BPASSLO, and BPASSHI) deal with the situation in which a run end on one of the inner lines (B or C) corresponds to no run on the other line. The variable Z is used to denote the end of the intruding run.

Figure 15:
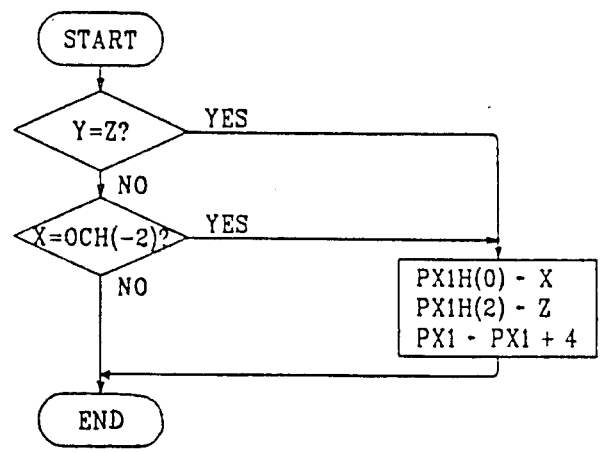
Figure 16:
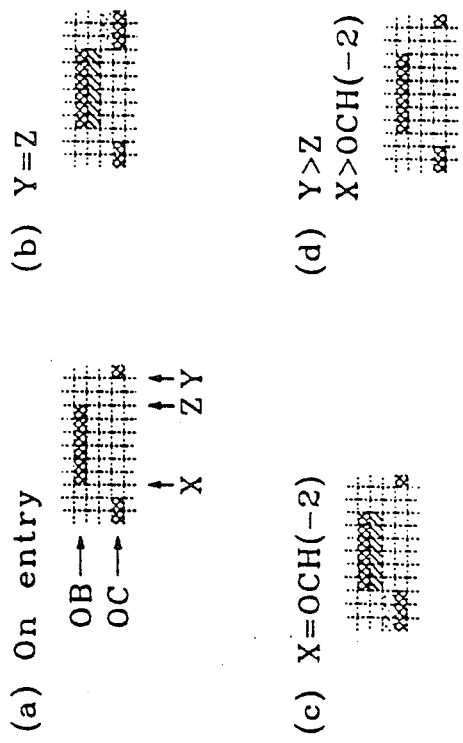

WPASSLO (FIGS. 15 and 16) is the simplest of the four procedures. It handles the case where a black run juts down into a white area (16a). Since either the black run connects to another black run on line A, in which case the lines interpolated between A and B will ensure that the run on line B is at least two pels thick, or it does not, in which case a black run will be interpolated above line B, it is only necessary to ensure that if a black run on line C touches the black run on line B at either corner, then the corners will touch on the interpolated lines. The conditions $Z = Y$ and $X = OCH(-2)$ indicate that black runs touch the lower right and left corners, respectively, of the intrusive black run ending at X. If one or both of these conditions occur, then the black run on line B is duplicated on line C by adding the two run ends X and Z to the run end buffer for the first interpolated line (16b and c). The touching run ends on the second interpolated line are not created in this part of the process; they are put in when the run end(s) involved on line C are processed. If no runs on line C touch the black run, no action is required; no run ends are introduced and the interpolated lines remain white (16d).

Figure 17:
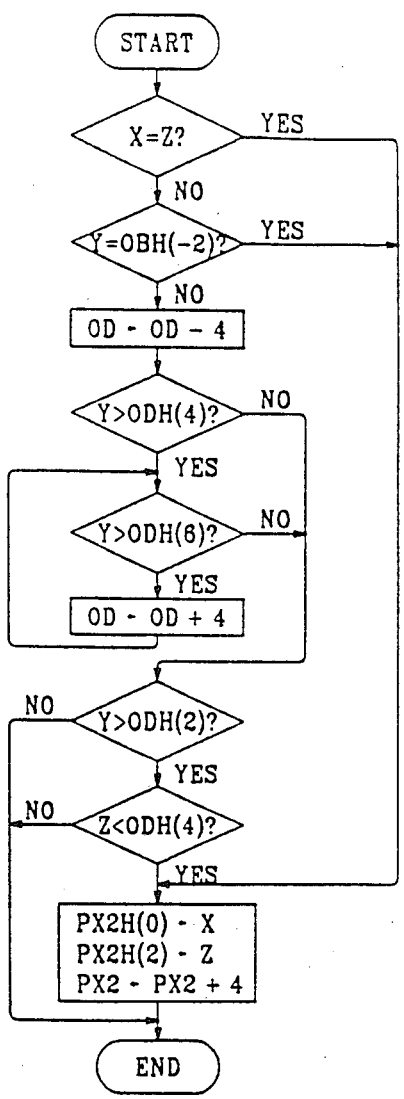
Figure 18:
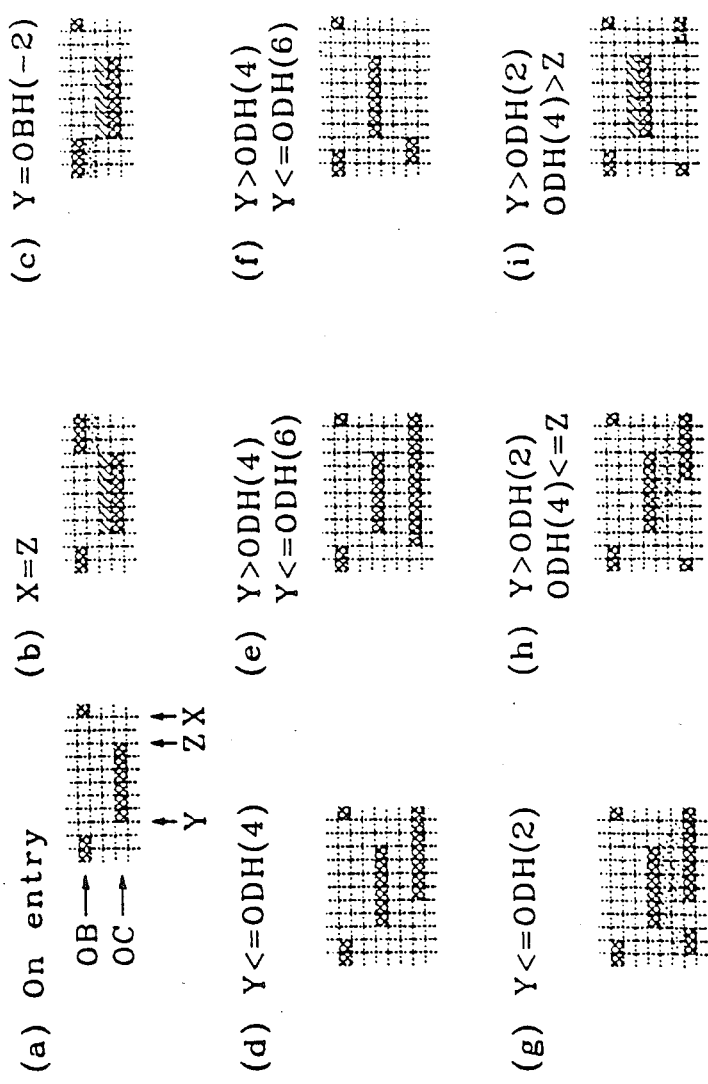

The other procedure for handling an intrusive black run, WPASSHI (FIGS. 17 and 18), is used when a black run projects up into a white area. It is more complicated than WPASSLO, since it must be able to detect an isolated black run in order to interpolate a second black run above it.

The first tests are similar to those performed in WPASSLO; they determine if the intruding black run touches any black run in line B at the corner. If a touching run is found, the black run on line C is duplicated on the second interpolated line by adding the run ends Y and Z to the run end buffer for that line (18b and c).

Otherwise, a search is made for a touching run on line D. Before the search begins, OD is positioned so that $ODH(-2) < = Y$ (no matter what procedures have been used previously). OD is first decremented in case a run which touched the current run at the corner was previously looked at. At this point, then, $ODH(-2) < = Y$. Equality will only occur at the beginning of a line (when $ODH(2) = Y = 0$); in all other cases, the black run which ends at $ODH(2)$ ends before the black run on line C. The test to determine if $Y > ODH(4)$ indicates whether the next black run on line D begins after Y; if so, the white run end ODH(4) corresponds to Y and the search is done (18d). Otherwise, the black run end at ODH(6) is checked to see if it is to the left of Y. If it is, OD is incremented by four (two run ends) and the test is repeated until the first black run end ODH(6) such that ODH(6)> =Y is found. This black run either begins to the right of the black run on line C, or else touches or is attached to the black run on line C; in the latter case the white run end ODH(4) preceding it corresponds to Y (18e and f).

Having found a run end corresponding to Y, it is easily determined whether there is a black run on line D touching the black run on line C. If Y< =ODH(2) there is a black run touching or adjacent on the left end (18g); if ODH(4)< =Z then the white run on line D ends at or to the left of the black run on line C, indicating that there is an adjacent or touching black run on line D (18h). In either case no black runs are placed in the interpolated lines. If neither of these conditions is satisfied, then the black run on line C is an isolated streak and must be duplicated on the second interpolated line (18i).

Figure 19:
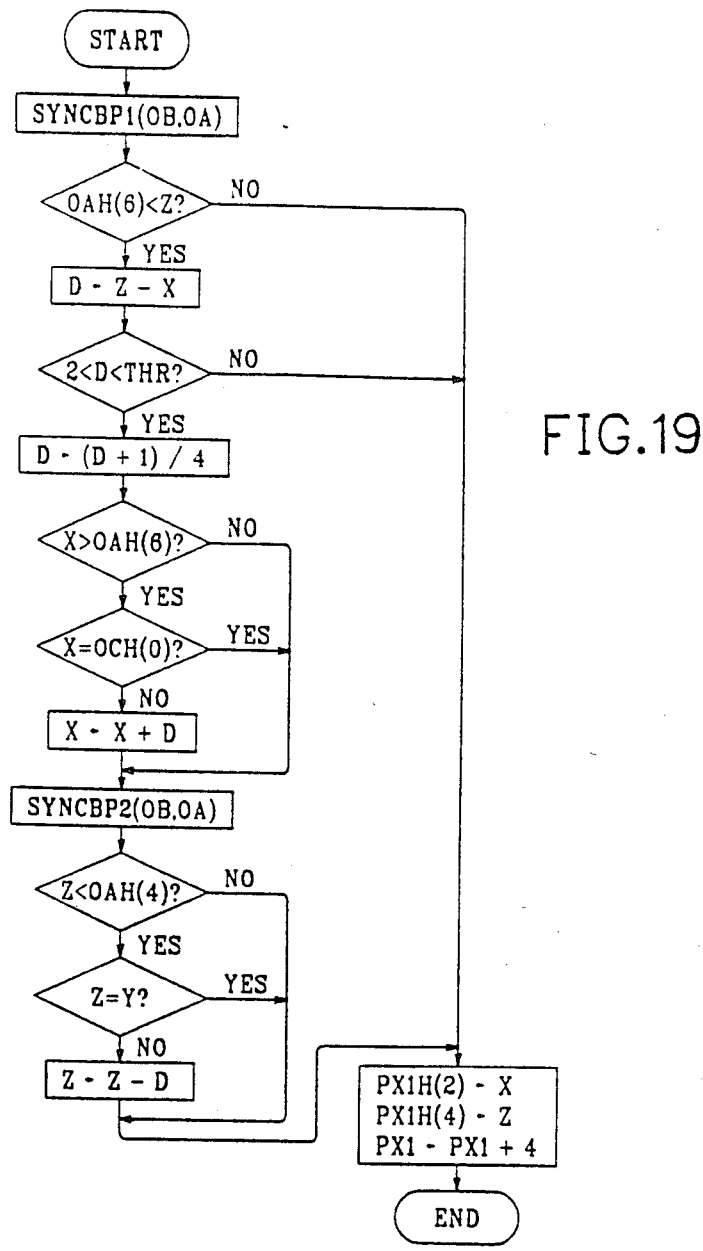
Figure 20:
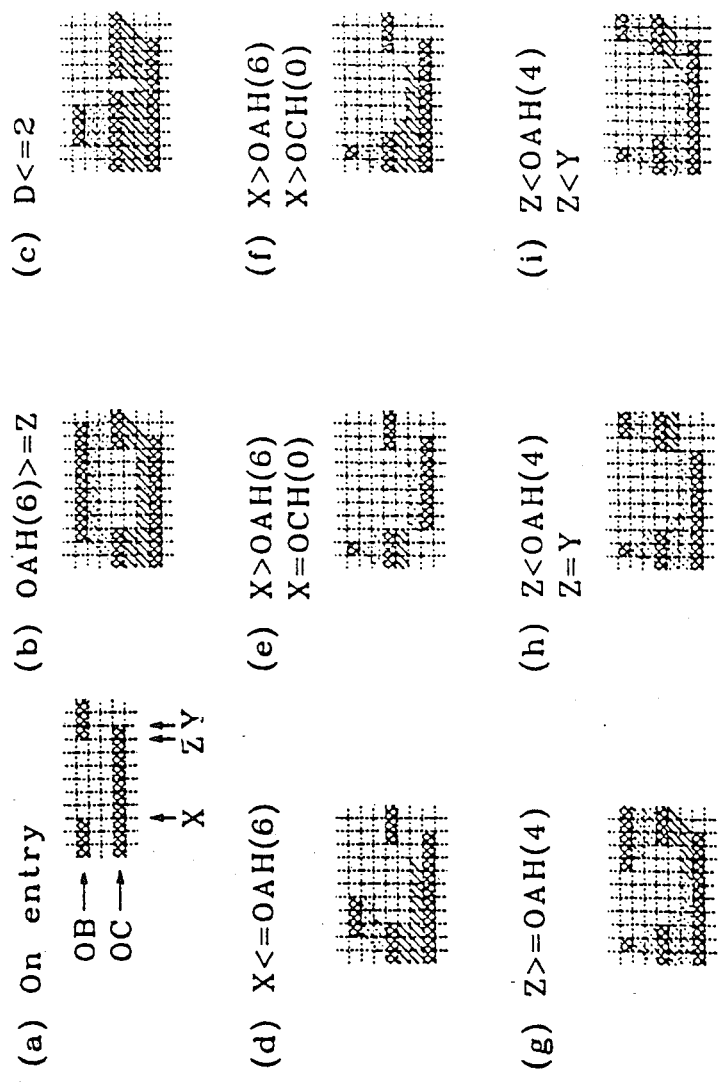

The BPASSLO procedure (FIGS. 19 and 20) handles the case where a white run projects down into a black field. This is illustrated in FIG. 21a. The first step is to find the black run end on line A which corresponds to X, using the SYNCBP1 procedure described above. If this black run on line A extends beyond Z, the end of the white run on line B, then the white run is an isolated streak and the interpolation must transfer its entire length to the second interpolated line so that the streak will be three pels wide (FIG. 20b). Otherwise, the length of the white run is calculated. If it is only one or two pels long, it is duplicated on the second interpolated line (FIG. 20c). If it is longer than a certain threshold (the preferred embodiment uses a threshold of 600 pels), the white run is again duplicated on the second interpolated line. This prevents long straight lines from appearing bowed by making them the same width for their entire length.

If the white run is not isolated and if its length lies between 2 and the chosen threshold, two independent tests are made to determine how to interpolate at the ends of the run. The black field is always extended onto the second interpolated line. The first interpolated line is made white, but black pels may be introduced at either end in order to make a smoother slope. The preferred embodiment allows (1+Z-X)/4 pels (approximately ¼ of the white run length) to be removed from either end of the white run and added to the black field.

At the left end of the white run, the comparison of X and OAH(6) determines whether the black run on line A extends over part of the white streak. If it does, the white run on the first interpolated line must extend out to the left end of the original run so that the white area will be three pels thick (FIG. 20d). The same type of interpolation occurs if X=OAH(6), because in this case there is a square corner which must be preserved. A second test determines whether another white run touches the white run on line B on its lower left corner. If so, then the white run on the first interpolated line must again extend to the left end of the original run to keep the white corners touching (FIG. 20e). Otherwise the white run on the first interpolated line is clipped on the left by ¼ of its length to provide a smoother edge.

The procedure used at the right end of the white run is essentially the same: if the corresponding white run end on line A is less than Z, then a black run extends over the end of the white run and the three-pel thickness must be preserved (FIG. 20g); if the two run ends are equal then a square corner must be preserved; if the intrusive white run touches a white run on line C then the connection must be preserved (FIG. 20h); and otherwise the end of the white run on the interpolated line is clipped (FIG. 20i).

Figure 21:
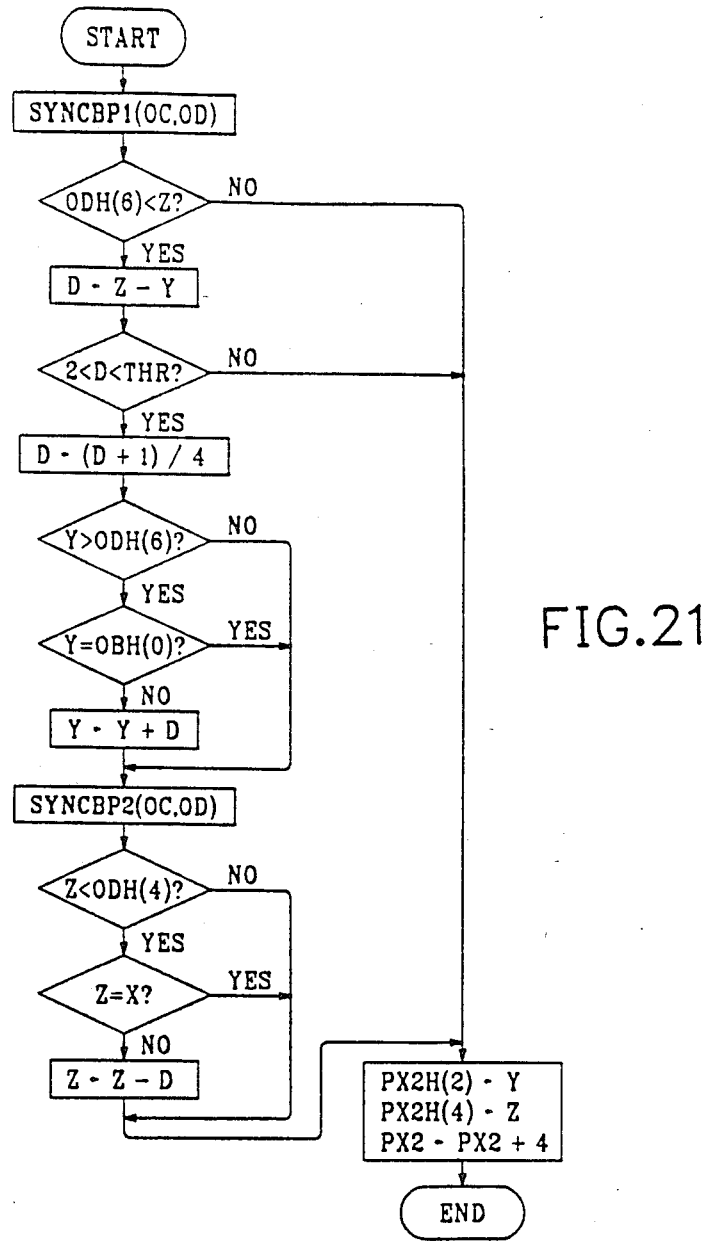
Figure 22:
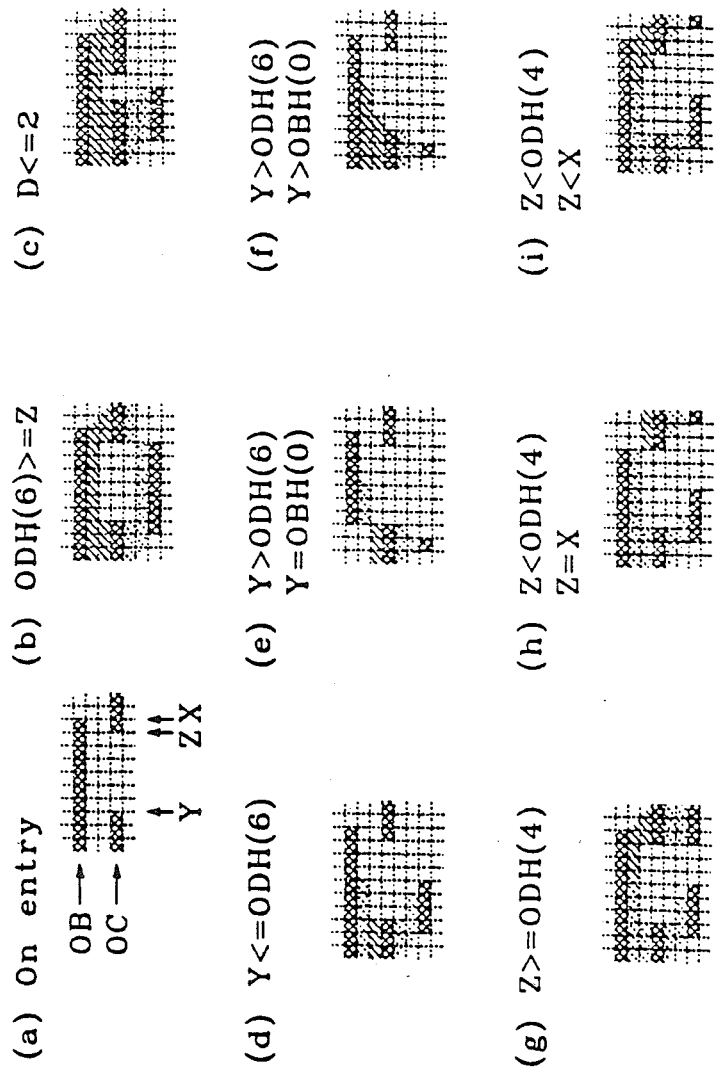

The BPASSHI procedure which processed a white run extending up into a black field is simply a mirror image of the BPASSLO procedure, with X and Y reversing roles, lines B and C reversing roles, and line D being used in place of line A. FIGS. 21 and 22 illustrate this process.

This completes the description of the vertical enlargement procedure.

The horizontal enlargement procedure expands lines (in run end form) in the horizontal dimension for use as input into the vertical enlargement procedure. There are several possible methods for accomplishing this enlargement. The simplest is to take each run end and multiply it by three. This, however, produces marked staircasing on most lines. The procedure may be modified by examining some number by adjacent input lines and selectively adding or removing pels from the ends of runs. This gives better quality output, but still shows staircasing on lines with steep slopes.

A method for performing the horizontal enlargement which gives good quality output is to rotate the image 90 degrees, apply the vertical enlargement algorithm described above, and rotate the image back to its original orientation. The problem with this method is that rotating an image in run end form is time-consuming and may require a great deal of storage.

The method according to the present invention produces images of quality comparable to that obtained by performing the rotations and vertical enlargement, but requires much less storage because it is necessary to keep only a small part of the image in storage at any given time. This procedure reads the run end buffers describing the lines of the original image one at a time. Each line is enlarged by a factor of three by tripling the run end values. A record of the run end locations on previous lines allows the detection of vertical edges. When an edge changes position by one pel, then action must be taken to remove potential staircasing on that edge. The method is to go back to previous expanded lines and add or remove a pel from the edge in order to smooth the line.

The horizontal enlargement method operates entirely on data in run end form; the raster data is not required. In the discussion below, a "line" of image data refers to the run end buffer representing that line.

Figure 23:
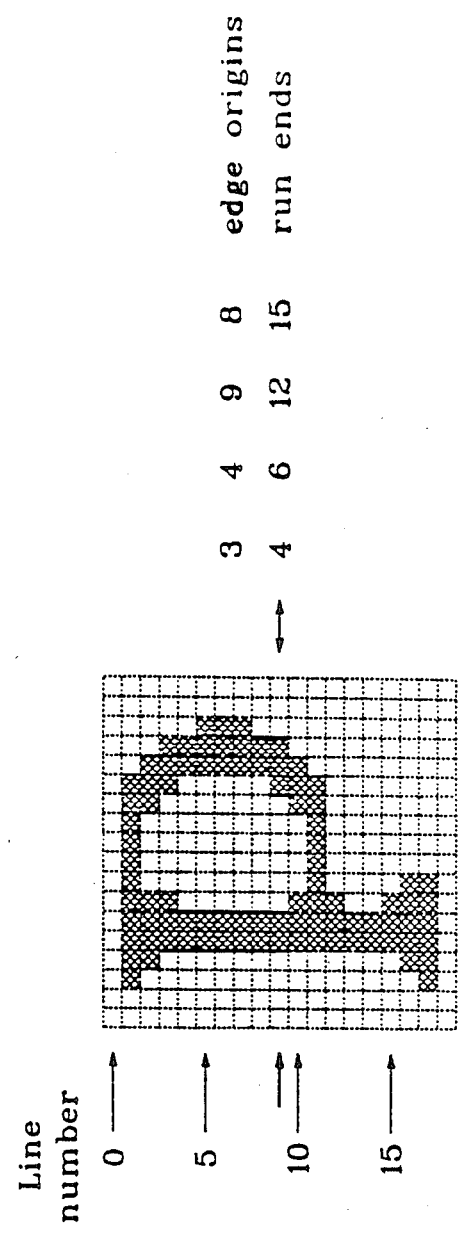
FIG. 23 illustrates the history information required by the horizontal enlargement algorithm to determine where a run at a given pel position last changed position.
Figure 24:
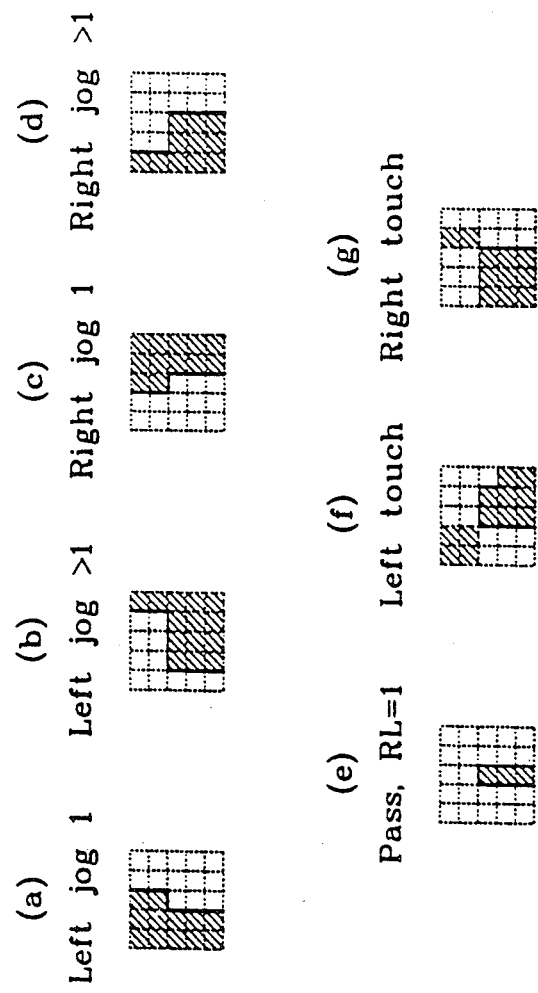
FIG. 24 illustrates the history information required by the horizontal enlargement algorithm to determine what a run at a given pel position did before it shifted to its present position.

In order to maintain a history of recently processed input lines so that edges can be detected and smoothed, several large buffers are used in addition to the variables controlling the enlargement. Two buffers (one for the previous line and one for the line being processed) are used in conjunction with the run end buffers to supply history information for each run end. The information kept is illustrated in FIGS. 23 and 24.

1. A halfword is used to contain the line number where the vertical edge at the given pel position began (FIG. 23).

2. Seven one-bit flags, called F1, F2, F3, F4, F5, F6, and F7, are used to indicate what the edge did immediately before it moved to the present position. The possibilities are illustrated in FIG. 24; the relevant edge is indicated by a dark line, and the edge history is for the run end on the third row.

a. (F1) Was there a left jog of one pel? (If yes, F1=1, otherwise F1=0.)

b. (F2) Was there a left jog of more than one pel?

c. (F3) Was there a right jog of one pel?

d. (F4) Was there a right jog of more than one pel?

e. (F5) Was the feature ending at the given position absent on the previous line (a condition which will be referred to as a pass) and was the run length 1 on the first line of the feature?

f. (F6) Did the upper left corner of the feature touch another feature of the same color at the corner?

g. (F7) Did the upper right corner of the feature touch another feature of the same color at the corner? It is possible for none of the flags to be set. This indicates that a pass occurred and the first line of the feature was more than one pel wide.

A large buffer is used to store the image lines being expanded. To avoid requiring a buffer large enough to hold the whole image or moving the run end buffers when the line buffer becomes full, the image lines are allowed to wrap around to the beginning of the buffer whenever there is not enough space left at the end of the buffer to hold the most complex possible valid line (i.e. alternating black and white pels, requiring two bytes per pel for the run end buffer). Lines no longer needed by the line processor are released for use as input to the vertical triple algorithm. Six pointers are used to keep track of the status of this buffer:

NEXT is the address where the next line is to be read in.

OUT is the address of the next line to be put out.

FIRST is the address of the oldest line still being used by the line processor.

FIRSTV is the address of the oldest line still being used by the vertical enlargement algorithm. It trails OUT by three lines, since the vertical enlargement procedures uses three old lines in addition to the line it reads in.

END is the address of the end of the run end buffer for the last line in the line buffer.

OLIM is the address of the end of the last line which can be put out before either wrapping around to the beginning of the buffer (if OLIM=END) or releasing more lines (if OLIM=FIRST).

In order to keep track of which lines are where in the line buffer, a stack is maintained. Each stack entry consists of a line number and the address where the run end buffer for that line begins. Note that it is not necessary to keep the address of the run end buffer for every line in the stack, since the run end buffers are stored consecutively and care is taken to ensure that there is always a stack entry describing the first line in the line buffer. In order to find the address of a line N in the line buffer, a search is made for the first stack entry whose line number is less than or equal to N. If the line number in the resulting stack entry is equal to N, the line address is simply read from the stack. Otherwise, a pointer P is set to point to the line whose address is given in the stack, a counter CT is initialized with the line number of the line on the stack, and the following procedure is used:

```
begin
  P = P + (length of buffer beginning at P)
  CT = CT + 1
  if CT < N
    repeat
  end
end
```

(According to the run end format used in the preferred embodiment of the invention, "length of buffer beginning at P" is simply the halfword addressed by P.) After execution of this loop, P will contain the address of the desired line. The requirement that the stack must contain an entry for the first line in the line buffer ensures that wraparound will not occur between the line whose address is given in the stack and the desired line.

Figure 25:
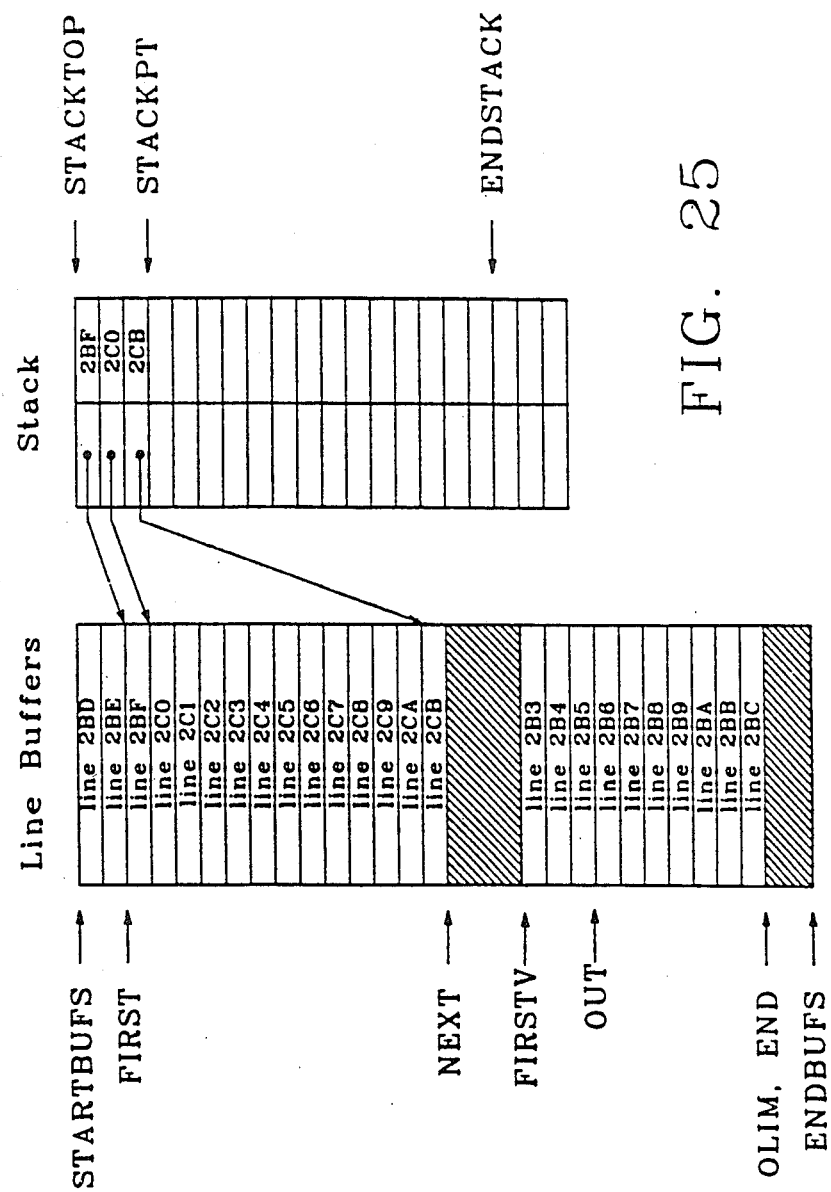
FIG. 25 shows the organization of the line buffer and index stack for the horizontal enlargement.

FIG. 25 shows a possible arrangement of the stack and line buffers. For convenience, the run end buffers are depicted as being all the same size; in practice their sizes will vary. In this illustration the lines 2B6 through 2BE have been released by the horizontal enlargement and will be returned one at a time as the horizontal enlargement function is invoked. The return of sequential buffers will continue until OUT reaches OLIM (the end of the last line in the buffer), at which point OUT will wrap around to the beginning of the buffer and OLIM will be reset to FIRST. After all of these buffers have been returned, new lines will be read in and stored beginning at NEXT.

Figure 26:
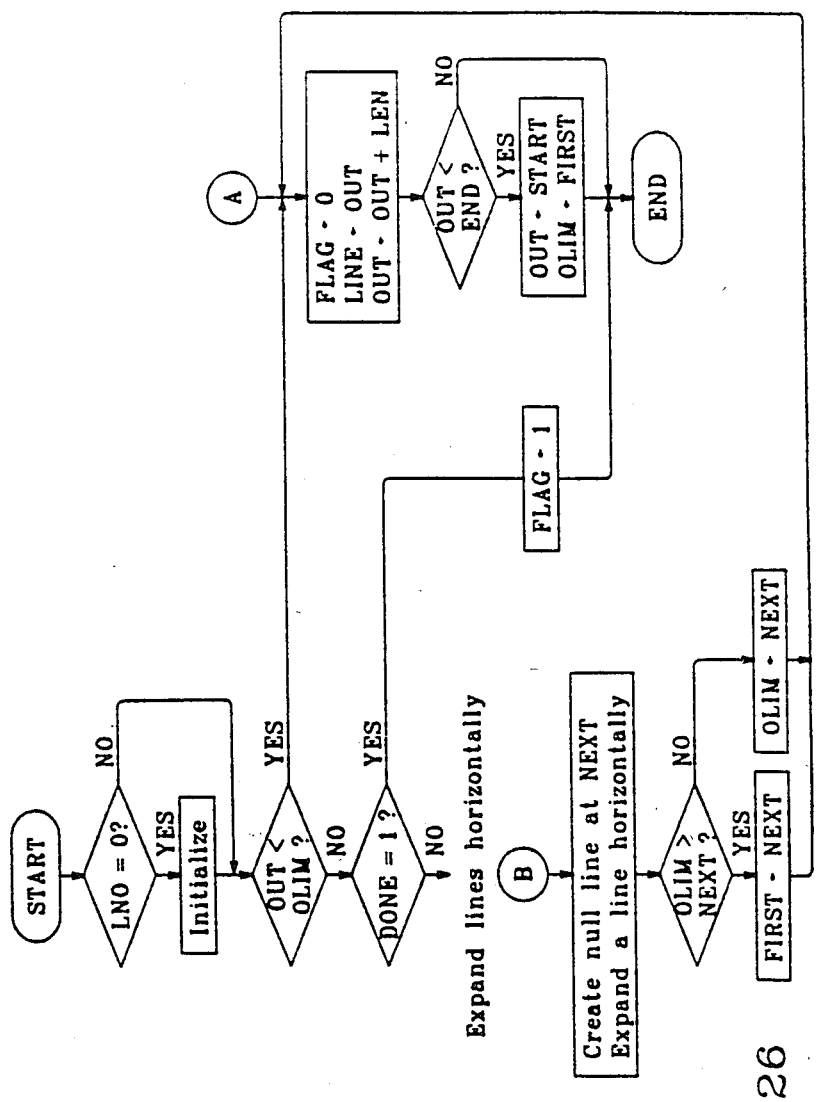
FIG. 26 is a flow chart showing the control code for the horizontal enlargement for the method according to the present invention.

FIG. 26 gives an overview of the main loop of the horizontal enlargement procedure. The number of lines put out by the horizontal enlargement for the current image, LNO, is expected to be zeroed by the calling program before the first use of this procedure on an image; thereafter this procedure maintains the count. A comparison of LNO with zero can therefore be used to indicate whether a new image is being enlarged. If so, the necessary initializations are performed. OUT is then compared to OLIM. If OUT is less than OLIM, one or more lines are ready to be put out. A flag is set to indicate a normal return, the address of the first available line is stored for return to the calling function, and OUT is incremented by the length of the run end buffer to be returned so that it points to the next line. If OUT is equal to END, then it is necessary to wrap OUT around to the beginning of the buffer. OUT is accordingly reset, and the new limiting value for OUT is the address of the first line still being used by the line processor. Control then returns to the calling function.

If there are no lines ready to go out, a test is made to see if the end of the input data has previously been found. If so, the flag is set to indicate an end-of-file condition and control returns to the caller.

If no output lines are completed and the end of the input has not been reached, a loop is entered. This loop reads in and processes lines until it reaches one of several limits (e.g. the end of the available buffer space or the maximum number of lines to be read). In most cases additional output lines will have been created and control will return to the portion of the procedure (labelled A) which returns an output line.

If an end-of-file condition occurs when an input line is requested, the loop will be exited and processing will continue at the point labelled B to finish any lines of the image which are not yet complete. A blank line is added to the input buffer (it is guaranteed that there will be enough room for it since buffer space is obtained before attempting to read input, and that space has not been used since no input was found) and the line processor is called. The blank line causes all vertical edges still being processed to be finished since it contains no vertical edges which might correspond with them. OLIM is then compared to NEXT. If OLIM is greater than NEXT, then OUT is also greater than NEXT and is working its way towards the end of the line buffer. FIRST therefore receives the value of NEXT so that when OUT wraps around the new limit will be the end of the available data. If OLIM is not greater than NEXT, then OLIM is reset to NEXT so that all of the lines up to that point can be put out.

The initializations for the horizontal enlargement function are as follows:

1. Line buffer initialization STARTBUFS and END-BUFS are set to point to the beginning and end of the line buffer respectively. OUT, NEXT, FIRSTV, FIRST, and OLIM are all set to point to the beginning of the line buffer. ILIM, the end of the contiguous space beginning at NEXT which is available for input, is set to ENDBUFS.

FIRSTLNO and WRAP are set to zero.

2. Stack initialization

STACKTOP is initialized to point to the top of the stack.

ENDSTACK is initialized to point to the fourth entry from the end of the stack. A test against END-STACK will be used to determine whether the stack is about to overflow.

Two entries for line zero, the address of which is the beginning of the line buffer, are placed on the stack. Two entries are necessary because the one on the top of the stack will be overwritten by entries for other lines, and it is necessary to ensure that there is an entry for line zero on the stack.

STACKPT is set to point to the top entry on the stack.

3. Reading of first input line

CUR (the line number of the input line to be processed) is set to one and the first input line is read. If an error or end-of-file occurs, an error code is returned to the caller. Otherwise, the number of pels in the input line is read from the last entry in the run end buffer and stored as ICOLS (for use in ensuring that later input lines contain the same number of pels). This value is tripled to obtain NCOLS, the number of pels per horizontally enlarged line. The maximum amount of storage which may be required to contain a run end buffer representing the given number of pels is calculated as (2*ICOLS)+20 (two bytes per possible run end plus extra halfwords for the length, leading zeroes, and trailing copies of the last run end). The address of the end of the run end buffer is stored as NEXT, the address to which the next input buffer is to be read. Finally, the size of the line buffer is checked to make sure that it is at least 6*BUFSIZE. This will ensure that four lines of data for the vertical triple algorithm can be accommodated at all times.

4. Initialization of line processor variables CURPC, the pointer to the current run end buffer, is set to point to the (first) line in the line buffer.

CURPXC and NEXTPXC are set to point to the auxiliary buffers which will contain the history information. For each run end in the first image line, a history entry is created in the buffer addressed by CURPXC. The edge origins are all set to zero, as are all of the flags except for F5 (pass mode with a run length of one) in cases where a run is one pel long.

Figure 27:
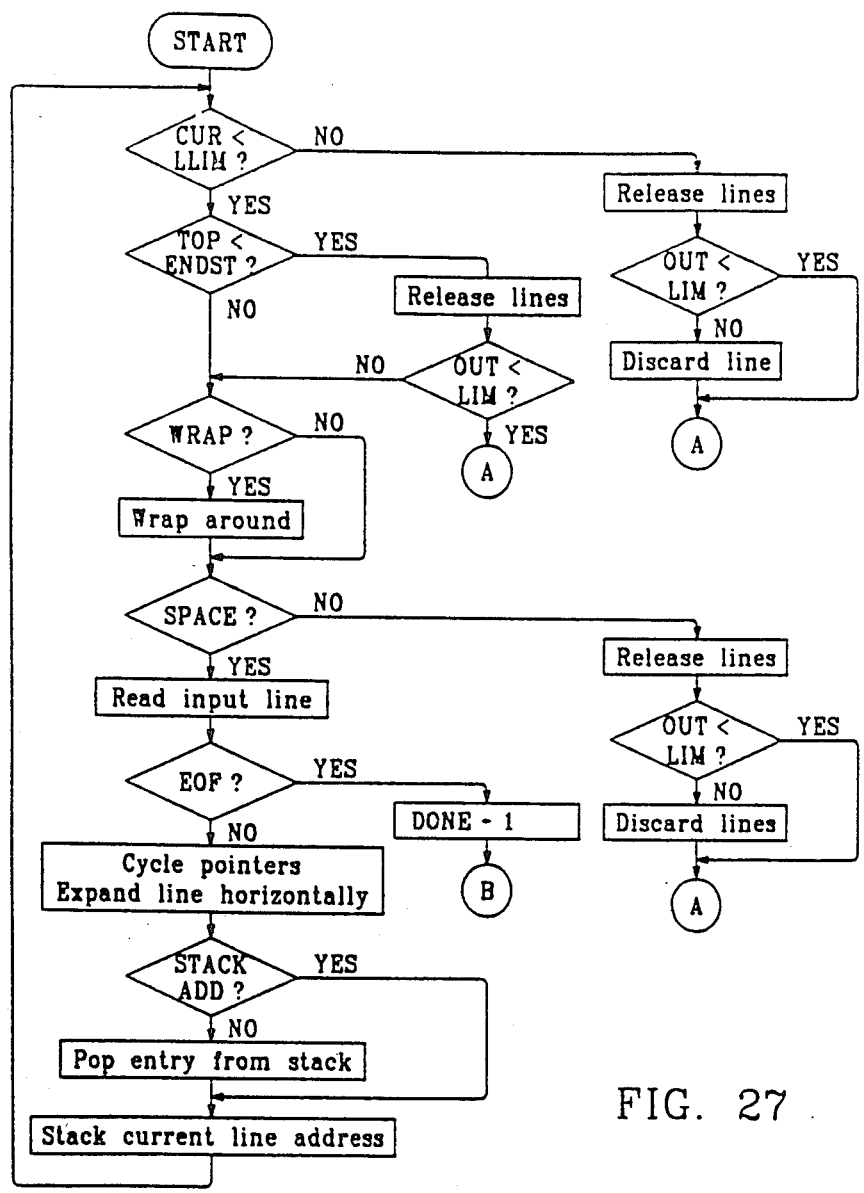
FIG. 27 is a flow chart showing the loop used to enlarge lines horizontally.

FIG. 27 outlines the loop used to expand lines horizontally. Detailed discussions of the various steps will be given below.

The comparison of CUR and LLIM indicates whether all allowed input lines have been read. If so (CUR> =LLIM), the procedure FINISHLINES is called to release any output lines which have been completed. If no lines are available, the first expanded line (addressed by FIRST) is released and the next line becomes the new FIRST. Control returns to the procedure which puts out an output line.

The seconds test checks to see whether the stack is about to overflow. If it is, then FINISHLINES is called to release any available output lines and compress the stack (discarding entries for lins before line FIRSTLNO and removing alternate entries from those remaining). If any output lines are freed by FINISH-LINES, a branch occurs to the code to return a line; otherwise the loop continues.

If the amount of free space following NEXT is limited by the end of the line buffer (ILIM=ENDBUFFS) and is not sufficient to contain an arbitrary input line (i.e. there are fewer than BUFSIZE bytes available), then NEXT is wrapped around to the beginning of the buffer. The procedure (not illustrated) is as follows. END receives the value of NEXT, so that it points to the end of the last line buffer. NEXT is then reset to STARTBUFS, and WRAP receives the value CUR+1 (the line number of the line to be read in). Two entries consisting of the line number WRAP and the line address NEXT are stacked (one "permanent" entry and one to be overwritten as new lines are read in). Finally, ILIM is reset to address the older of the lines pointed to by FIRST and FIRSTV.

If the amount of free space following NEXT is limited by lines in the line buffer which are still in use or have not yet been put out, then FINISHLINES is called to release any available output lines. If no lines can be freed, then it is necessary to release enough lines to obtain BUFSIZE bytes of storage for a new line. Control returns to the procedure which returns an output line.

At this point there is enough space available to read in and process an input line. The next available line is read; an error condition causes an error code to be returned to the caller. (If the number of pels in the line represented by the run end buffer is not equal to ICOLS, this is an error.) If an end-of-file condition occurs, a flag is set and the line expansion loop is exited.

If a new input line is successfully read, then several pointers are updated. Specifically, PP takes the value of CURPC (the previous line) and CURPC is set to address the new line; NEXT is set to point to the end of the run end buffer for the new line; and CURPXC and NEXTPXC (the auxiliary buffer pointers) are swapped. CUR and PREV, the line numbers of the current and previous lines, respectively, are also incremented by one. The new line is sent to the line processor. Finally, an entry for the new line (consisting of its line number and the address of the line buffer) is added to the stack. If the previous line number is not a multiple of some value K (K=16 in the preferred embodiment of the invention), then the top entry on the stack is popped before the new entry is added. The result of this is that the stack will contain an entry for every Kth line, plus an entry for the most recently processed line. (This pattern may be disturbed slightly when the FINISHLINES procedure is used.) Addition to the stack occurs after a line is processed by the line processor, since that procedure uses the stack and will never need the entry for the line being processed, while it may be able to use the entry for the previous line.

If a line is successfully processed, the loop repeats.

Figure 28:
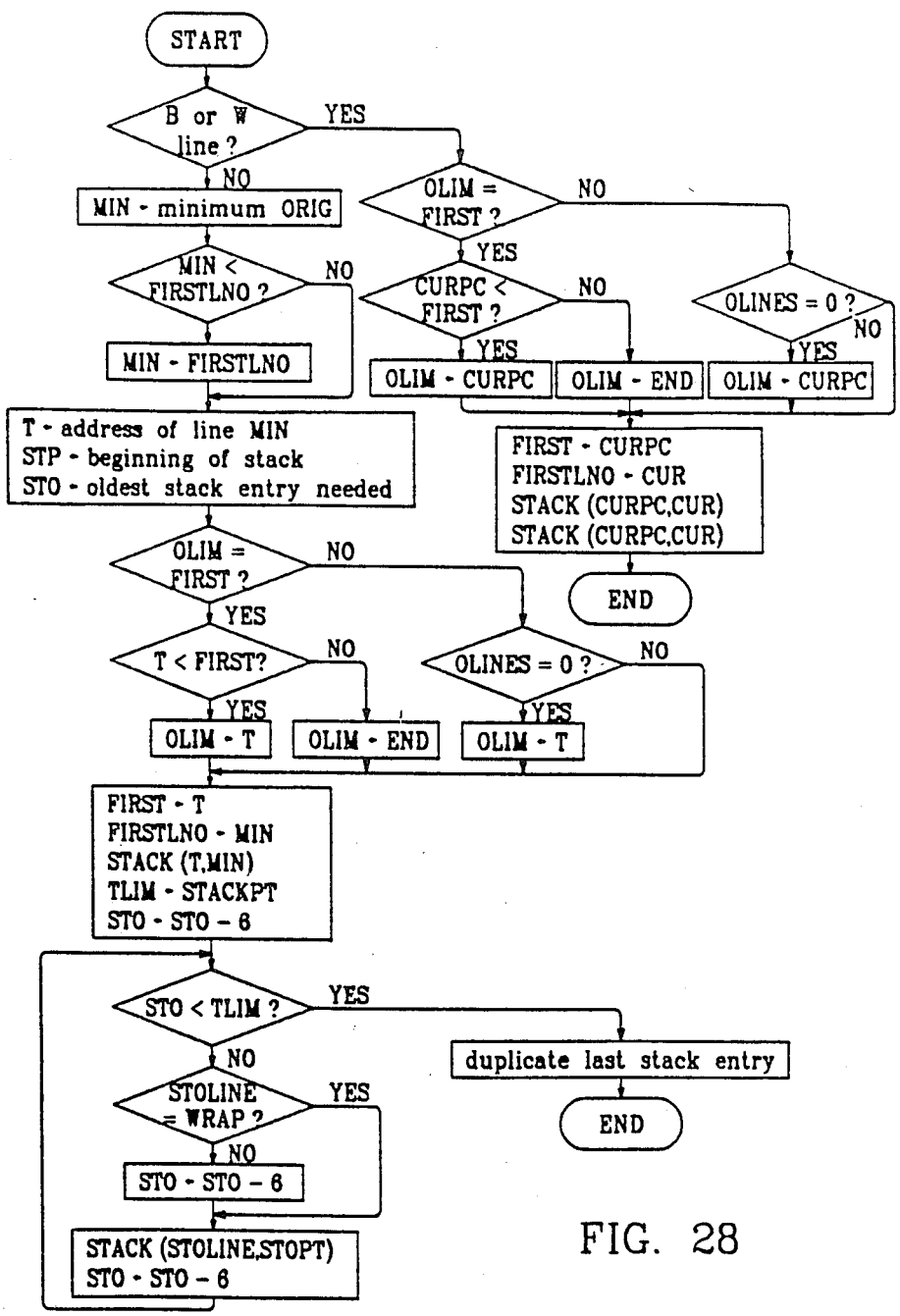
FIG. 28 is a flow chart showing the procedure used to release horizontally expanded lines for output and compress the index stack.

The procedure FINISHLINES, used to release available output lines and compress the stack, is illustrated in FIG. 28. It begins by looking at the current line to see if it contains any run ends other than 0 and NCOLS. If it does not, then all lines up to the current line can be released. The current line is not released since this could produce unexpected relationships among the pointers. The procedure in this case is fairly simple. First, OLIM is reset. If OLIM is not equal to FIRST, then either this is the first cycle through the buffer (OLINES=0), in which case OLIM is set to point to NEXT, the address of the end of the last buffer; or else OLIM=END, in which case OLIM is not disturbed. If OLIM=FIRST then there are input lines still being used beyond the end of the lines which have been released. If the current line follows FIRST in the buffer, then OLIM is set to point to the current line, allowing all of the lines up to that point to be put out. If the current line preceded FIRST, then the line output process will have to wrap around before reaching the current line. OLIM is therefore set to point to the end of the data in the buffer; the line output process will reset it later to pick up any additional lines at the beginning of the buffer. After OLIM has been reset (if appropriate), the current line becomes the first line and two copies of its address are stacked (one "permanent" copy and one to be overwritten as succeeding lines are processed).

If the current line contains run ends other than 0 and NCOLS, it is necessary to find the oldest line which can still be modified by the line processor. The line number can be obtained by finding the minimum of the ORIGW and ORIGB values in the current history which do not correspond to a run end of 0 or NCOLS. The address of the line buffer is found by searching the stack for the first entry for a line number less than or equal to the required value, and then counting through the run end buffers if necessary to get to the correct line.

Before FIRST is altered, OLIM must be reset. The procedure is the same as that for the empty line case, except that the address of the first line still required by the horizontal enlargement is used in place of the address of the current line. If OLIM is not equal to FIRST, then either this is the first cycle through the buffer (OLINES=0), in which case OLIM is set to point to NEXT, the address of the end of the last buffer; or else OLIM=END, in which case OLIM is not disturbed. If OLIM=FIRST then there are input lines still being used beyond the end of the lines which have been released. If the first line still needed follows FIRST in the buffer, then OLIM is set to point to this line, allowing all of the lines up to that point to be put out. If the first line still preceded FIRST, then the line output process will have to wrap around before reaching the current line. OLIM is therefore set to point to the end of the data in the buffer; the line output process will reset it later to pick up any additional lines at the beginning of the buffer. After OLIM has been reset (if necessary), FIRST and FIRSTLNO are replaced with their new values.

The stack is then compressed by a loop which maintains two pointers, one to the original stack entries beginning at the stack entry found while searching for the address of the first line to be kept, and the other beginning at the top of the stack and serving to index the entries of the compressed stack. An entry for the first line which is being kept is placed on the new stack. Then the first pointer is counted down two stack entries at a time, the second one entry at a time, until the end of the old stack is reached. Data from the original stack is copied up into position in the new stack at each stage. If the new FIRSTLNO is less than WRAP, then the original stack contains an entry for the wrap line and this entry must be transferred to the new stack; in this case the stack entries to be discarded are first checked to make sure that this entry is not lost. (The illustration shows the stack compression loop with this check included; an alternate loop omitting it may be entered if FIRSTLNO>=WRAP.) After the stack is compressed, a second copy is made of the last entry; this copy may be overwritten as more lines are processed.

Figure 29:
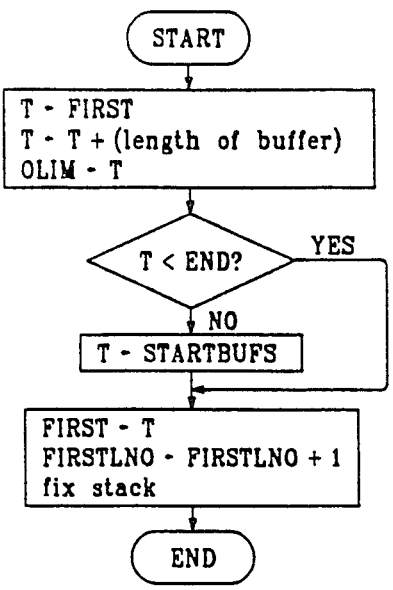
FIG. 29 is a flow chart showing the method used to release a line for output before the horizontal line processor has necessarily completed all alterations to the line.

If all allowed input lines have been read in and FINISHLINES cannot release any lines, then it is necessary to send out the next line even if it is not completely processed. This may affect the output image quality (if the line processor later attempts to alter it). FIG. 29 shows the procedure used to discard one line. The end of the buffer describing the line to be released is addressed by a temporary pointer T, and OLIM is reset to point to that position. T will be the address of the beginning of the new first line unless the line released is the last line in the buffer. In this case (T=END) it is necessary to wrap T around to the beginning of the buffer to obtain the address of the new first line. T is then stored as the new value of FIRST and the line number of the first line is incremented. Finally, the stack is modified so that it contains an entry for the new line FIRST. This must be done because if it becomes necessary to address line FIRST and there is no entry for it in the stack, the address of the released line will be looked up and an attempt will be made to count up through the buffer to reach line FIRST. Since there is no guarantee that the buffer describing the released line will be intact, this should not be allowed to happen. To fix the stack, the entry describing the first line whose line number is less than or equal to the new FIRSTLNO is found and replaced with an entry for line FIRSTLNO.

Figure 30:
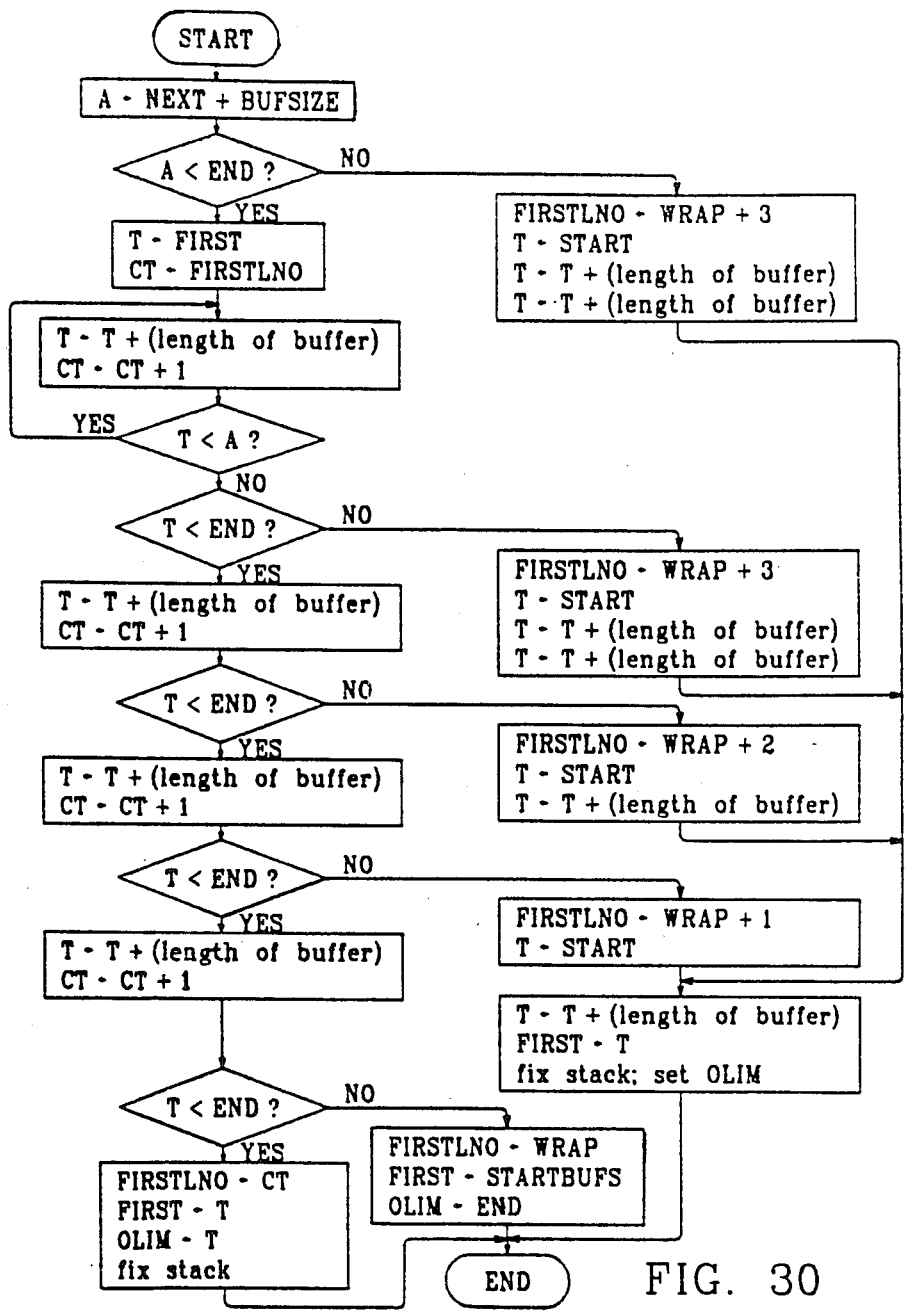
FIG. 30 is a flow chart showing the method used to release a group of lines for output before the horizontal line processor has necessarily completed all alterations to the lines.

If there is not enough space for a new input line, the available space is limited by lines in the line buffer which have not been released, and FINISHLINES cannot free any space, then it is necessary to send out enough lines to make room for the new input line, even if the lines to be released have not been completely processed. FIG. 30 shows the procedure used to discard lines. The address of the end of the area of storage needed for the new line is obtained. If this address is greater than or equal to END, then it is necessary to free all lines up to the end of the buffer. An additional three lins at the beginning of the buffer must be released because the storage required will not be available for storing new lines until after the vertical enlargement algorithm is finished with the released lines. Accordingly, FIRST and FIRSTLNO are reset to the address and line number, respectively, of the fourth line in the buffer, an entry for the new first line is added to the stack, and OLIM is set to either END (if OUT is greater than FIRST, i.e. it has not wrapped around yet) or FIRST (if OUT has already wrapped around). Control then passes to the procedure to return an output line.

If the address of the end of storage required is less than END, then it may be possible to keep some of the input lines beyond the area where new lines are being read in. A temporary pointer T and counter CT are set with the address and line number, respectively, of the current line FIRST. A loop is entered which steps through the line buffer until a line which begins after the end of the space to be freed is found. Three additional lines are then stepped over; if wraparound occurs during this process then it is necessary to discard one or more lines at the beginning of the buffer, reset FIRST and FIRSTLNO to indicate the appropriate line at the beginning of the buffer, place an entry for the new first line on the stack, and reset OLIM to either END or FIRST (depending on whether OUT has wrapped around or not). If no wraparound occurs, T and CT will give either the end of the lines in the line buffer and the wrap line (if T is not less than END) or the address and line number of the first line which may be kept. If T is not less than END, the wrap line becomes the new line FIRST; its line number and address are stored as FIRSTLNO and FIRST. OLIM is set to point to the end of the last line in the line buffer, so that output will continue up to that point. If T is less than END then T and CT are stored as the address and line number of the new line FIRST, and the output limit OLIM is set to point to the beginning of that line. An entry for the new line FIRST is then placed in the stack. Control return to the portion of the main loop which returns an output line.

Figure 31:
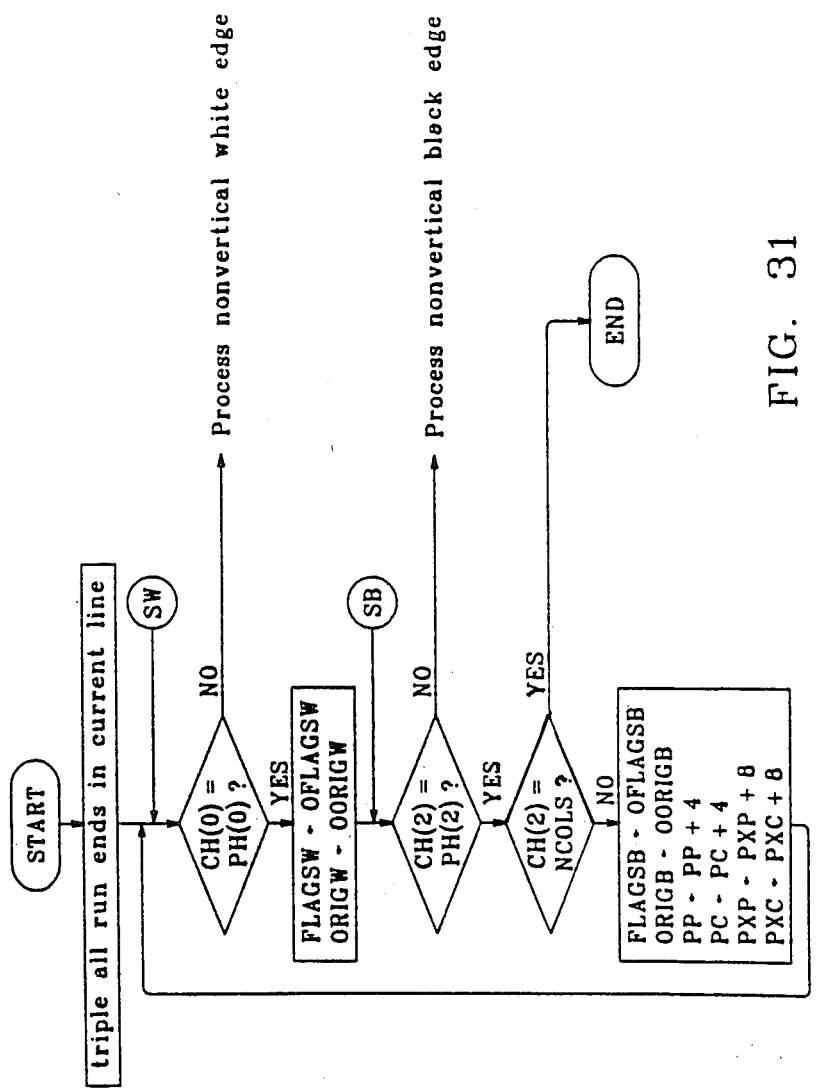
FIG. 31 is a flow chart showing the horizontal enlargement process according to the method of the present invention.

FIG. 31 shows the main loop for the line processor. This loop reads through all of the run ends in the buffer describing the current line, updates the history, and may go back and alter earlier lines if a run end changes position. The alteration of run ends (adding or removing a pel) is what produces the smoothing in the vertical dimension.

This loop uses four pointers to address the run end buffers for the current and previous lines (PC and PP respectively) and the associated history buffers (PXC and PXP). The halfword vectors CH and PH are based on PC and PP; they contain the run ends. White run ends are indexed by numbers divisible by four, black run ends by indices which are not divisible by four (e.g. CH(4) is a white run end and PH(2) is a black run end). The variables ORIGW, FLGW, ORIGB, and FLGB are based on PXC. These are the origin lines and flags for the new line. The variables OORIGW, OFLGW, OORIGB, and OFLGB are the corresponding variables associated with the history (old) line. In the preferred embodiment of the invention the origin line values are halfwords and the flags are butes containing the seven bit flags F1 through F7. Four bytes are allocated for the history for each color, so a total of eight bytes per pair of run ends are used.

In the discussion below, the collections of flags FLGW, OFLGW, FLGB, and OFLGB are tested as a unit in some cases. In other cases individual bit flags are tested. The flag names are prefixed with "O" if they refer to the history line flags, and "W" or "B" is added as a suffix to specify the color intended. Thus OF1B would be the flag which indicates whether the black edge (B) on the history line (O) was preceded by a left jog of one (F1).

Before this loop is entered, all of the run ends in the run end buffer for the current line are multiplied by three. This produces a line which has been enlarged by exactly a factor of three; pels may be added to or removed from the run ends as subsequent lines are processed.

The main loop begins by comparing two white run ends, one from the previous line and one from the current line. If they are equal, then a vertical edge continues from the previous line to the current line, so the history information for the previous line is copied into the current line history buffer. If the two run ends are not the same, then one of a group of procedures is selected to handle the particular pattern which occurs. These procedures will be described in greater detail below. Control may return to either of the points labelled SW and SB ("start white" and "start black"), depending on the procedure used. In some cases a subprocedure will cause an exit from the loop (if the end of the run end buffer for the current line is encountered).

After the white run ends are processed, two black run ends are examined. Again, equality indicates that a vertical edge is continued on the current line. A test is then made to see if the end of the current line has been reached. If so, processing is complete and an exit from the loop occurs. (The history for the last black run end is not updated in this case; the information it will contain is irrelevant since the black run end at position NCOLS cannot be altered.) If the end of the line has not been reached, the history information for the black edge is copied into the current history buffer, the pointers PP and PC are incremented to point to the next white/black run end pairs on the previous and current lines, and the pointers PXP and PXC are incremented to point to the corresponding history data. The loop then repeats.

The procedures for processing the cases where a vertical edge begins, ends, or shifts position use four subprocedures for altering earlier lines to smooth edges. These procedures are:

INCW Add pels to white run ends (increment run ends)

DECW Clip pels from white run ends (decrement run ends)

INCB Add pels to black run ends (increment run ends)

DECB Clip pels from black run ends (increment run ends) Each of these procedures requires two arguments, START (the line number of the first line to be modified) and CT (the number of lines to be modified). The run end is read from the previous line buffer.

Figure 32:
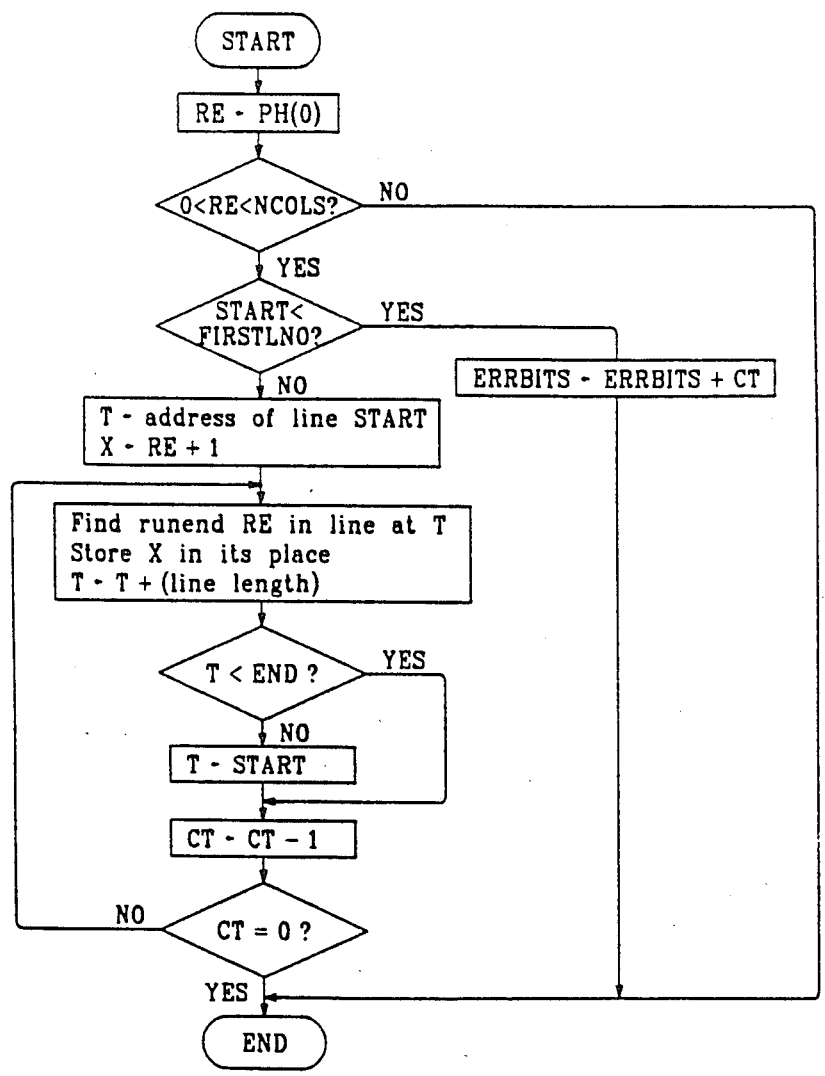
FIG. 32 is a flow chart showing one of the procedures used to modify run ends on horizontally expanded lines.

FIG. 32 shows the INCW procedure as a representative example. The run end RE, giving the position of the vertical edge to be shifted, is read from the previous line buffer. (For the DECW and DECB procedures, the black run end PH(2) would be read.) If the run end is not between 0 and NCOLS exclusive no action occurs. This prevents the modification of the run ends at the edges of the image (e.g. the edge of a black field is not "pulled in" to allow a single column of white pels to appear at the border). START is then compared with the line number of the first line which is still available for modification. If START is smaller, then a request has been made to change lines which have already been sent out to the vertical enlargement procedure. No modification occurs, and the number of lines which were to be changed is added to the counter ERRBITS. This counter gives the number of pels in the output image whose values differ from those they would have if the input line buffer was effectively infinite.

Having ascertained that the modification is necessary and possible, the process of changing the run end buffers begins. The first line to be modified is addressed by a temporary pointer T by looking up a line address in the index and then stepping through the line buffers, if necessary, until the correct line is found. The value X with which the run end is to be replaced is calculated. (For the DECW and DECB procedures, X would be calculated as RE−1). The loop which modifies one line on each iteration is then entered. This loop searches the run end buffer addressed by T for the run end RE, and replaces it with X. Since the run end is known to be white (or, in the case of INCB and DECB, black), it is only necessary to search half of the entries in the buffer. T is then incremented by the length of the run end buffer it addresses and compared to END. If T=END then T must be wrapped around to the beginning of the line buffer. Finally, the number of lines to be modified is counted down by one; if the count is still greater than zero, the loop is repeated.

The remainder of the figures detail the procedures used to handle cases in which a vertical edge shifts. These will be described in sequence. Each description involving line modification refers to one or more flowcharts and an accompanying illustration which shows what the various tests indicate. The illustrations are drawn on a grid, each square of which represents a single pel. The doubly-crosshatched areas represent the black runs in original image columns (the center column of each group of three columns in the line represented by the tripled run ends). The areas which are singly crosshatched show pels interpolated by the tripling of the run ends and modified according to the prescribed smoothing operation. Solid lines indicate the edges along which interpolated pels have been added or removed.

The procedures may be broken down as follows:
Comparisons of two white run ends
History left of current run end (PH(0)<CH(0))
History right of current run end (CH(0)<PH(0))
Comparisons of two black run ends
History left of current run end (PH(2)<CH(2))
History right of current run end (CH(2)<PH(2))
Four corners with black on upper left
Four corners with white on upper left Procedures implementing the first two major groups are entered from the main loop of the line processor. The "four corners" cases arise after processing by one of the comparison routines or by another "four corners" routine; they ensure that if two runs of the same color touch at a corner, this same characteristic is preserved in the enlarged image.

Figure 33:
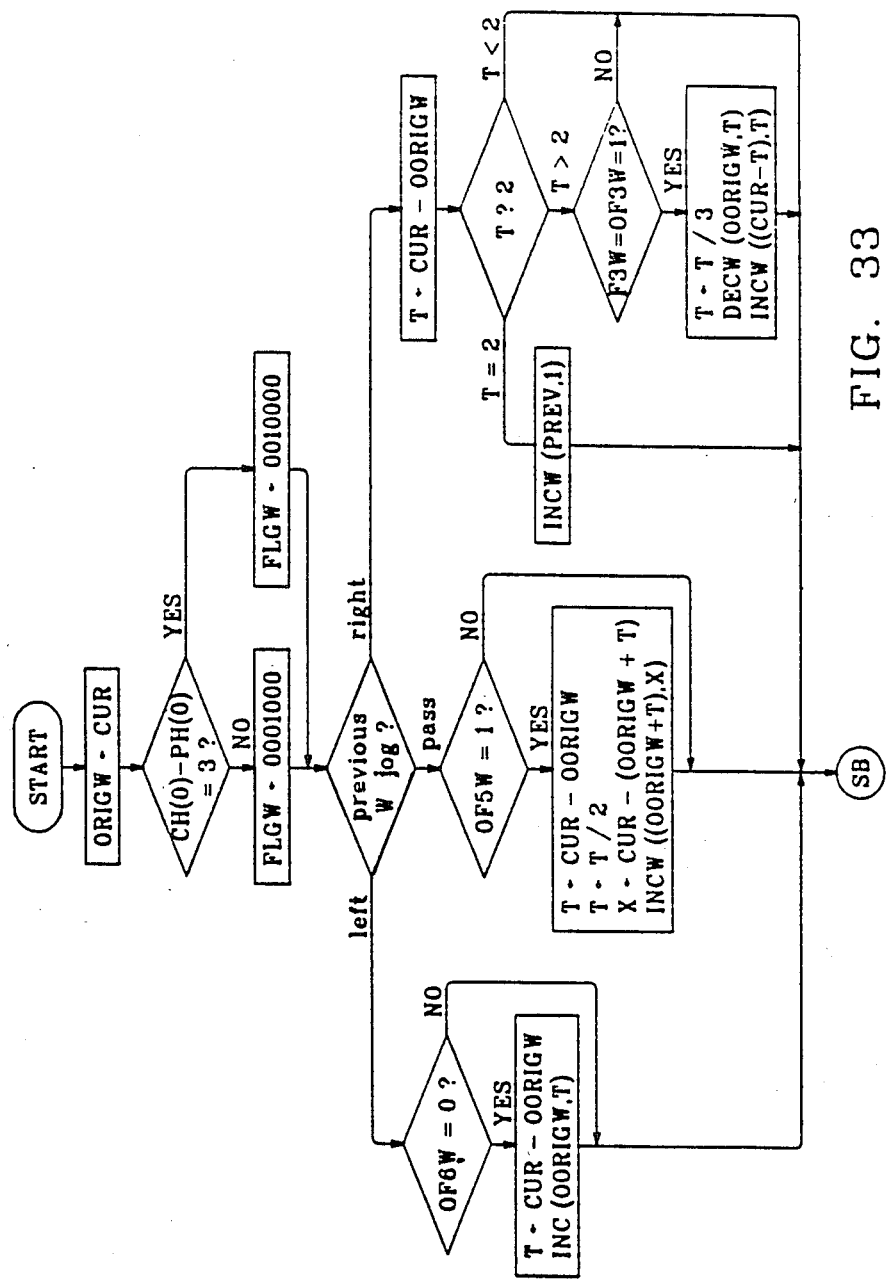
FIG. 33, 35, 36, 38, 40, 41, 43, 44, 46, 48, 49, 50, 52, and 53 are flow charts describing subprocedures used in the method illustrated in FIG. 31.

The processing for comparisons of two white run ends will be described first. If the condition PH(0)<CH(0) holds, then the white run on the current line ends to the right of the white run on the previous line. The location of the next block run end on the previous line is then examined. If CH(0)<PH(2), then that run ends to the right of the white run on the current line, and the two white run ends define the same edge of some feature of the image. FIG. 33 illustrates the processing requiring for this situation; the runs appear as in FIG. 34a. The current line number is stored as the new ORIGW, and the flags in the new history buffer are set. Since the white edge shows a right jog, either FG3 or FG4 is set, depending upon whether the width of the jog is one or greater than one. (The test for a jog of length one is done by comparing the width of the jog to three because the original run lengths have all been multiplied by three.) There is clearly no left jog or pass mode, no run touches the white run ending at CH(0) on the upper right, and this procedure would not be executed if a run touched the black run beginning at PH(0) on the lower left (since one of the "four corners" routines would handle that case), so all of the other flags are zero.

Figure 34:
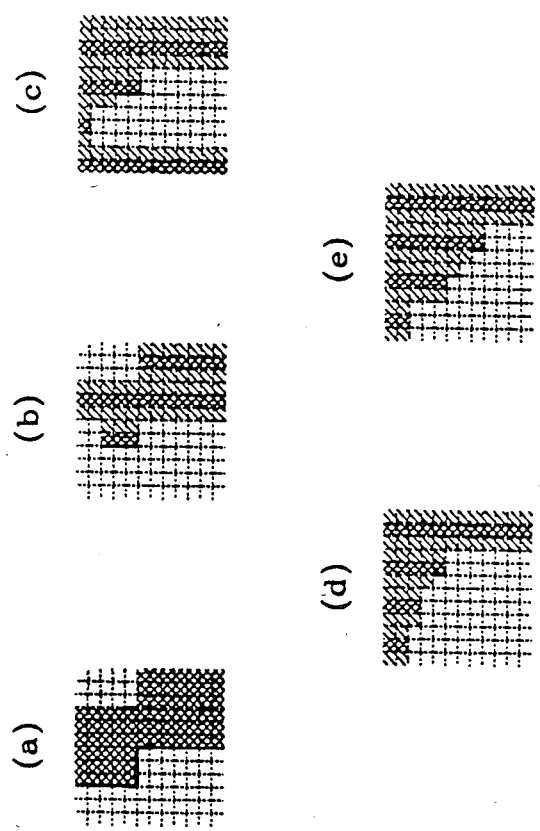
FIGS. 34, 37, 39, 42, 45, 47, 51, and 54 are illustrations of the application of these subprocedures.

After the flags are set, the old flags are examined to determine what the edge did immediately before the beginning of the edge which has ended on the previous line. If OFGW1 or OFGW2 is set, there was a left jog; if OFG3 or OFG4 is set, there was a right jog; otherwise there was a pass. If a left jog occurred, then a column of one or more black pels protruded left into a white field (FIG. 34b). In this case, if there is no black run touching the protrusion on the upper left (OFG6W=0), then the edge of the protrusion is pushed to the right by one pel as shown in FIG. 34b, deemphasizing the bump.

If a pass condition preceded the current shift in the position of the edge of the white feature, then a white field intrudes up into a black region. A test is made to determine whether the width of the intrusive run at the top was one or greater than one. If it was greater than one, the square corner is preserved. If the width is one, then the edge of the white area is smoothed by adding single white pels to the runs for the last half of the lines containing the edge (FIG. 34c).

If another right jog preceded the present right jog, then the length of the vertical edge is determined (by subtracting the origin OORIGW from the current line number CUR). If the edge length is one than no modification is needed. If the edge length is two, then a black pel is clipped from the beginning of the intruding run (FIG. 34d). As in the vertical interpolation, this has the effect of smoothing the edge and also slightly increasing the amount of white space. Finally, if the edge length is greater than two, the size of the right jogs is examined. If either is more than one pel long, then a square corner is recognized and left unchanged. If both jogs are a single pel, then the edge has a steep vertical slope. It is smoothed by clipping white pels from the top one-third of the lines and adding white pels to the bottom one-third (FIG. 34e).

Figure 35:
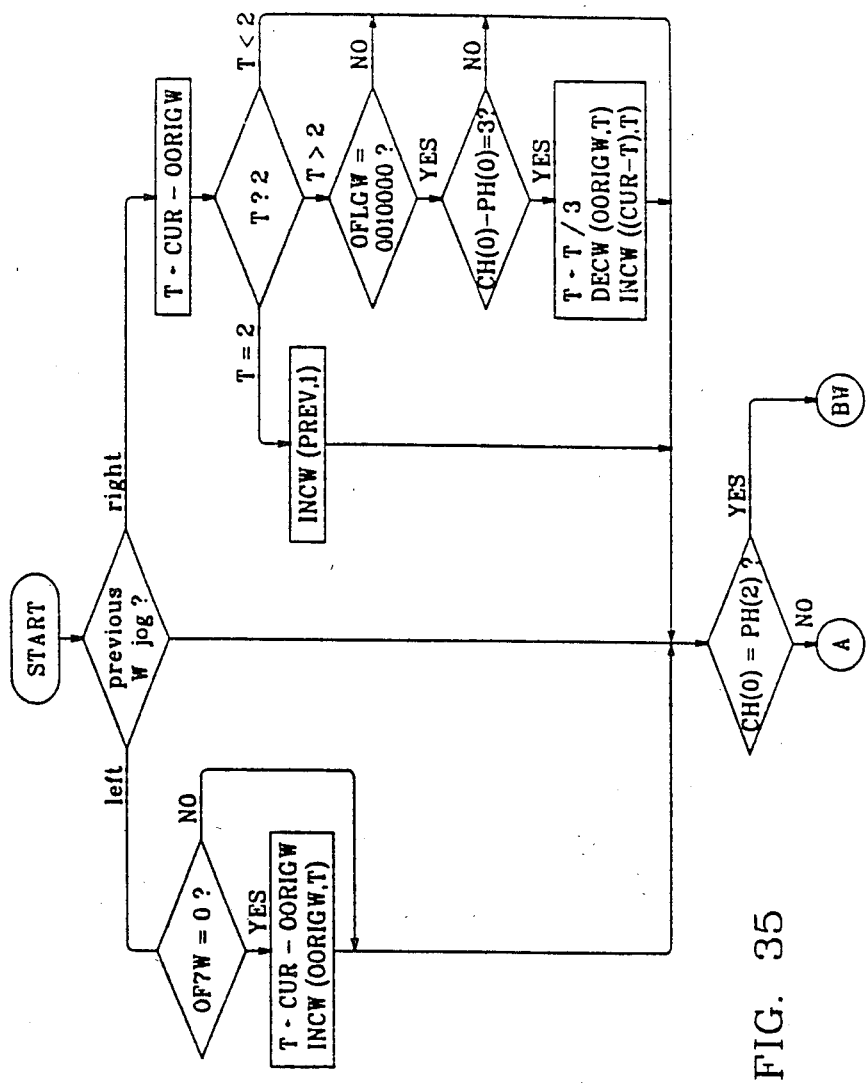
Figure 36:
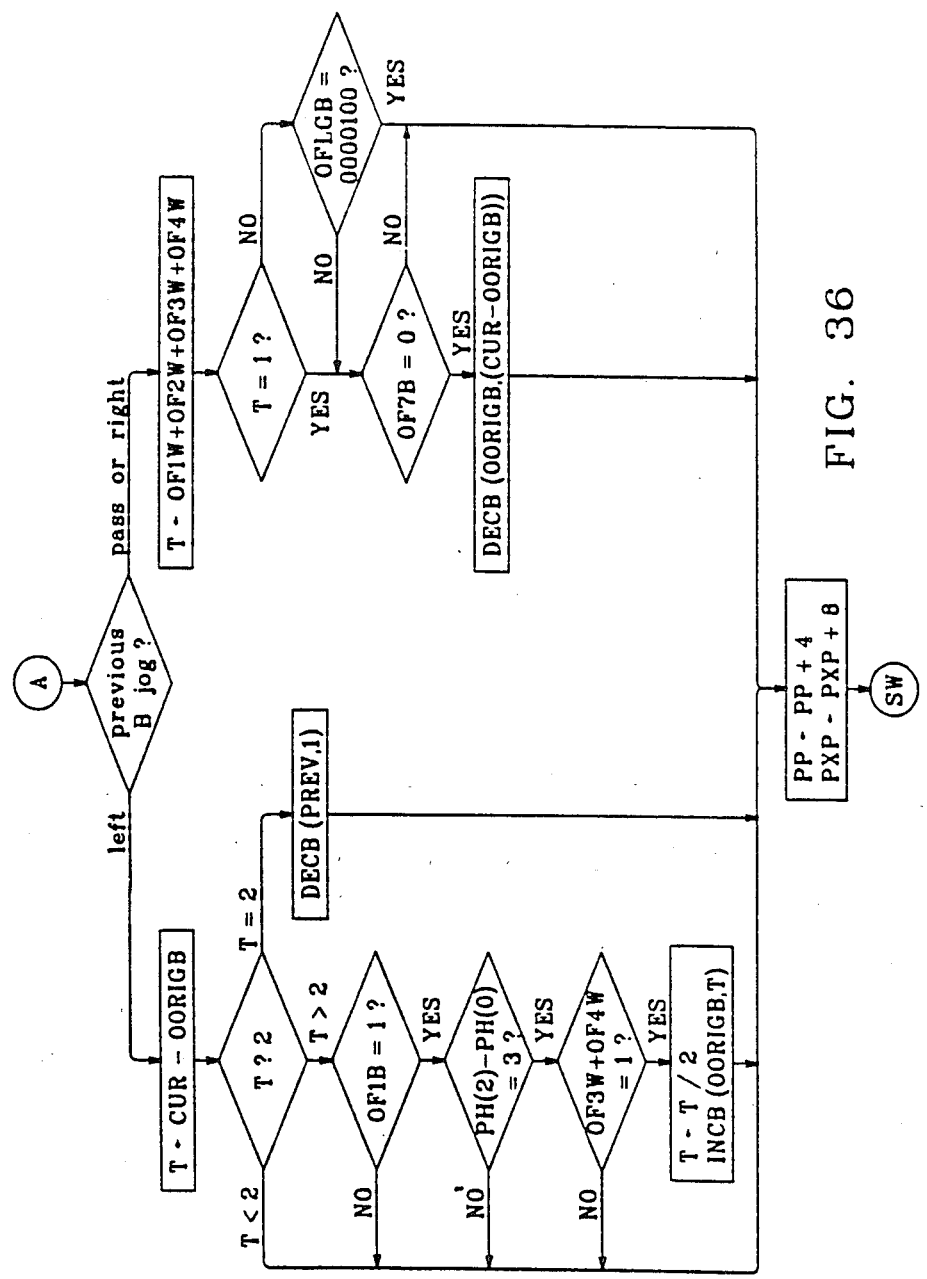
Figure 37:
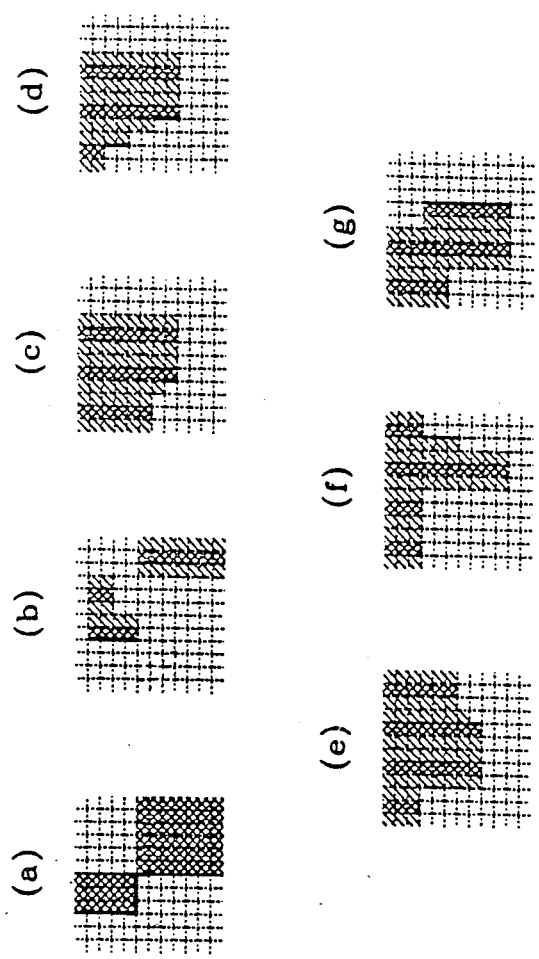

If PH(0)<CH(0) but PH(2)<=CH(0), then the black run on the preceding line ends at or to the left of the end of the white run. The flow charts of FIGS. 35 and 36 describe the procedure which is followed in this case. FIG. 37 illustrates various possible situations. FIG. 37a shows the initial condition with PH(2)=CH(0) (the runs touch at the corner); the case PH(2)<CH(0), which is a pass of a black feature on the previous line, is shown in FIG. 37b. The processing for the left edge of the intrusive feature is the same in either case. The direction of the previous jog on that edge is determined. If there is a left jog, then a column of black pels protrudes into a white area to the left of it; if no run touches the black field on the upper left, then the edge is trimmed by incrementing the white run ends for its entire height. If a pass occurred, the white field intrudes into a black area, and in this case no smoothing is done. If the previous white jog was right, then the intrusive black area slopes down to the right toward its base. In this case the length of the vertical edge is examined. If it is a single pel in height, no smoothing is done; if it is two pels high, then a black pel is clipped from the corner (FIG. 37c). If the edge is more than two pels high and both jogs are single-pel changes, then a steep vertical slope is recognized. It is smoothed by clipping white pels on the top one-third of the vertical edge and adding white pels on the bottom one-third (FIG. 37d).

After the left edge of the black area is processed, CH(0) and PH(2) are compared to see if the black field touches another black area at the lower right-hand corner. If so, control passes to the entry point BW of the "four corners" process which deals with this case. Otherwise, there was a pass of the black feature, and so its right edge must be processed. The procedure which does this is shown on FIG. 36. It begins by examining the direction of the previous black jog as indicated by the flag OFLGB.

If the previous black jog was a left jog, then the edge of the black feature slopes down and to the left toward its base. The length of the vertical edge is examined. If it is one, no smoothing is required; if it is two, a black pel is clipped from the end of the base of the field (FIG. 37e); if it is greater than two, then if the jog and the width of the base of the black feature are both one and if the black area extends to the left of the base of the black field (i.e. there was a white jog to the right), then the edge is smoothed by adding black pels to the end of the first one-half of the lines containing the vertical edge (FIG. 37f).

If the previous jog on the right edge of the black feature was to the right or if there was a pass, then a column of black pels intrudes into a white field to its right. In this case the black area should be trimmed by one pel for its entire height, as shown in FIG. 37g, unless it is an isolated one-pel-wide vertical streak or has a black run touching its upper right-hand corner. Vertical one-pel-wide streaks are recognized by checking the previous white jog (if there was such a jog, the feature must be more than one pel wide) and the width of the black feature at the top. The test of OF7B indicates whether a run touches at the corner.

Figure 38:
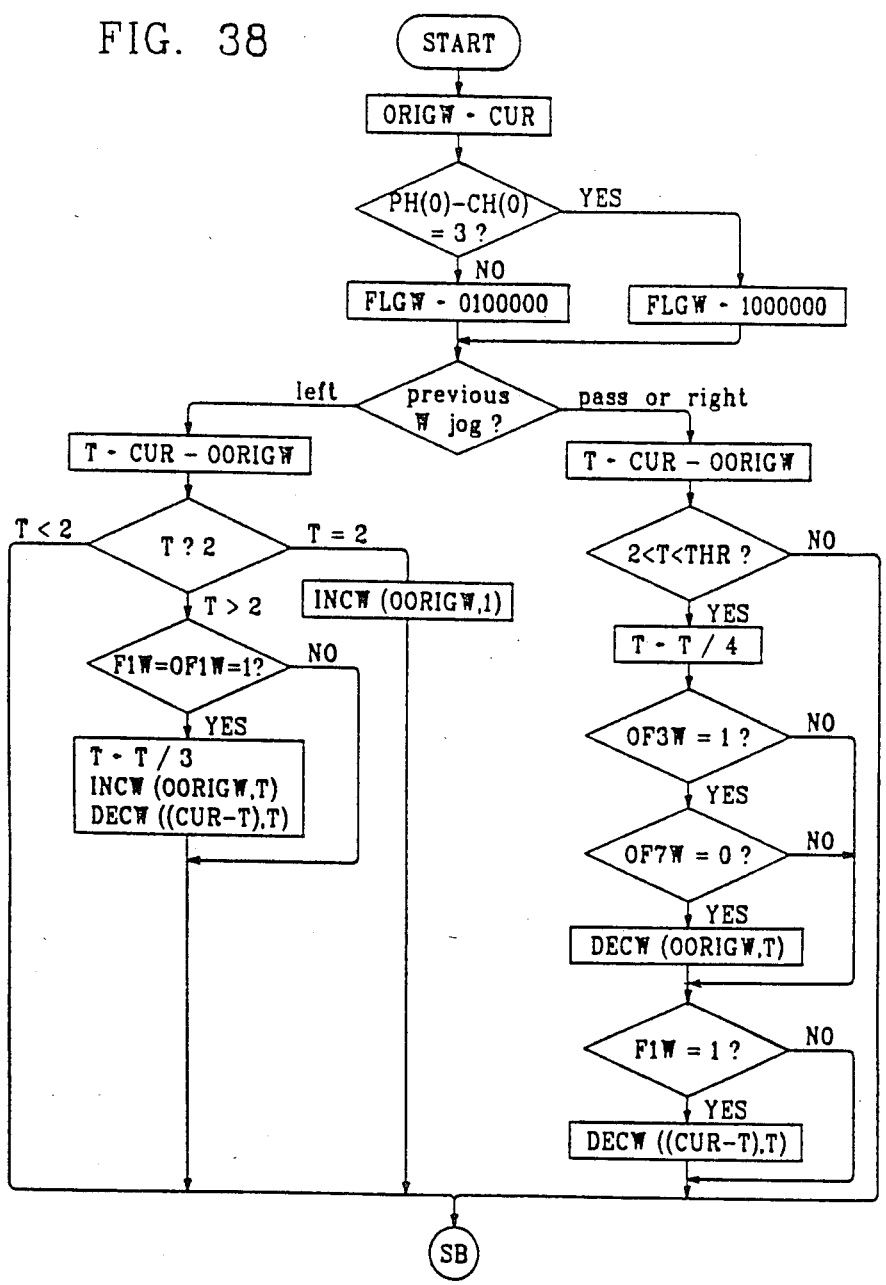
Figure 39:
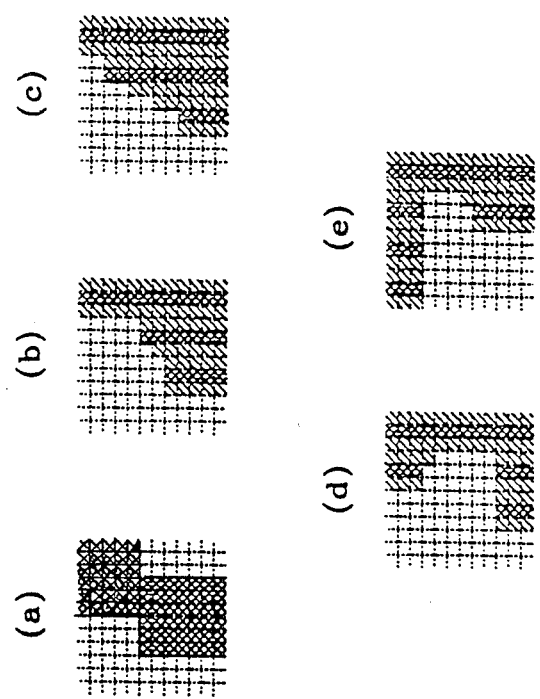
Figure 40:
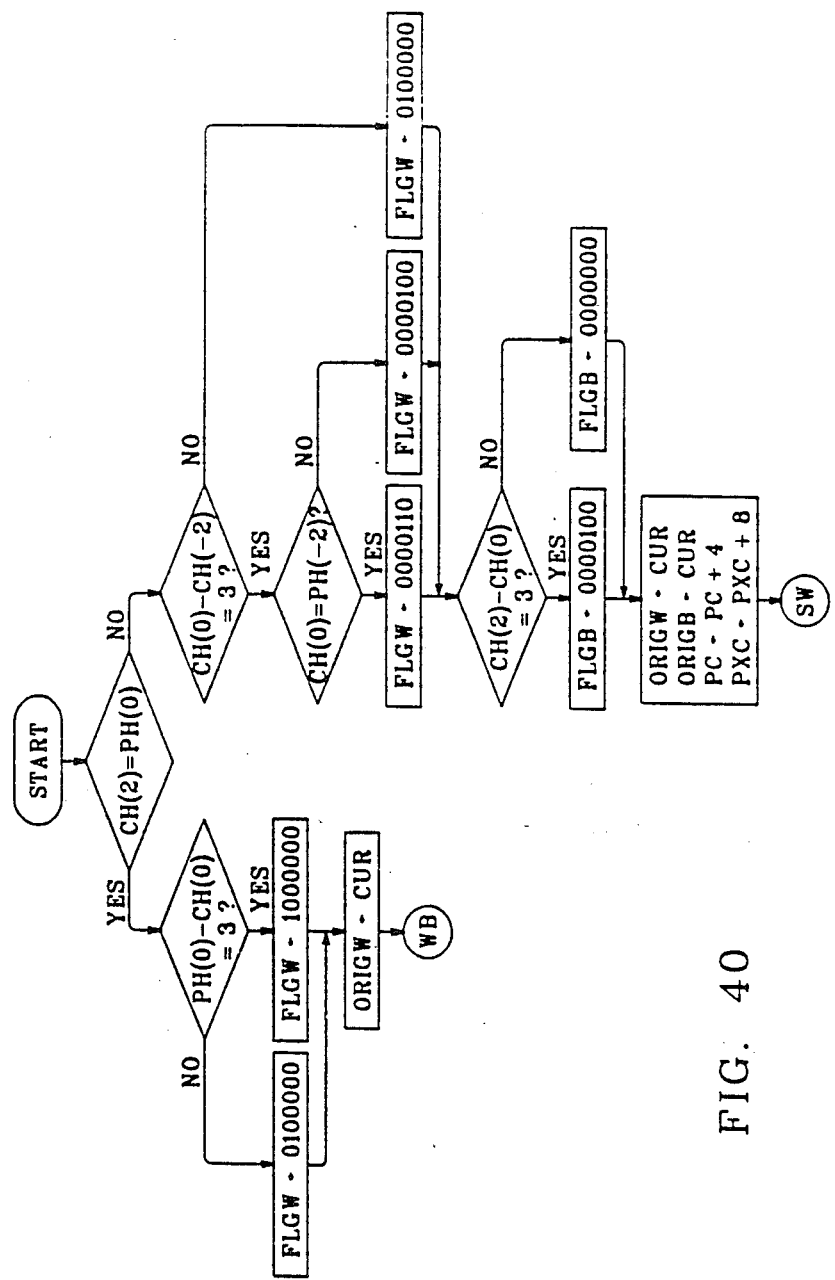

If the condition CH(0)<PH(0) holds, then the white run on the current line ends to the left of the white run on the previous line. If in addition PH(0)<CH(2), then the next black run on the current line ends to the right of the white run on the previous line and the two white runs therefore define the same edge of a feature. FIG. 38 shows the procedure followed in this case. FIG. 39a shows the initial situation. The current line number is stored as the origin for the new vertical edge, and the flags are set to indicate a left jog of either one or more than one. The direction of the previous white jog is then examined. If there was another left jog, then the length of the vertical edge is determined. If the edge length is one, nothing is done; if it is two, a black pel is clipped from the beginning of the intruding corner (FIG. 39b); if it is more than two and both left jogs were one-pel shifts, then the edge has a steep slope and it is smoothed by adding white pels for the top one-third of the edge length and clipping them from the bottom one-third (FIG. 39c).

If the vertical edge began after a right jog or pass, then a white area juts into a black field. In this case, if the edge length is greater than one and less than some threshold (set to prevent long lines from appearing thicker at the center), tests are made to determine whether to smooth the corners. A corner is smoothed by clipping white pels from the ends of the first or last one-fourth of the lines containing the vertical edge begin smoothed. The top corner is smoothed if it is preceded by a right jog of one and if the white area does not touch another white area on the upper right (FIG. 39d). The bottom corner is smoothed if it is followed by a left jog of one (FIG. 39e).

If CH(0)<PH(0) and in addition CH(2)<=PH(0), then a new black feature begins on the current line. If CH(2)=PH(0), then this feature touches another black region on the upper left. In this case, a history entry must be provided for the left edge of the intruding feature. A new white flag is set up indicating whether the left jog of the white field was greater than or equal to one, and the current line is stored as the origin for the new vertical edge. Control then passes to the entry point WB of one of the "four corners" procedures; this procedure deals with the right edge of the new feature.

If CH(2)<PH(0), new history entries for both edges of the new black feature must be created. The white flags are set after determining whether the length of the white run on the current line is one or greater than one and whether it joins the white run on the previous line or only touches it at the corner. The settings for the black flags are chosen by comparing the length of the black run to one; a pass has necessarily occurred on this edge and no runs touch at the corners. The current line number is stored as the origin for both of the new vertical edges, the PC and PXC pointers are incremented to address a new white/black run pair on the current line and the corresponding history, and control return to the portion of the main loop which examines two white run ends.

Figure 41:
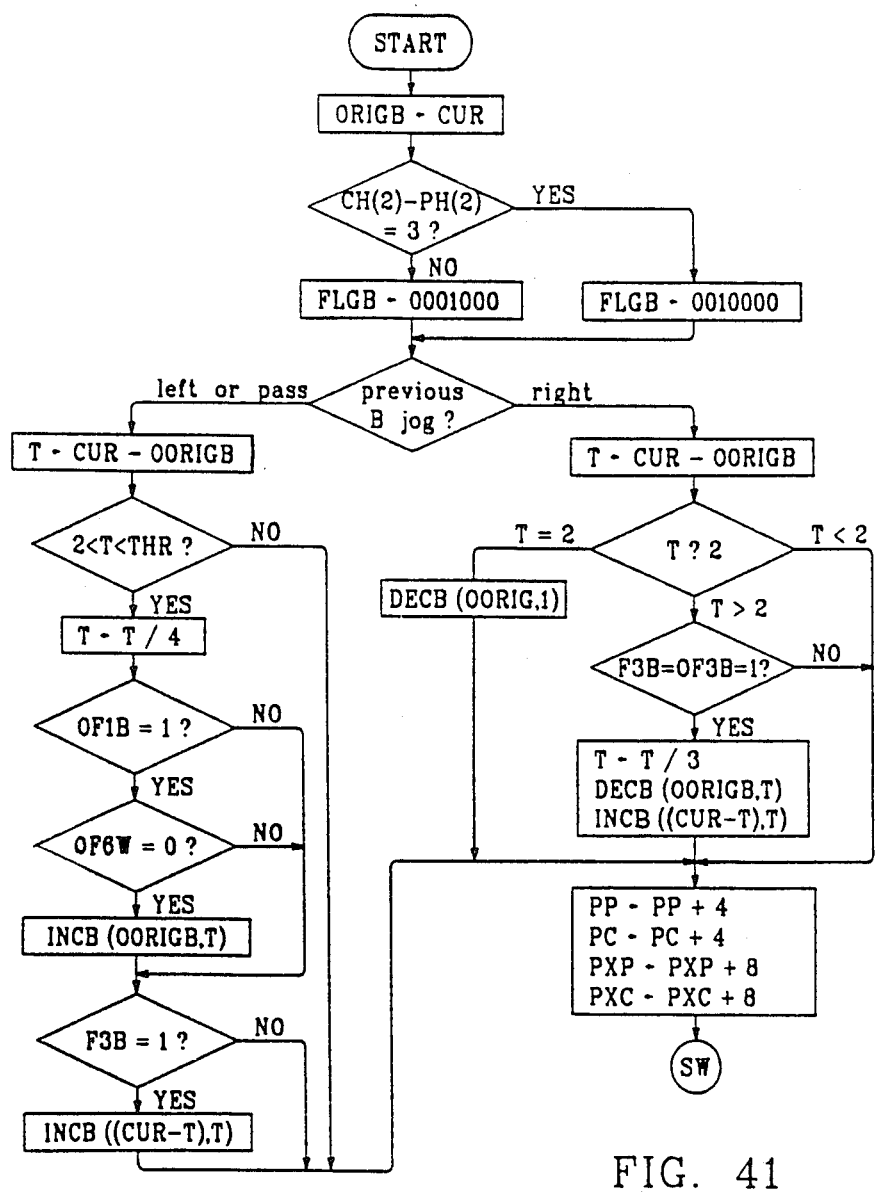

The next group of procedures is used when the comparison of two black run ends results in inequality. If the condition PH(2)<CH(2) holds, then the black run on the current line ends to the right of the black run on the previous line. The location of the next white run end on the previous line is then examined. If CH(2)<PH(4), then that run ends to the right of the black run on the current line, and the two black run ends define the same edge of a feature FIG. 41 illustrates the processing required for this situation; the runs appear as in FIG. 42a. The current line number is stored as the new ORIGB, and the flags in the new history buffer are set. Since the black edge shows a right jog, either BFG3 or BFG4 is set, depending upon whether the width of the jog is one or greater than one. There is clearly no left jog or pass mode, no run touches the black run ending at CH(2) on the upper right, and this procedure would not be executed if a run touched the white run beginning at PH(2) on the lower left, so all of the other flags are set to zero.

Figure 42:
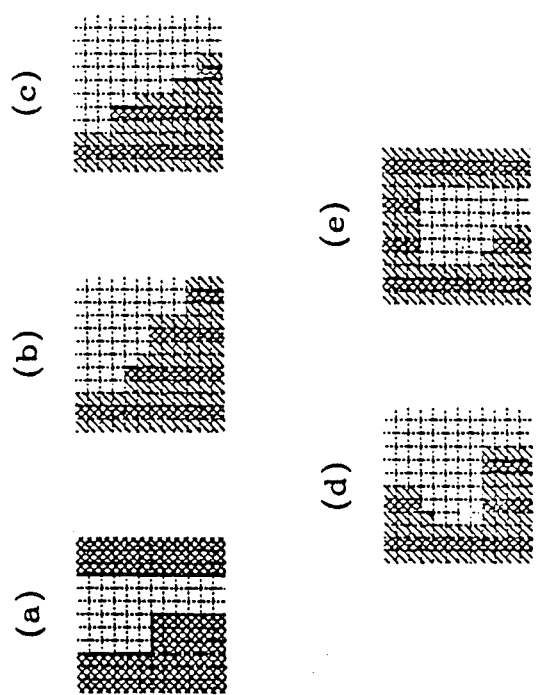

After the flags are set, the old flags are examined to determine what the edge did immediately before the beginning of the edge which has ended on the previous line. If another right jog preceded the present right jog, then the length of the vertical edge is determined. If the edge length is one then no modification is needed. If the edge length is two, then a black pel is clipped from the beginning of the intruding run (FIG. 42b). If the edge length is greater than two and if both right jogs are one-pel shifts, the edge has a steep vertical slope and is smoothed by clipping black pels from the top one-third of the lines and adding black pels to the bottom one-third (FIG. 42c).

If a left jog occurred or a pass occurred, then a column of one or more white pels protrudes left into a black field. In this case, if the edge length is greater than one and less than the threshold, tests are made to determine whether to smooth the corners. A corner is smoothed by adding black pels to the ends of the first or last one-fourth of the lines containing the vertical edge being smoothed. The top corner is smoothed if it is preceded by a left jog of one and if the white area does not touch another white area on the upper left (FIG. 42d). The bottom corner is smoothed if it is followed by a right jog of one pel (FIG. 42e).

Figure 43:
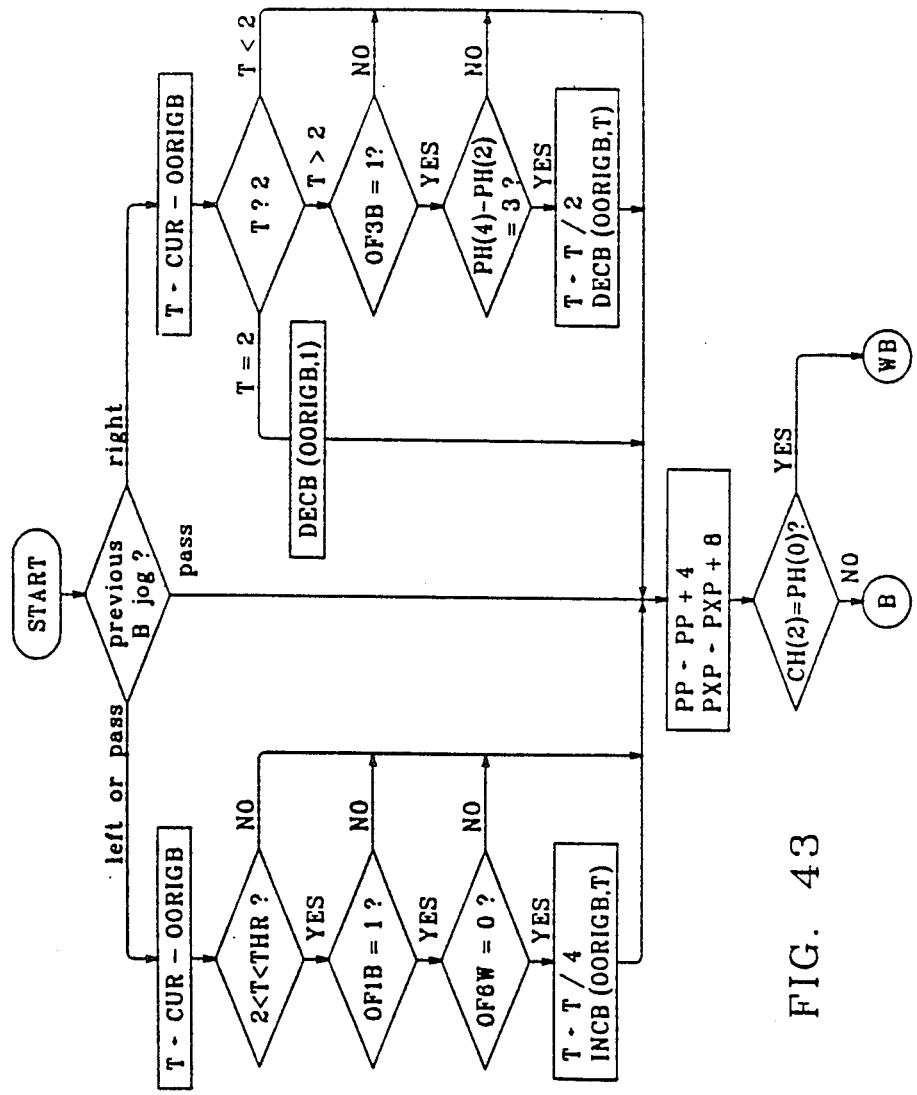
Figure 44:
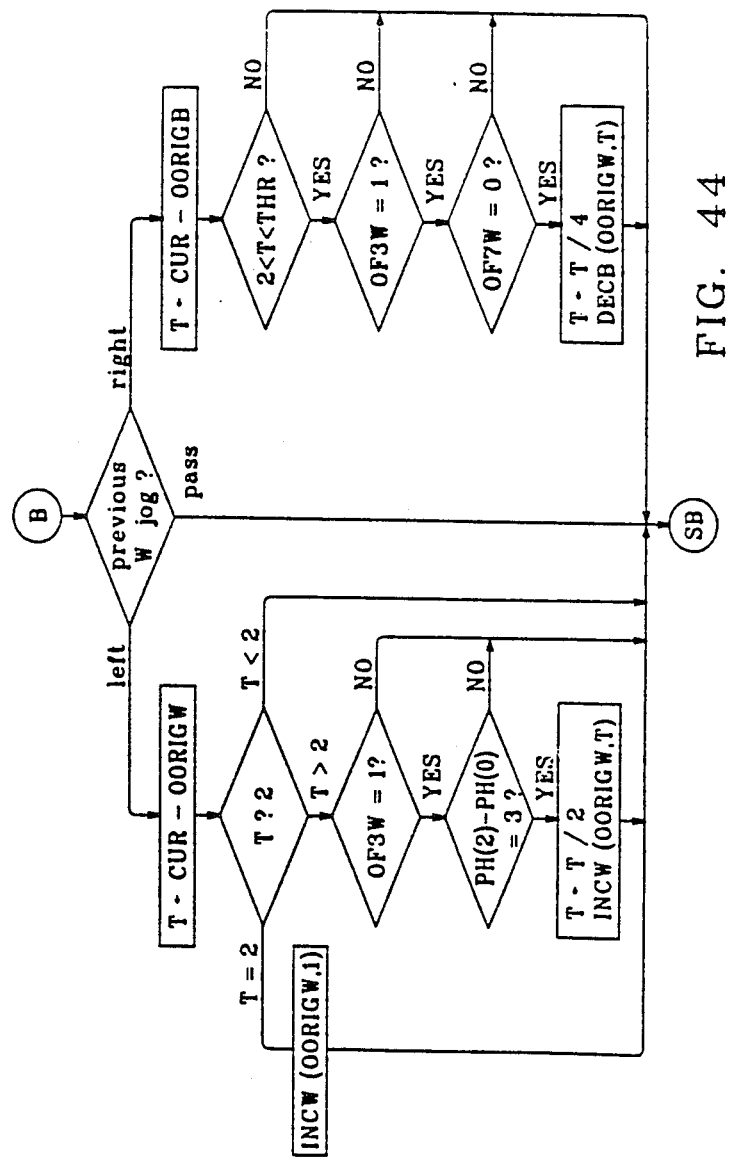
Figure 45:
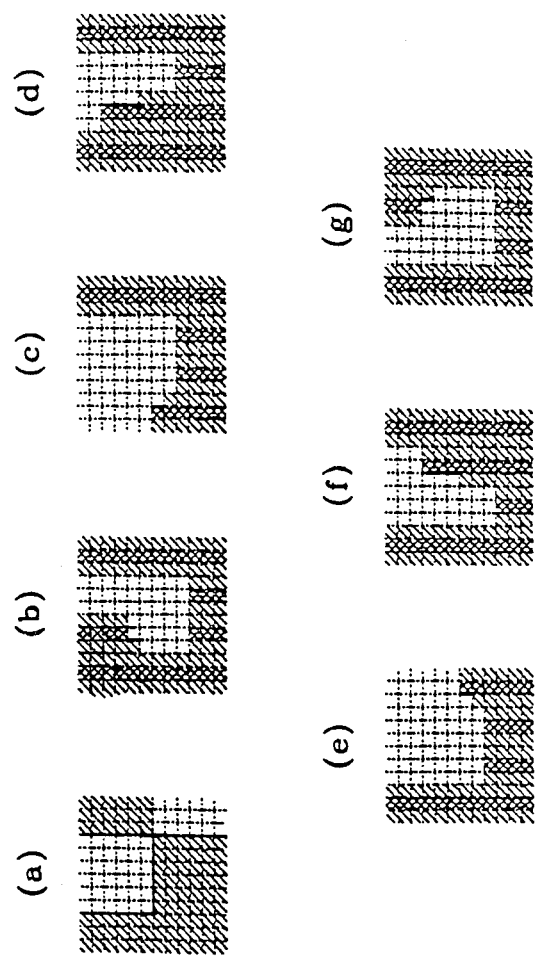

If PH(2)<CH(2) but PH(4)< =CH(2), then the next white run on the preceding line ends at or to the left of the end of the black run. The flow charts of FIGS. 43 and 44 describe the procedure which is followed in this case. FIG. 45 illustrates various possible situations. FIG. 45a shows the initial condition with PH(4)=CH(2) (the runs touch at the corner). Both this case and the PH(4)<CH(2) case require the same processing for the left edge of the intrusive feature. The direction of the previous jog on that edge is determined. If there is a left jog, then a column of white pels protrudes into a black area to the left of it; if the vertical edge is greater than one and less than the threshold, the jog is a single pel shift, and no run touches the white field on the upper left, then the upper corner is trimmed by incrementing the black run ends for one-fourth of the height of the edge (FIG. 45b). If a pass occurred, the white field intrudes into a black area, and in this case no smoothing is done. If the previous white jog was right, then the intrusive white area slopes down to the right toward its base. In this case the length of the vertical edge is examined. If it is a single pel in height, no smoothing is done; if it is two pels high, then a black pel is clipped from the corner (FIG. 45c). If the edge is more than two pels high and both jogs are single-pel changes, then a steep vertical slope is recognized. It is smoothed by clipping black pels on the top one-third of the vertical edge and adding black pels on the bottom one-third (FIG. 45d).

After the left edge of the white area is processed, the previous line pointers PP and PXP are incremented to point to a new white/black pair of run ends. CH(2) and PH(0) (which was PH(4) before the increment of PP) are compared to see if the white field touches another white area at the lower right-hand corner. If so, control passes to the entry point WB of the "four corners" process which deals with this case. Otherwise, there was a pass of the white feature, and so its right edge must be processed. The procedure which does this is shown on FIG. 44. It begins by examining the direction of the previous white jog as indicated by the flag OFLGW.

If the previous white jog was a left jog, then the edge of the black feature slopes down and to the left toward its base. The length of the vertical edge is examined. If it is one, no smoothing is required; if it is two, a black pel is clipped from the intruding corner (FIG. 45e); if it is greater than two, then if the jog was a one-pel change and if the white run on the previous line is one pel wide, then the edge is smoothed by adding white pels to the end of the first one-half of the lines containing the vertical edge (FIG. 45f).

If a pass condition occurred at the beginning of the right edge of the white feature, it is left intact.

If the previous jog on the right edge of the white feature was to the right, then a column of white pels intrudes into a black field to its right. If the vertical edge is between one and the threshold (exclusive), the previous jog was a single-pel change, and there is no white area touching on the upper right-hand corner, then the top of the white intrusion is smoothed by trimming white pels from the run end on the first one-fourth of the lines containing the vertical edge (FIG. 45g).

Figure 46:
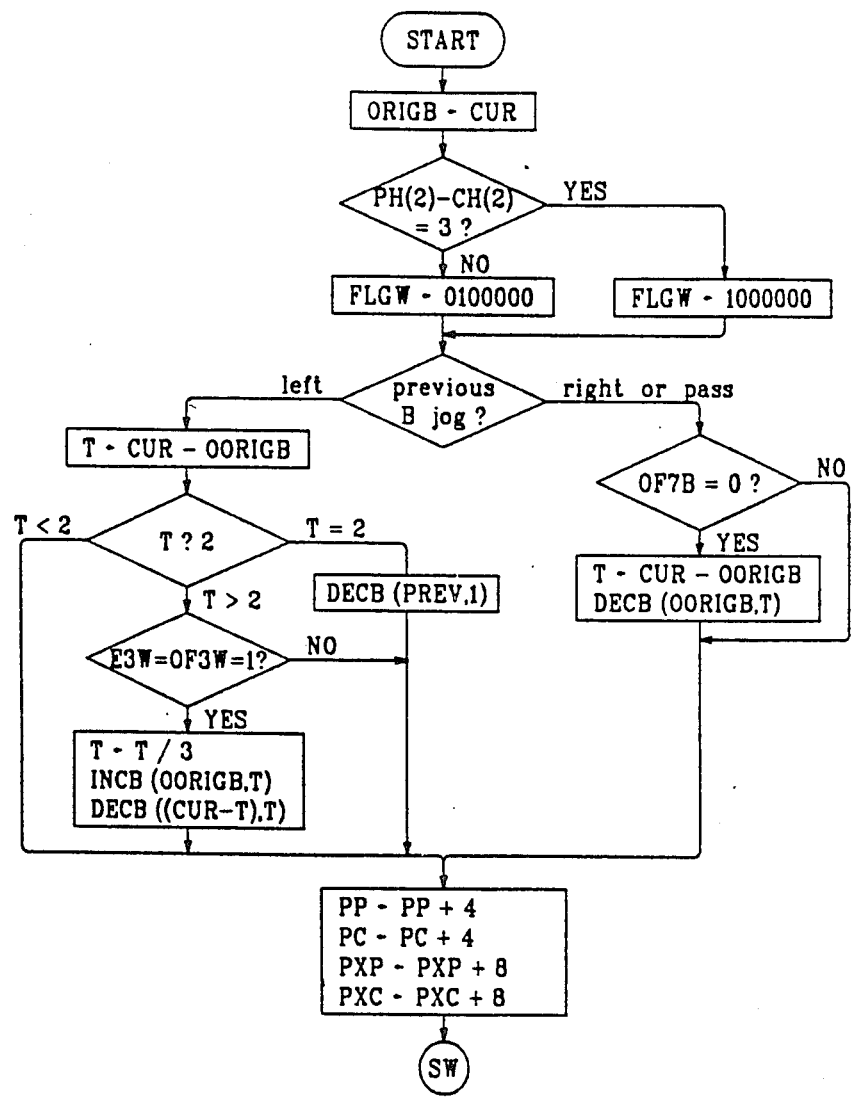
Figure 47:
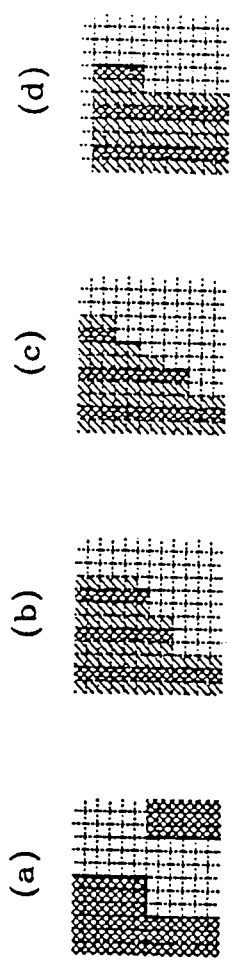
Figure 48:
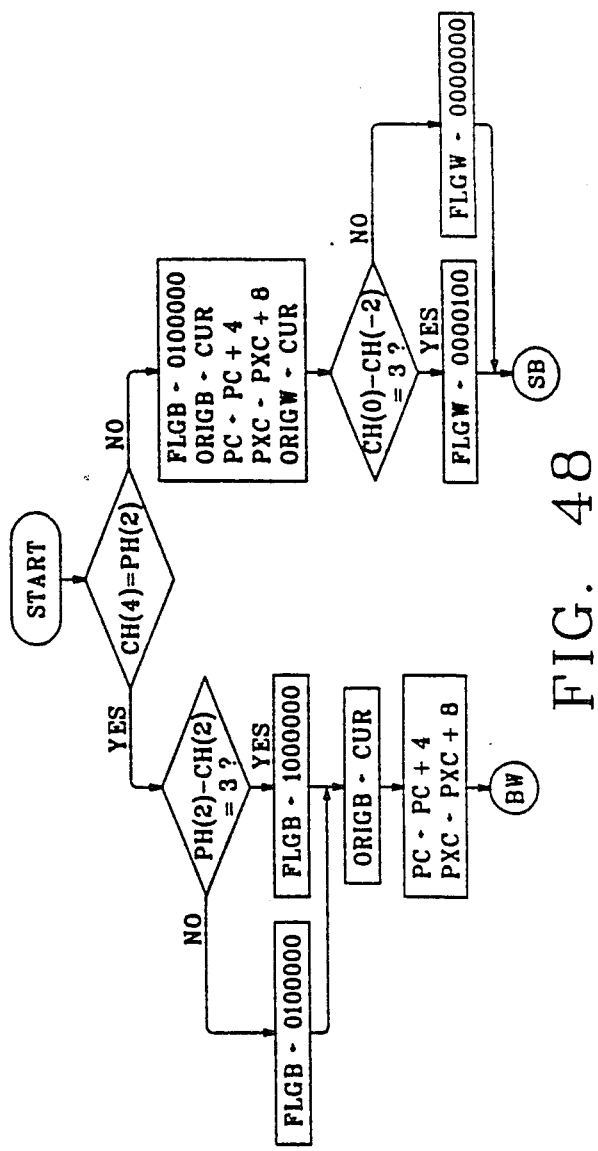

If the condition CH(2)<PH(2) holds, then the black run on the current line ends to the left of the black run on the previous line. If in addition PH(2)<CH(4), then the next black run on the current line ends to the right of the white run on the previous line and the two white runs therefore define the same edge of a feature. FIG. 46 shows the procedure followed in this case. FIG. 47a shows the initial situation. The current line number is stored as the origin for the new vertical edge, and the flags are set to indicate a left jog of either one or more than one. The direction of the previous black jog is then examined. If there was another left jog, then the length of the vertical edge is determined. If the edge length is one, nothing is done; if it is two, a black pel is clipped from the beginning of the intruding corner (FIG. 47b); if it is more than two and both left jogs were one-pel shifts, then the edge has a steep slope and it is smoothed by adding black pels for the top one-third of the edge length and clipping them from the bottom one-third (FIG. 47c).

If the vertical edge began after a right jog or pass, then a black area juts into a white field. If no black run touches the projection, then the edge is deemphasized by trimming black pels along its entire height (FIG. 47d).

After the edge has been processed, the pointers to the current line and previous lines and their history buffers are all incremented to point to the next white/black run end pair. Control returns to the portion of the main loop which examines two white run ends.

If CH(2)<PH(2) and in addition CH(4)< =PH(2), then a new white feature begins on the current line. If CH(4)=PH(2), then this feature touches another white region on the upper left. In this case, a history entry must be provided for the left edge of the intruding feature. A new black flag is set up indicating whether the left job of the black field is greater than or equal to one, and the current line is stored as the origin for the new vertical edge. Control then passes to the entry point BW of one of the "four corners" procedures; this procedure deals with the right edge of the new feature.

If CH(4)<PH(2), new history entries for both edges of the new white feature must be created. The black flags are set to indicate a left jog of more than one pel, and the origin of the vertical edge is stored. PC and PXC are then incremented to address the next white/black run end pair on the current line and the corresponding history data, and the current line number is stored as the origin of the second vertical edge. The white flags are set after determining whether the length of the black run on the current line is one or greater than one. Control passes to the portion of the main loop of the line processor which compares two black run ends.

Figure 49:
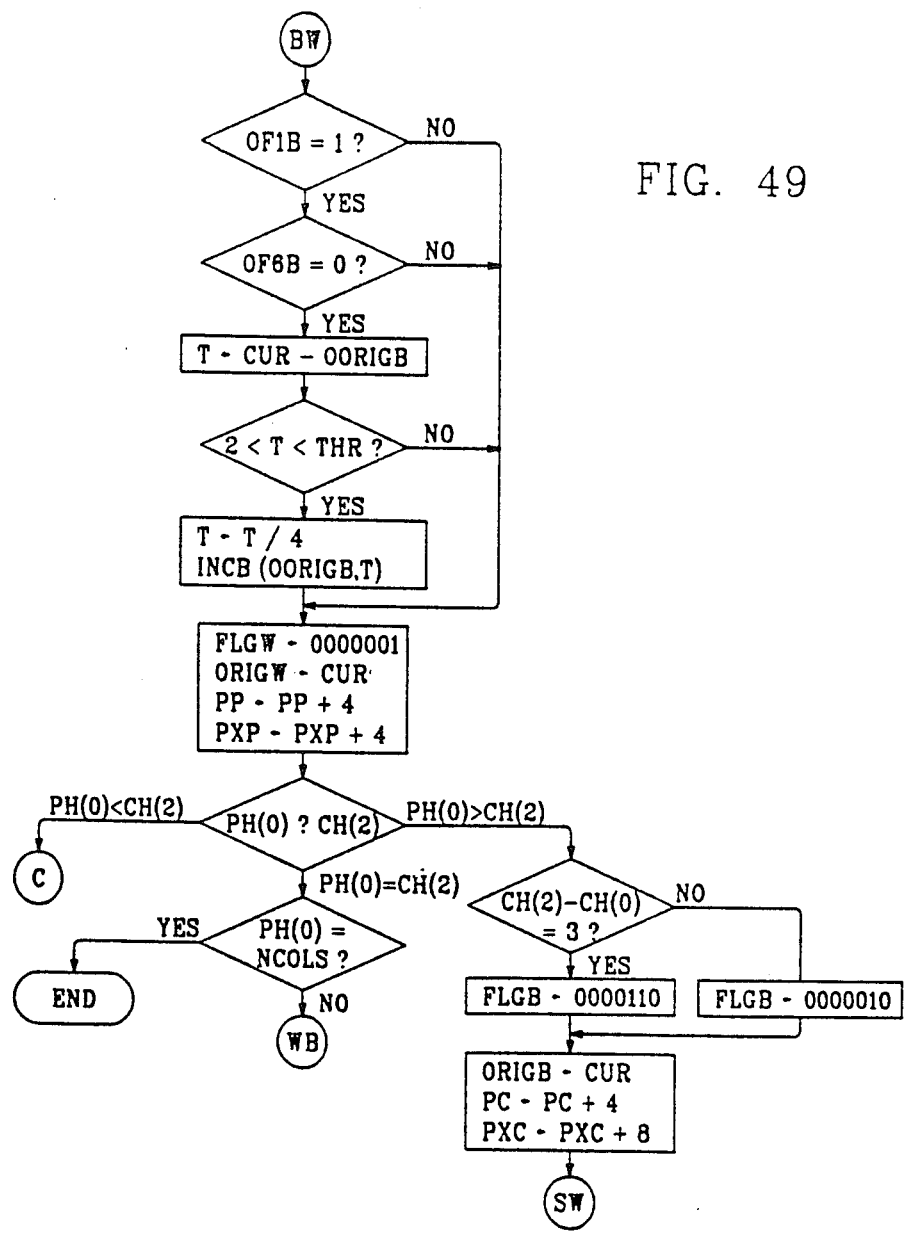
Figure 50:
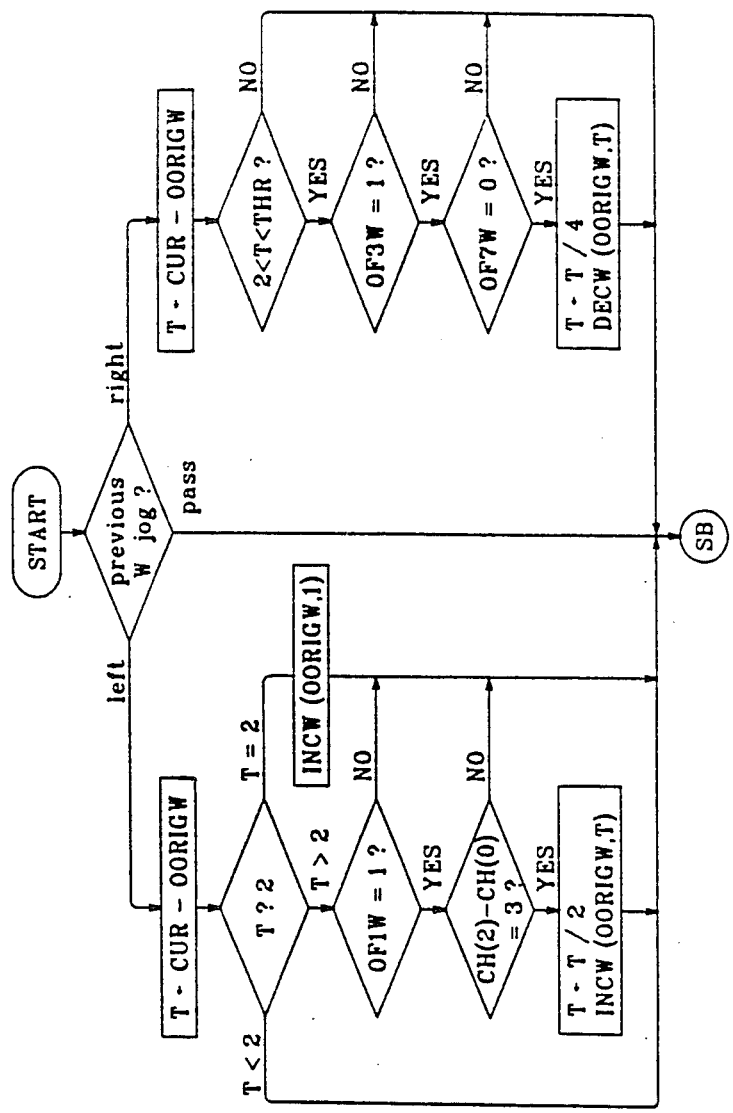
Figure 51:
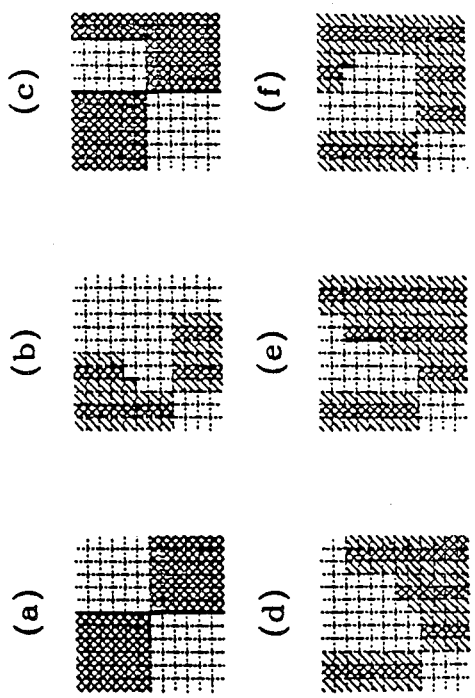

FIGS. 49, 50, and 51 illustrate the first of the "four corner" procedures (BW), used when the lower left corner of a black run on the previous line touches a black run on the current line (FIG. 51a). The first problem is to smooth the edge of the black feature which is ending, if required. If the edge begins with a left jog of one, the intruding white region does not touch a white run on the upper left-hand corner, and the vertical edge length lies between one and the threshold (exclusive), then the upper corner of the white area is smoothed by adding black pels to the first one-fourth of the lines containing the vertical edge (FIG. 51b).

After the edge has been smoothed, the white flags are set to indicate a touching run on the upper right, the current line number is stored as the origin for the new vertical edge, and the previous line points PP and PXP are incremented to address a new white/black run end pair on the previous line and the associated history data. Tests then determine whether the black run on the current line is connected to a black run on the previous line. If PH(0)=CH(2), then another "four corners" situation exists and control passes to the ther "four corners" procedure to deal with it. If PH(0)>CH(2), then the right side of the black run does not connect with a black field on the previous line. A new history entry must be made for the new vertical edge. The black flags are set to record a touching run on the upper left and, if appropriate, a run length of one with a pass mode. The current line number is stored as the origin of the vertical edge, and the current line pointers PC and PXC are incremented to point to the next white/black run pair and its history data. The main loop is continued at the point where white run ends are compared.

If PH(0)<CH(2), then a white feature has ended on the previous line (FIG. 51c), and the right edge of that feature may require smoothing. The flowchart of FIG. 50 describes this operation. If the previous jog was a left shift, then the right edge of the white feature slopes in to the left toward its base. The length of the vertical edge is examined. If the edge is one pel high, no smoothing is done; if it is two pels high, a black pel is clipped from the intruding corner (FIG. 51d). If the edge is more than two pels high and both the preceding jog and the base of the white feature are one pel wide, then the edge is smoothed by adding white pels on the first one-half of the lines containing the edge (FIG. 51e).

If the white feature began with a pass, it is not disturbed.

If the previous jog on the right edge of the white feature was a right shift, then a column of white pels juts into a black field. If the edge length is between one and the threshold (exclusive), the jog was a one-pel shift, and no white region is touched by the upper right-hand corner of the intrusive area, then that corner is smoothed by clipping white pels on the first one-fourth of the lines containing the edge (FIG. 51c).

In any case, control goes back to the main loop at the point where two black run ends are compared.

Figure 52:
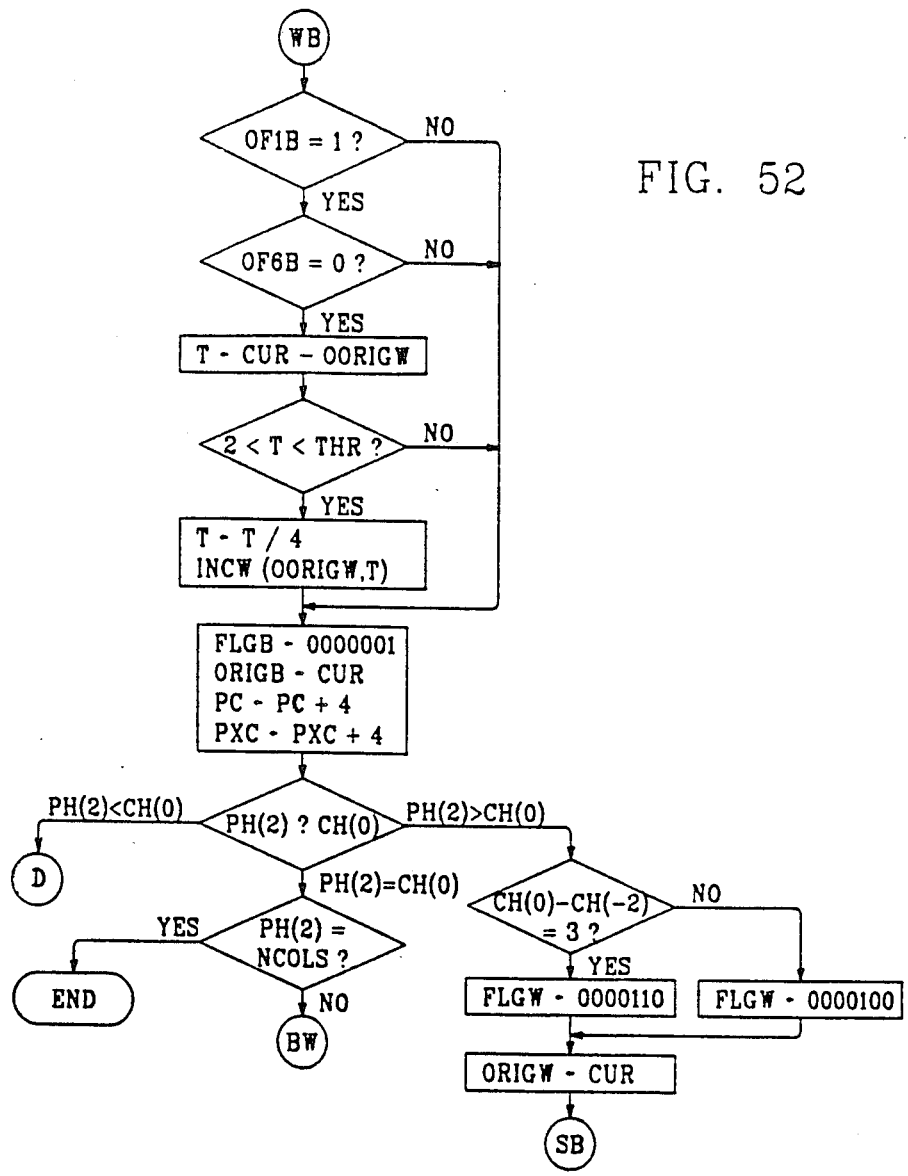
Figure 53:
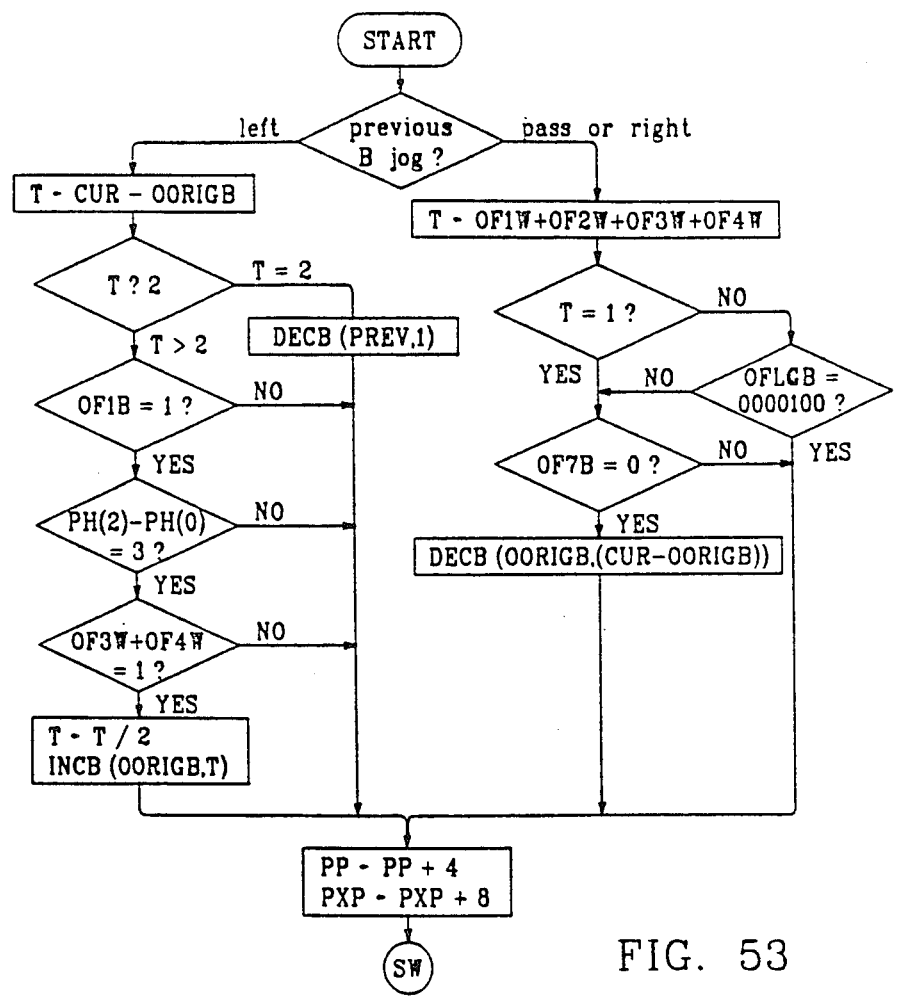
Figure 54:
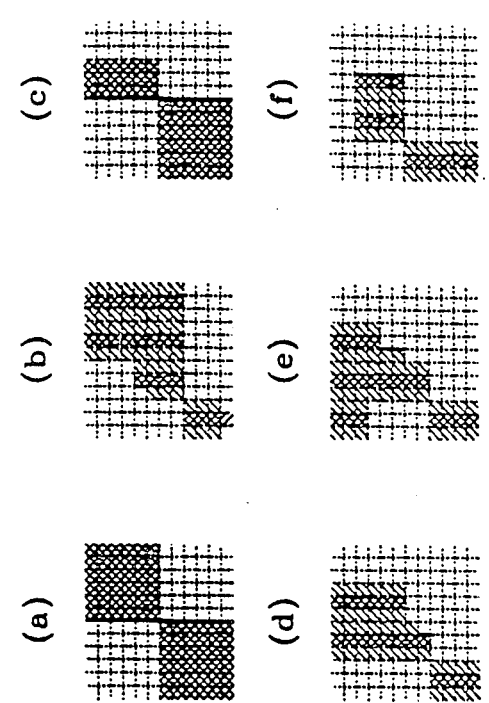

The other "four corners" procedure, WB, is illustrated by FIGS. 52, 53, and 54. This procedure is used when the lower left corner of a white run on the previous line touches a white run on the current line (FIG. 54a). The first problem is to smooth the edge of the white feature which is ending, if required. If the edge begins with a left jog of one, the intruding black region does not touch a black run on the upper left-hand corner, and the vertical edge length lies between one and the threshold (exclusive), then the upper corner of the black area is smoothed by adding white pels to the first one-fourth of the lines containing the vertical edge (FIG. 54b).

After the edge has been smoothed, the black flags are set to indicate a touching run on the upper right, the current line number is stored as the origin for the new vertical edge, and the current line pointers PC and PXC are incremented to address a new white/black run end pair on the current line and the associated history data. Tests then determine whether the right side of the white run on the current line is connected to a white run on the previous line. If PH(0)=CH(2), then another "four corners" situation exists and control passes to the other "four corners" procedure to deal with it. If PH(2)>CH(0), then there is no such connection. A new history entry must be made for the new vertical edge. The white flags are set to record a touching run on the upper left and, if appropriate, a run length of one with a pass mode. The current line number is stored as the origin of the vertical edge. The main loop is continued at the point where black run ends are compared.

If PH(2)<CH(0), thena black feature has ended on the previous line (FIG. 54d), and the right edge of that feature may require smoothing. The flowchart of FIG. 53 describes this operation. If the previous jog was a left shift, then the right edge of the black feature slopes in to the left toward its base. The length of the vertical edge is examined. If the edge is one pel high, no smoothing is done; if it is two pels high, a black pel is clipped from the intruding corner (FIG. 54d). If the edge is more than two pels high, both the preceding jog and the base of the white feature are one pel wide, and the next white run begins with a right jog, then the edge is smoothed by adding black pels on the first one-half of the lines containing the edge (FIG. 54e).

If the right edge of the white feature was a pass or right shift, then a column of black pels juts into a white field. If the white area preceding the edge to be smoothed on the previous line contained any right or left jog, the black region must be more than one pel wide at some point; otherwise the value of BFG5 will indicate whether the region is one pel wide or more than one pel wide. If the region is more than one pel wide and does not touch a black run on the upper right, then the black region is trimmed by clipping a column of black pels from its right edge (FIG. 54f).

In any case, the previous line pointers PP and PXP are incremented to address the next pair of run ends on the previous line and the corresponding history data, and control returns to the main loop at the point where two white run ends are compared.

The procedure described above approximates application of the vertical interpolation algorithm to the rotated original image. While there are some minor differences, the procedures are nearly symmetric and greatly enhance the appearance of images to which they are applied compared to the images which would result from the simple replication of pels. In addition, procedures such as those described above allow some flexibility in compensating for the characteristics of a given output device.

The vertical enlargement procedure is also potentially useful in an environment where enlargements by arbitrary factors are required. One or more procedures for enlarging by integer factors may be developed. A general enlargement procedure could operate by deciding, for each pair of input lines, how many lines should be interpolated, and an appropriate procedure could be used.

SUMMARY

The resolution change method which has been described provides a method for converting images from 200 pel/inch scanned format to a 600 pel/inch format required for printing on certain high resolution printers. The process operates by enlarging the image by a factor of three in the horizontal dimension and enlarging the resulting image by a factor of three in the vertical dimension, operating on the image data in run end form and using a set of rules which is simple enough to be efficiently implemented in software.

Thus, while the invention has been described with reference to preferred embodiments thereof, it will be understood by those skilled in the art that various changes in form and details may be made without departing from the scope of the invention.

What is claimed is:

1. A method for enlarging a binary digital image along first and second axes thereof by factors of F1 and F2, respectively, said binary image having rows of picture elements or pels, said rows arranged adjacently along said second axis and containing runs of white and black pels, comprising the steps of:

storing the rows of said image as a plurality of run ends with each row being represented as a sequence of values corresponding to the unnormalized white and black run ends;

partially enlarging said binary image along said first axis by altering the value of each unnormalized run end in the respective rows by a predetermined factor F1;

further enlarging said binary image along said second axis by creating additional rows interpolated between the rows of the partially enlarged image produced by the preceding step, using the corresponding run ends of the rows of the partially enlarged image adjacent the additional interpolated rows to determine the positions of the white and black run ends on the interpolated rows, the number and distribution of said interpolated rows being chosen so as to produce enlargement along said second axis by a predetermined factor F2; and storing said enlarged size image generated by the above steps in said unnormalized run end form.

2. A method according to claim 1 in which said enlarging steps further comprise the step of: compensating for output device characteristics which produce white and black pels of different sizes by adjusting characteristics of white and black runs.

3. A method according to claim 1 wherein said step of enlarging each row of said binary image along said first axis further comprises:

obtaining the run end values describing a current row of said image to be enlarged;

multiplying each run end value in said current row by F1 to enlarge each run and thereby said current row by a factor of F1;

detecting edge pel position changes in said image along said second axis by comparing run end locations from previous enlarged rows with those of said enlarged current row;

smoothing edges ending on the row preceding the current row by accordingly adding or removing pels from said edges; and repeating said obtaining, multiplying, detecting, and smoothing steps until all rows of said binary image have been enlarged.

4. A method according to claim 1 in which F1 is equal to 3.

5. A method according to claim 1 in which F2 is equal to 3.

6. A method according to claim 1 in which said first axis is a horizontal axis.

7. A method according to claim 1 in which said second axis is a vertical axis.

8. A method for enlarging a binary digital image along one axis thereof by a predetermined factor F, said binary image having lines of picture elements or pels, said lines arranged adjacently along said one axis and containing runs of white and black pels, comprising the steps of:

initializing a buffer with unnormalized run end values corresponding to those of the runs of white and black pels in a number of adjacent lines selected from said image, said lines comprising two extreme lines disposed respectively at the two ends of sid buffer along said one axis;

discarding one of the extreme lines from one end of said buffer;

reading the unnormalized run end values describing a line of said image adjacent said other extreme line, and adding said run end values of said adjacent line to the other end of said buffer following the other extreme line;

interpolating zero or more lines between two selected lines of said buffer, in accordance with said predetermined enlargement factor F along said one axis, by creating respective run end values to describe each interpolated line;

selecting the run end locations for said interpolated lines being generated by examining the image lines in said buffer, in order to detect edge pel position changes along said axis and smoothing edges by accordingly adding or removing pels from said edges;

storing said zero or more interpolated lines and said selected line nearer said other end of said buffer in run end form; and repeating said discarding, reading, adding, interpolating, selecting, and storing steps for all lines of said image.

9. A method for enlarging a binary digital image along first and second axes thereof by factors of F1 and F2, respectively, said original binary image having rows of picture elements or pels, said rows arranged adjacently along said second axis and containing runs of white and black pels, and then reducing the enlarged binary image to the original binary image size, such that the image that results upon reductiin after said original binary image has been enlarged is identical to said original binary image, comprising the steps of:

storing the rows of said original binary image as run end representations, in which each row is represented as a sequence of integer values corresponding to the unnormalized white and black run ends;

enlarging said original binary image by the steps of:

enlarging each row of said original binary image along said first axis by altering the integer value of each run end in the run end representation corresponding to each respective row by a predetermined factor F1, in such manner that for each pel represented in said each respective row there exists a pel at a known position in the produced enlarged image row having the same binary value as said pel represented in said each respective row;

further enlarging said original binary image along said second axis by creating run end representations representing rows interpolated between the rows of the partially enlarged image produced by the preceding step, using the run ends of the rows of the partially enlarged image adjacent each interpolated row to determine the positions of the white and black run ends in the interpolated rows, so as to produce enlargement of said original binary image along said second axis by a predetermined factor F2;

storing the enlarged image generated by the above steps in run end form; and reducing said enlarged image to a reduced image identical to said original binary image and of said original size by the steps of:

dividing said enlarged image into a plurality of strips parallel to said first axis, each strip containing one row which was obtained by enlargement of an original image row and zero or more interpolated rows;

dividing each of said strips into blocks, each block corresponding to an original image pel and containing a pel of known position corresponding in binary value to said original image pel; and creating said reduced image by providing a pel for each said block and assigning a binary value to said pel equal to the value of the pel of known position in the block corresponding to said pel.

10. A method according to claim 9 wherein each said block comprises 3 pels by 3 pels.

11. A method according to claim 10, wherein each said pel of known position is the center pel in said block.

12. A system for enlarging a binary digital image along first and second axes thereof by factors of F1 and F2, respectively, said binary image having rows of picture elements or pels, said rows arranged adjacently along said second axis and containing runs of white and black pels, comprising:

means for storing the rows of said binary image as a plurality of run end representations, in which each row is represented as a sequence of values corresponding to the unnormalized white and black run ends;

first means for partially enlarging said binary image by altering the value of each run end in the run end representations of the respective rows to achieve enlargement along said first axis by a predetermined factor F1;

second means for further enlarging said binary image along said second axis by creating run end representations representing rows interpolated between the rows of the partially enlarged image produced by said first means, using the run ends of the rows of the partially enlarged image adjacent each interpolated row to determine the positions of the white and black run ends on the interpolated rows, so as to produce enlargement along said second axis by a predetermined factor F2; and means for storing said enlarged size image, generated by said foregoing means, in unnormalized run end form.

13. A system as in claim 12 wherein said first and second enlarging means comprise means for compensating for output device characteristics which produce white and black pels of different sizes by adjusting characteristics of white and black runs.

14. A system according to claim 13 wherein said first enlarging means comprises:

means for obtaining the run end values describing a current row of said image to be enlarged;

means for multiplying each run end value in said current row by F1 to enlarge each run and thereby said current row by a factor of F1;

means for storing run end locations from previous enlarged rows to detect edges in said image along said second axis;

means for detecting edge pel position changes in said image along said second axis by comparing run end locatiins from previous enlarged rows with those of said enlarged current row;

means for smoothing edges ending on the row preceding the current row by accordingly adding or removing pels from said edges; and means for repeatedly actuating said obtaining, multiplying, detecting, and smoothing means until all the rows of said binary image have been enlarged.

15. A system according to claim 12 in which F1 is equal to 3.

16. A system according to claim 12 in which F2 is equal to 3.

17. A system according to claim 12 wherein said first axis is a horizontal axis and said second axis is a vertical axis.

18. A system for enlarging a binary digital image, in the form of a plurality of rows of picture elements or pels containing runs of white and black pels, along first and second axes thereof by factors of F1 and F2, respectively, and then reducing said binary image to its original size, such that the image that results upon reduction after said binary image has been enlarged is identical to said original binary image, comprising:

means for storing the rows of said original binary image as run end representations, in which each row is represented as a sequence of integer values corresponding to the unnormalized white and black run ends;

means for enlarging said original binary image comprising:

first means for enlarging each row of said original binary image along said first axis by altering the integer value of each run end in the run end representation corresponding to each respective row by a predetermined factor F1, in such manner that for each pel represented in said each respective row there exists a pel at a known position in the produced enlarged image row having the same binary value as said pel represented in said each respective row;

second means for further enlarging said original binary image along said second axis by creating run end representations representing rows interpolated between the rows of the partially enlarged image produced by the preceding step, using the run ends of the rows of the partially enlarged image adjacent each interpolated row to determine the positions of the white and black run ends in the interpolated rows, so as to produce enlargement of said original binary image along said second axis by a predetermined factor F2;

means for storing the enlarged image generated by said first and second enlarging means in run end form; and means for reducing said enlarged image to a reduced image identical to said original binary image and of said original size comprising:

first means for dividing said enlarged image into a plurality of strips parallel to said first axis, each strip containing one row which was obtained by enlargement of an original image row and zero or more interpolated rows;

second means for dividing each of said strips into blocks, each block corresponding to an original image pel and containing a pel of known position corresponding in binary value to said original image pel; and means for creating said reduced image by providing a pel for each said block and assigning a binary value to said pel equal to the value of the pel of known position in the block corresponding to said pel.

19. A system according to claim 18 wherein each said block comprises 3 pels by 3 pels.

20. A system according to claim 19, wherein each said pel of known position is the center pel in said block.

21. A system for enlarging a binary digital image along one axis thereof by a predetermined factor F, said binary image having lines of picture elements or pels, said lines arranged adjacently along said one axis and containing runs of white and black pels, comprising:

means for initializing a buffer with unnormalized run end values corresponding to those of the runs of white and black pels in a number of adjacent lines selected from said image, said lines comprising two extreme lines disposed respectively at the two ends of said buffer along said one axis;

means for discarding one of the extreme lines from one end of said buffer;

means for reading the unnormalized run end values describing a line of said image adjacent said other extreme line, and adding said run end values of said adjacent line to the other end of said buffer following the other extreme line;

means for interpolating zero or more lines between two selected lines of said buffer, in accordance with said predetermined enlargement factor F along said one axis, by creating respective run end values to describe each interpolated line;

means for selecting the run end locations for said interpolated lines being generated by examining the image lines in said buffer, in order to detect edge pel position changes along said axis and smoothing edges by accordingly adding or removing pels from said edges;

means for storing said zero or more interpolated lines and said selected line nearer said other end of said buffer in run end form; and means for repeatedlyactuating said discarding, reading, adding, interpolating, selecting, and storing means for all lines of said image.

* * * * *